US012545024B2

(12) United States Patent
Murayama et al.

(10) Patent No.: US 12,545,024 B2
(45) Date of Patent: Feb. 10, 2026

(54) LIQUID DISCHARGE SYSTEM

(71) Applicant: SEIKO EPSON CORPORATION, Tokyo (JP)

(72) Inventors: Toshiro Murayama, Fujimi-machi (JP); Nobuaki Ito, Suwa (JP); Akira Miyagishi, Shiojiri (JP); Tomonaga Hasegawa, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 164 days.

(21) Appl. No.: 18/479,728

(22) Filed: Oct. 2, 2023

(65) Prior Publication Data

US 2024/0116294 A1 Apr. 11, 2024

(30) Foreign Application Priority Data

Oct. 4, 2022 (JP) ................................ 2022-160051

(51) Int. Cl.

*B41J 2/045* (2006.01)
*B41J 2/165* (2006.01)
*B41J 29/393* (2006.01)

(52) U.S. Cl.

CPC ......... *B41J 2/04588* (2013.01); *B41J 2/0451* (2013.01); *B41J 2/04581* (2013.01); *B41J 2/16579* (2013.01); *B41J 29/393* (2013.01); *B41J 2029/3935* (2013.01)

(58) Field of Classification Search

CPC .... B41J 2/0451; B41J 2/16579; B41J 29/393; B41J 2/2142; B41J 2/2139

See application file for complete search history.

(56) References Cited

U.S. PATENT DOCUMENTS

| | | | | |
|---|---|---|---|---|
| 6,203,140 B1 * | 3/2001 | Oyen | ..................... B41J 2/5056 347/41 |
| 10,880,453 B2 * | 12/2020 | Wakui | .................... B41J 2/2139 |

FOREIGN PATENT DOCUMENTS

| | | | |
|---|---|---|---|
| JP | 2004-174816 A | 6/2004 |
| JP | 2020-044804 A | 3/2020 |

* cited by examiner

*Primary Examiner* — Julian D Huffman

(74) *Attorney, Agent, or Firm* — WORKMAN NYDEGGER

(57) ABSTRACT

There is provided a liquid discharge system that controls an operation of a first liquid discharge head provided with a plurality of nozzles for discharging a liquid, the liquid discharge system including: a determination section that determines presence or absence of a discharge abnormality of a first nozzle among the plurality of nozzles; a reception section that receives designation information indicating complementary processing designated by a user among a plurality of complementary processing for complementing the discharge abnormality of the first nozzle when the first nozzle has a discharge abnormality, that is, among the plurality of complementary processing different from each other, according to an operation of the user; and an execution section that executes the complementary processing indicated by the designation information received by the reception section when the determination section determines that the first nozzle has the discharge abnormality.

14 Claims, 26 Drawing Sheets

FIG. 10

| Sd[m] | DESIGNATION CONTENTS OF Sd[m] | SLa[m] | | SLb[m] | | | SLs[m] | | |
|---|---|---|---|---|---|---|---|---|---|
| | | Tu1 | Tu2 | TSS1 | TSS2 | TSS3 | TSS1 | TSS2 | TSS3 |
| (1, 1, 0) | LARGE DOT | H | H | L | L | L | L | L | L |
| (1, 0, 0) | MEDIUM DOT | H | L | L | L | L | L | L | L |
| (0, 1, 0) | SMALL DOT | L | H | L | L | L | L | L | L |
| (0, 0, 0) | NON-DISCHARGE | L | L | L | L | L | L | L | L |
| (1, 1, 1) | ESTIMATION TARGET | L | L | H | L | H | L | H | L |

FIG. 18

321

| | | WAVEFORM CORRECTION PROCESSING | OTHER COLOR COMPLEMENTARY PROCESSING | OTHER PASS COMPLEMENTARY PROCESSING | ADJACENT COMPLEMENTARY PROCESSING | NORMAL PRINTING PROCESSING WITH FLUSHING PROCESSING |
|---|---|---|---|---|---|---|
| INK | CYAN INK MANUFACTURED BY COMPANY A | a11 | a12 | a13 | a14 | a15 |
| | CYAN INK MANUFACTURED BY COMPANY B | a21 | a22 | a23 | a24 | a25 |
| | ... | ... | ... | ... | ... | ... |
| MEDIUM | PRINTING PAPER | b11 | b12 | b13 | b14 | b15 |
| | CLOTH | ... | ... | ... | ... | ... |
| | ... | ... | ... | ... | ... | ... |
| ENVIRONMENTAL TEMPERATURE | LOWER THAN 10°C | c11 | c12 | c13 | c14 | c15 |
| | 10°C OR HIGHER AND LOWER THAN 20°C | ... | ... | ... | ... | ... |
| | 20°C OR HIGHER | ... | ... | ... | ... | ... |

FIG. 21

221

| DETERMINATION REFERENCE | THRESHOLD VALUE WITH RESPECT TO ESTIMATED VISCOSITY [Pa.S] | INITIAL SELECTION INFORMATION | |
|---|---|---|---|
| NO DESIGNATION | μth1 | SELECT | RC11 |
| DETERMINATION REFERENCE: HIGH | μth2 | | RC12 |
| DETERMINATION REFERENCE: LOW | μth3 | | RC13 |
| USER DESIGNATION | | | RC14 |

FIG. 22

223

| CORRECTION PROCESSING TYPE | AUTOMATIC EXECUTION INFORMATION | INITIAL SELECTION INFORMATION | |
|---|---|---|---|
| WAVEFORM CORRECTION PROCESSING | EXECUTE | SELECT | RC21 |
| OTHER COLOR COMPLEMENTARY PROCESSING | | SELECT | RC22 |
| OTHER PASS COMPLEMENTARY PROCESSING | EXECUTE | SELECT | RC23 |
| ADJACENT COMPLEMENTARY PROCESSING | EXECUTE | SELECT | RC24 |
| NORMAL PRINTING PROCESSING WITH FLUSHING PROCESSING | EXECUTE | SELECT | RC25 |

LIQUID DISCHARGE SYSTEM

The present application is based on, and claims priority from JP Application Serial Number 2022-160051, filed Oct. 4, 2022, the disclosure of which is hereby incorporated by reference herein in its entirety.

BACKGROUND

1. Technical Field

The present disclosure relates to a liquid discharge system.

2. Related Art

A liquid discharge apparatus such as an ink jet printer discharges a liquid such as ink from a plurality of nozzles provided in a liquid discharge head to execute printing processing of forming an image on a medium. In such a liquid discharge apparatus, a discharge abnormality may occur in which the liquid cannot be normally discharged from the nozzle due to thickening of the liquid or the like. For example, JP-A-2020-044804 describes a technique for estimating a viscosity of a liquid based on residual vibration generated after the liquid discharge head is driven by a driving signal.

When the discharge abnormality occurs, dots formed on the medium cannot be accurately formed by the liquid discharged from the nozzle, and the quality of the image formed on the medium in the printing processing deteriorates. In order to suppress such a decrease in quality of the image due to the discharge abnormality, for example, JP-A-2004-174816 describes a plurality of complementary processing for complementing the discharge abnormality when the discharge abnormality occurs in the nozzle. The complementary processing is, for example, processing of forming dots by discharging a liquid from another nozzle instead of discharging the liquid from a nozzle having a discharge abnormality.

However, in the above-described related art, when a discharge abnormality occurs in the nozzle and predetermined complementary processing is executed among the plurality of complementary processing, suboptimal complementary processing may be executed depending on the characteristics of the liquid discharge apparatus and the characteristics of the liquid.

SUMMARY

According to an aspect of the present disclosure, there is provided a liquid discharge system that controls an operation of a first liquid discharge head provided with a plurality of nozzles for discharging a liquid, the liquid discharge system including: a determination section that determines presence or absence of a discharge abnormality of a first nozzle among the plurality of nozzles; a reception section that receives designation information indicating complementary processing designated by a user among a plurality of complementary processing for complementing the discharge abnormality of the first nozzle when the first nozzle has a discharge abnormality, that is, among the plurality of complementary processing different from each other, according to an operation of the user; and an execution section that executes the complementary processing indicated by the designation information received by the reception section when the determination section determines that the first nozzle has the discharge abnormality.

BRIEF DESCRIPTION OF THE DRAWINGS

FIG. 10 is an explanatory diagram for explaining generation of coupling state designation signals.

FIG. 18 is a table illustrating an example of contents of an environment evaluation value table.

FIG. 21 is a table illustrating an example of contents of a determination reference table.

FIG. 22 is a table illustrating an example of contents of a complementary relationship table.

DESCRIPTION OF EMBODIMENTS

Hereinafter, embodiments for carrying out the present disclosure will be described with reference to the drawings. However, in each drawing, the size and scale of each section are appropriately changed from the actual size and scale. Further, the embodiments described below are preferred specific examples of the present disclosure, and therefore, various technically preferable limitations are given, but the scope of the present disclosure is not restricted to the following description, and is not restricted to the embodiments unless otherwise stated.

1. First Embodiment

Figure 1:
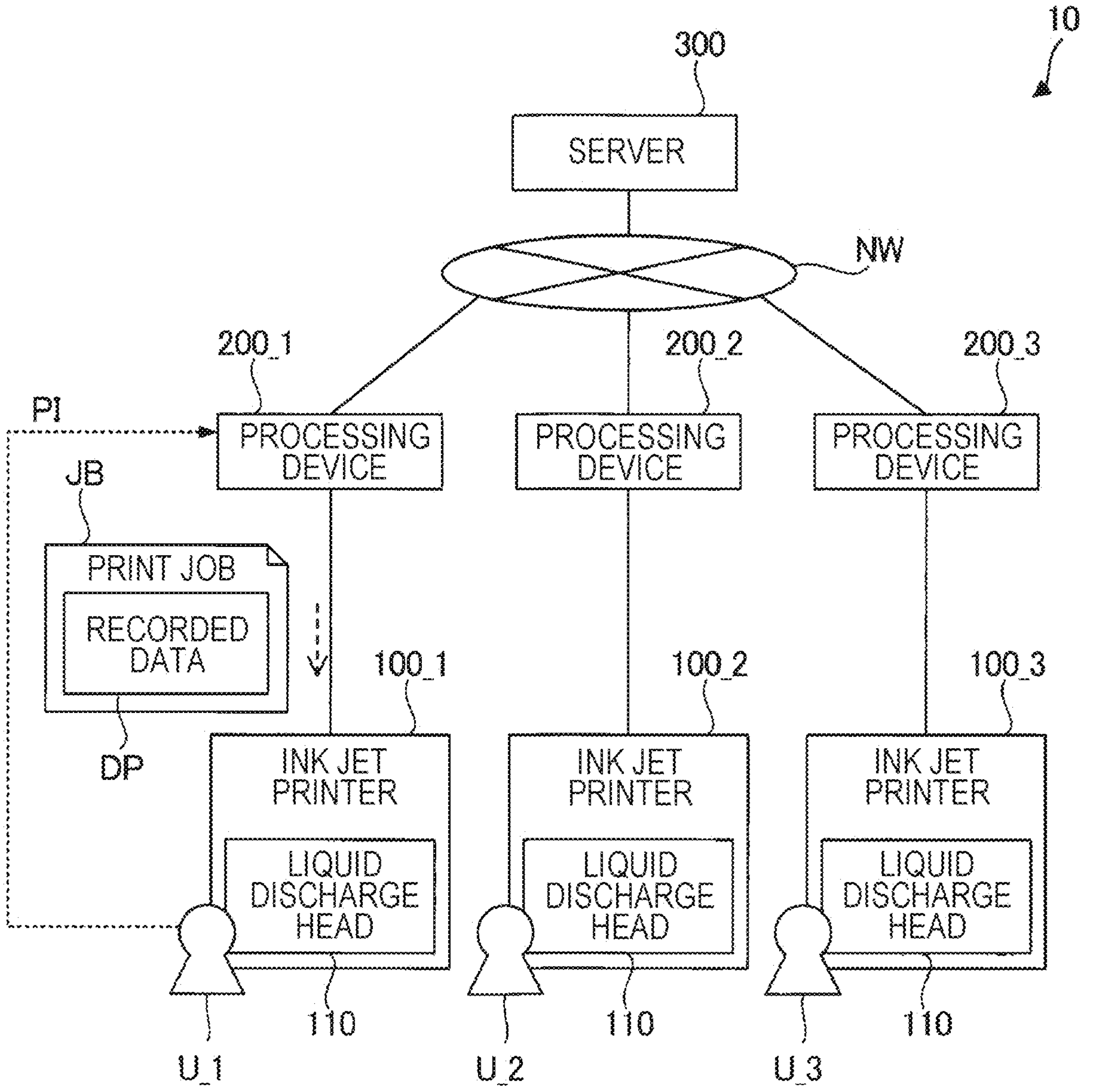
FIG. 1 is a schematic diagram illustrating a configuration example of a liquid discharge system according to a first embodiment.

FIG. 1 is a schematic diagram illustrating a configuration example of a liquid discharge system 10 according to a first embodiment. The liquid discharge system 10 is a system for improving the quality of an image obtained by printing processing by an ink jet method. Specific methods for improving the quality of an image will be described later. In the example illustrated in FIG. 1, the liquid discharge system 10 includes ink jet printers 100_1 to 100_3, processing devices 200_1 to 200_3, and a server 300.

Here, the ink jet printers 100_1 to 100_3 are devices provided by manufacturers of the ink jet printers 100_1 to 100_3. In the following description, the ink jet printers 100_1 to 100_3 are not distinguished from each other and may be collectively referred to as the ink jet printer 100. The ink jet printer 100 is a liquid discharge apparatus that discharges ink, which is an example of a liquid. The manufacturer of the ink jet printer 100 is a company that manufactures the ink jet printer 100. The manufacturer of the ink jet printer 100 may be referred to as a "printer manufacturer". Each of the ink jet printers 100_1 to 100_3 may be provided by the same printer manufacturer or may be provided by different printer manufacturers. However, a liquid discharge head 110 incorporated into the ink jet printers 100_1 to 100_3 is provided by the manufacturer of the liquid discharge head 110. The manufacturer of the liquid discharge head 110 is a company that manufactures the liquid discharge head 110. Hereinafter, the manufacturer of the liquid discharge head 110 may be referred to as a "head manufacturer". The printer manufacturer receives the provision of the liquid discharge head 110 from the head manufacturer, and manufactures the ink jet printer 100 by incorporating the provided liquid discharge head 110 into the ink jet printer 100. The server 300 is managed by a head manufacturer.

FIG. 1 illustrates a user U_1 who uses the ink jet printer 100_1, a user U_2 who uses the ink jet printer 100_2, and a user U_3 who uses the ink jet printer 100_3. In the following description, the users U_1 to U_3 may be collectively referred to as a user U without distinguishing each of the users U_1 to U_3. For example, when a worker belonging to a printer manufacturer uses the ink jet printer 100, the worker is the user U. Further, for example, when a third party who received the provision of the ink jet printer 100 from the printer manufacturer uses the ink jet printer 100, the third party is the user U. In the following description, a third party who received the provision of ink jet printer 100 from the printer manufacturer may be referred to as an "end user". For each of the integers i from 1 to 3, the user U_i uses the processing device 200_i in addition to the ink jet printer 100_i.

The ink jet printer 100_1 is communicatively coupled to the processing device 200_1. The ink jet printer 100_2 is communicatively coupled to the processing device 200_2. The ink jet printer 100_3 is communicatively coupled to the processing device 200_3. As described above, the ink jet printers 100_1 to 100_3 correspond to each of the processing devices 200_1 to 200_3, and are communicatively coupled to the processing devices 200_1 to 200_3. In the following description, the processing devices 200_1 to 200_3 may be collectively referred to as a processing device 200 without distinguishing each of the processing devices 200_1 to 200_3.

In the example illustrated in FIG. 1, the number of each of the ink jet printers 100 and the processing devices 200 included in the liquid discharge system 10 is three, but the number is not limited thereto, and may be one, two, or four or more. That is, the set of the ink jet printer 100 and the processing device 200 is not limited to three sets, and may be one set, two sets, or four sets or more.

The ink jet printer 100 is a printer that prints an image by an ink jet method. The ink jet printer 100 receives a print job JB for executing a printing processing from the processing device 200. The print job JB includes identification information (not illustrated) that uniquely identifies the print job JB, and recorded data DP indicating an image formed on a medium PP. Furthermore, the print job JB may include information indicating the number of copies of an image formed on the medium PP. The print job JB is generated by the processing device 200 when a print instruction PI is notified to the processing device 200 by the operation of the user U. The print instruction PI includes information for identifying image data that is a source of the recorded data DP. The image data is data in a file format such as PostScript, PDF, or XPS. PDF is an abbreviation for Portable Document Format. XPS is an abbreviation for XML Paper Specification. The information for identifying the image data is, for example, a file path of the image data stored in the processing device 200. The ink jet printer 100 forms an image based on the recorded data DP on the medium PP described later.

The ink jet printer 100 has a liquid discharge head 110. The liquid discharge head 110 discharges ink, which is an example of a liquid, from a nozzle N provided in the liquid discharge head 110. In the following, among the elements constituting the ink jet printer 100, the elements other than the liquid discharge head 110 may be referred to as a "printer main body".

In the example illustrated in FIG. 1, for simplification of the description, the ink jet printer 100 has one liquid discharge head 110, but the number of liquid discharge heads 110 is not limited to one and may be two or more.

The processing device 200 is a computer such as a desktop type or a notebook type. The processing device 200 has a function of generating the recorded data DP and a function of controlling printing by the ink jet printer 100.

The processing device 200 is communicatively coupled to the server 300 via a network NW such as a LAN, a WAN, and the Internet. Here, LAN is an abbreviation for Local Area Network. WAN is an abbreviation for Wide Area Network. The processing device 200 generates the recorded data DP by, for example, executing various processing such as RIP processing or color conversion processing on the image data identified by the print instruction PI. RIP is an abbreviation for Raster Image Processor.

In the present embodiment, in order to improve the quality of an image obtained in the printing processing, the viscosity of ink with respect to a plurality of nozzles N included in the ink jet printer 100 is estimated, the processing device 200 determines the discharge abnormality to be described later based on the information indicating the estimated viscosity, and when the discharge abnormality occurs, various complementary processing for complementing the discharge abnormality are executed. A specific description of the complementary processing will be described later with reference to FIG. 13. Hereinafter, an example of estimating the viscosity of the ink will be described after describing the configuration of the server 300 and the configuration of the processing device 200.

1-2. Configuration of Server 300

Figure 2:
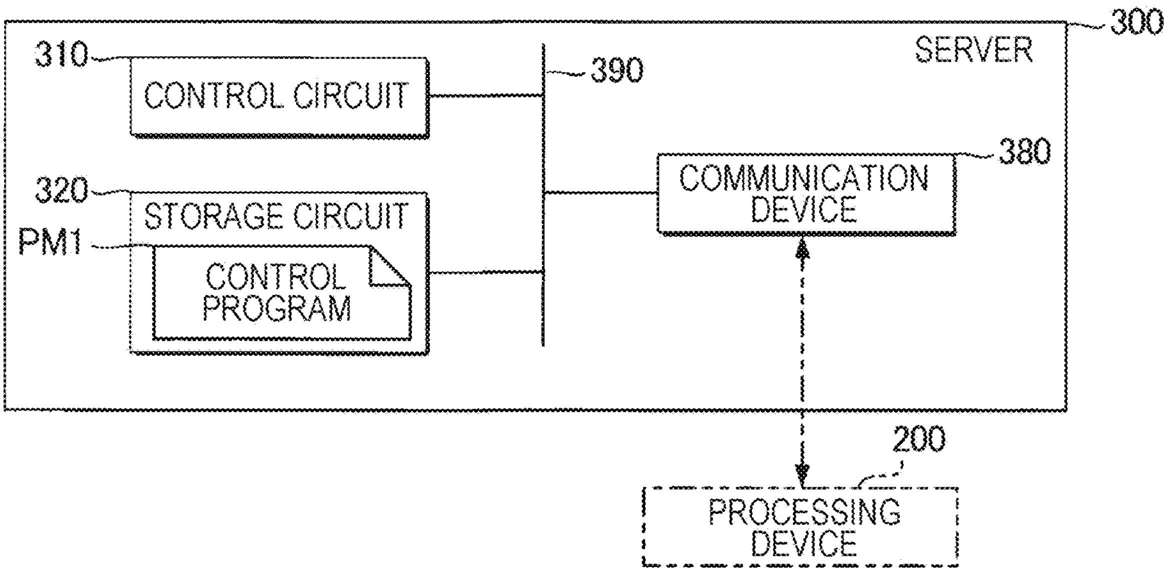
FIG. 2 is a diagram illustrating an example of a configuration of a server.

FIG. 2 is a diagram illustrating an example of a configuration of the server 300. The server 300 includes a control circuit 310, a storage circuit 320, and a communication device 380. The control circuit 310, the storage circuit 320, and the communication device 380 are coupled to each other by a bus 390 for communicating information.

The control circuit 310 includes, for example, one or more processors such as a CPU. The CPU is an abbreviation for Central Processing Unit. The control circuit 310 may include a programmable logic device such as an FPGA instead of the CPU or in addition to the CPU. The FPGA is an abbreviation for Field Programmable Gate Array.

The storage circuit 320 is composed of a magnetic storage device, a flash ROM, or the like. The storage circuit 320 is a recording medium that can be read by the control circuit 310, and stores a plurality of programs including a control program PM1 executed by the control circuit 310, various information used by the control circuit 310, and the like. The storage circuit 320 includes, for example, one or both semiconductor memories of one or more volatile memories such as a RAM and one or more non-volatile memories such as a ROM, an EEPROM, or a PROM. RAM is an abbreviation for Random Access Memory. ROM is an abbreviation for Read Only Memory. The EEPROM is an abbreviation for Electrically Erasable Programmable Read-Only Memory. PROM is an abbreviation for Programmable ROM.

The communication device 380 is hardware having a communication circuit for communicating with the processing device 200 via the network NW. The communication device 380 is also referred to as, for example, a network device, a network controller, a network card, or a communication module.

1-3. Configuration of Processing Device 200

Figure 3:
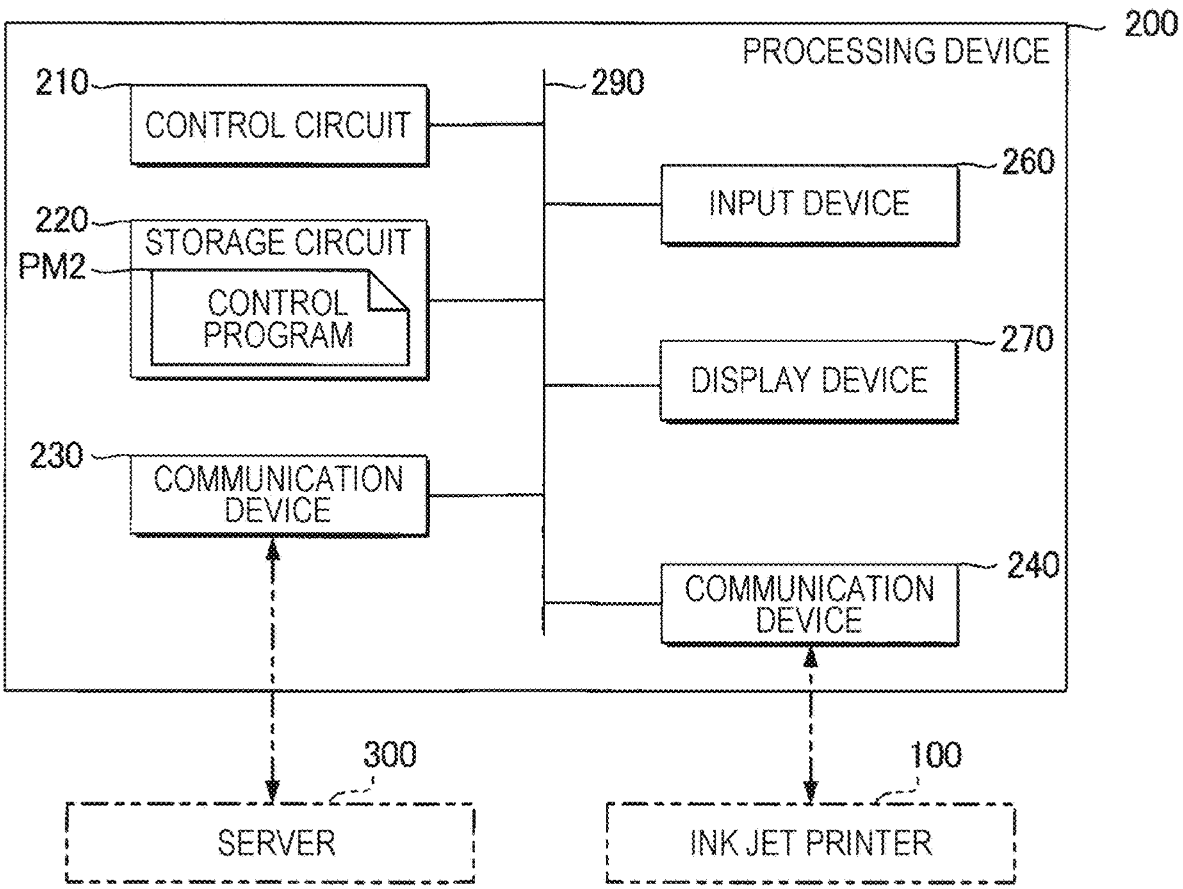
FIG. 3 is a diagram illustrating a configuration of a processing device.

FIG. 3 is a diagram showing a configuration of the processing device 200. The processing device 200 includes a control circuit 210, a storage circuit 220, a communication device 230, an input device 260, and a display device 270. The control circuit 210, the storage circuit 220, the communication device 230, the input device 260, and the display device 270 are coupled to each other by a bus 290 for communicating information. The storage circuit 220 is an example of a "storage section". The display device 270 is an example of a "display section".

The above control circuit 210 includes, for example, one or more processors such as a CPU. The control circuit 210 may include a programmable logic device such as an FPGA instead of the CPU or in addition to the CPU.

The storage circuit 220 is composed of a magnetic storage device, a flash ROM, or the like. The storage circuit 220 is a recording medium that can be read by the control circuit 210, and stores a plurality of programs including the control program PM2 executed by the control circuit 210, various information used by the control circuit 210, and the like. The storage circuit 220 includes, for example, one or both semiconductor memories of one or more volatile memories such as a RAM and one or more non-volatile memories such as a ROM, an EEPROM, or a PROM. For example, when the processing device 200 is coupled to the ink jet printer 100, the control program PM2 is downloaded from the server 300 and installed in the processing device 200.

The communication device 230 is hardware having a communication circuit for communicating with the processing device 200 via the network NW. The communication device 230 is also referred to as, for example, a network device, a network controller, a network card, or a communication module.

The communication device 240 is a circuit capable of communicating with the ink jet printer 100. For example, the communication device 240 is a network card such as USB or Bluetooth. USB is an abbreviation for Universal Serial Bus. USB and Bluetooth are registered trademarks.

The input device 260 is a device that outputs operation information according to the operation of the user U. The input device 260 is, for example, a mouse and a keyboard.

The display device 270 displays an image indicating some information to the user U. The display device 270 is an organic EL display, an LED display, and an LCD. EL is an abbreviation for Electro-Luminescence. LED is an abbreviation for Light Emitting Diode. LCD is an abbreviation for Liquid Crystal Display. Further, the input device 260 and the display device 270 may be integrated. The configuration in which the input device 260 and the display device 270 are integrated is, for example, a touch panel.

1-4. Configuration of Ink Jet Printer 100

Figure 4:
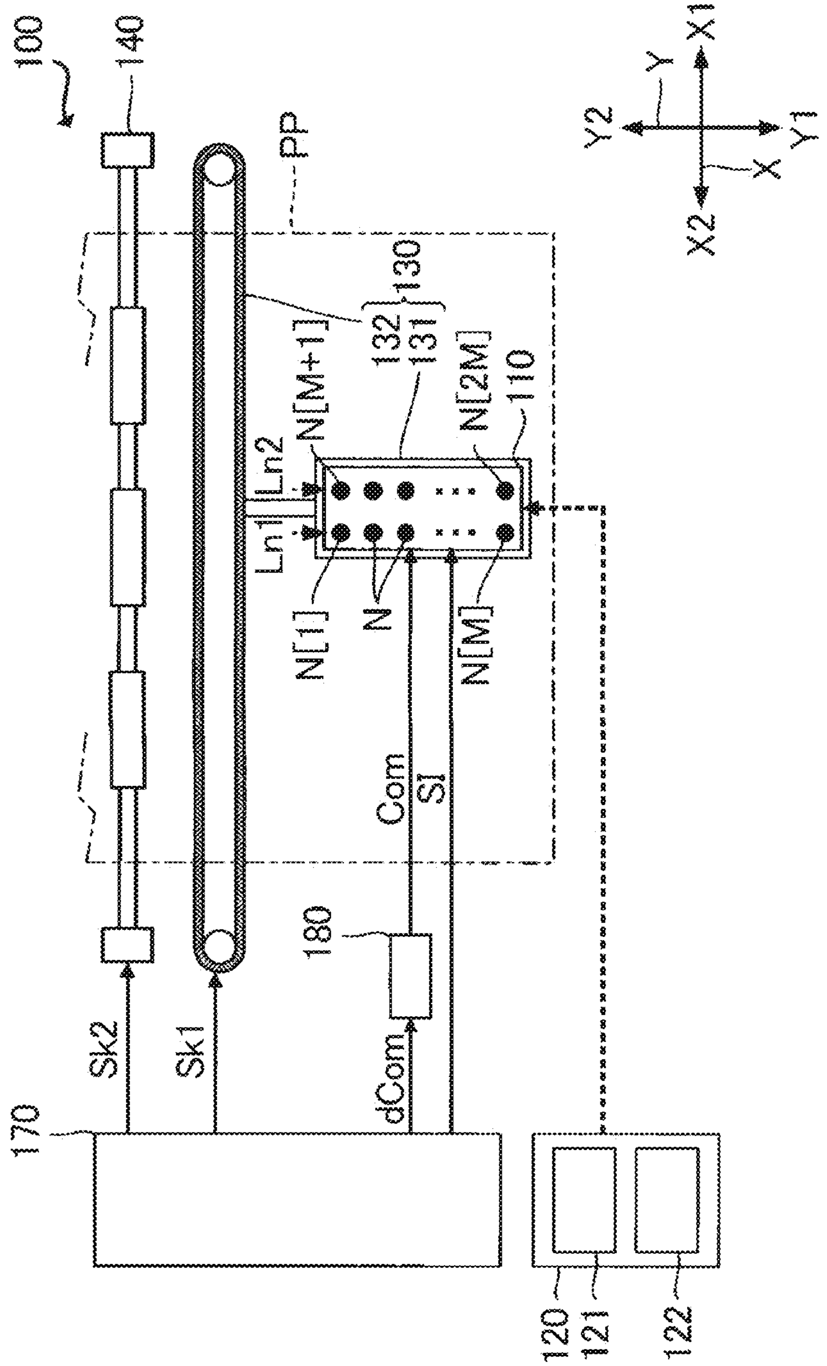
FIG. 4 is a schematic diagram illustrating an example of a configuration of an ink jet printer.
Figure 5:
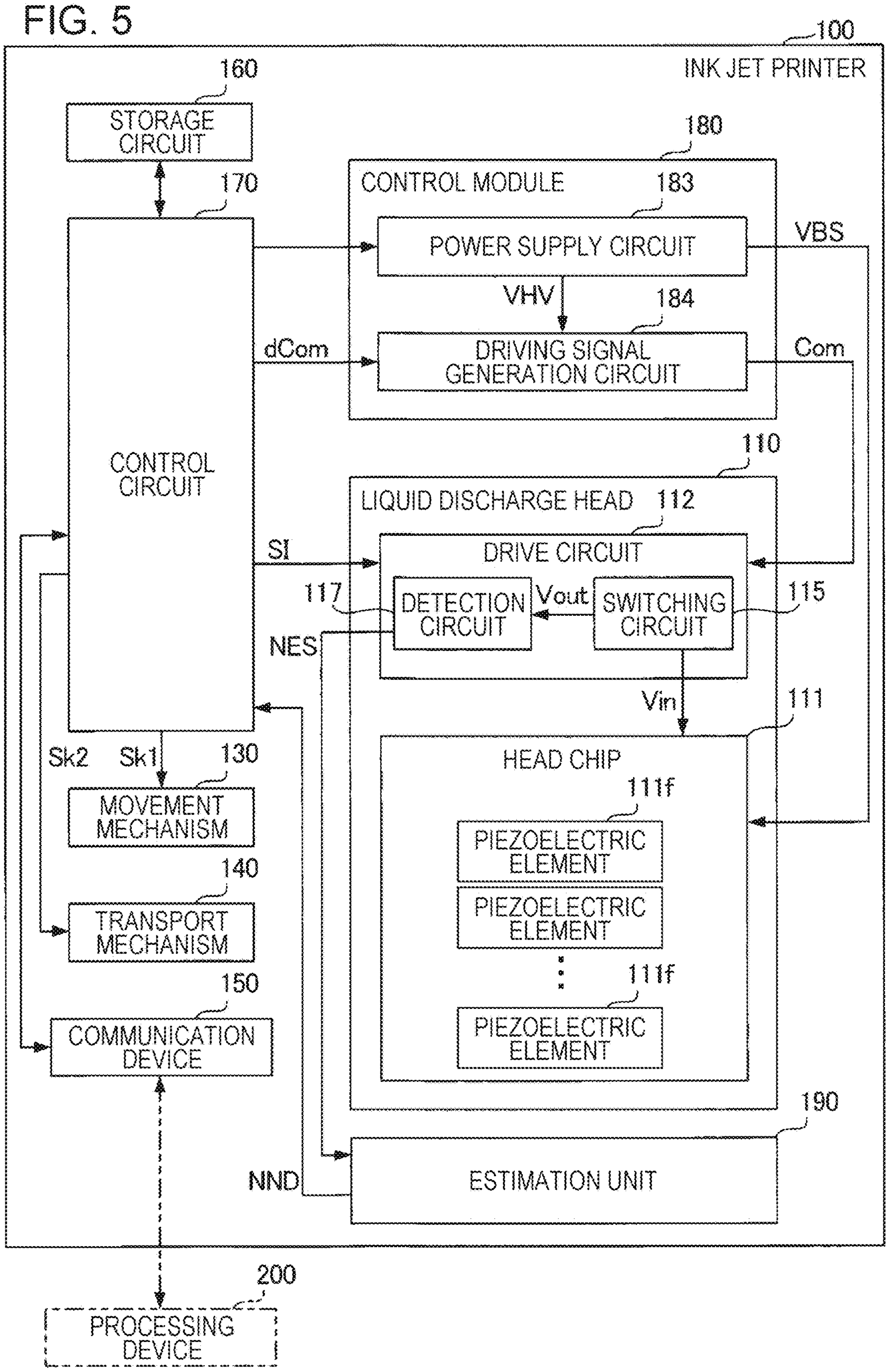
FIG. 5 is a block diagram illustrating a configuration example of the ink jet printer.

FIG. 4 is a schematic diagram illustrating an example of a configuration of the ink jet printer 100. FIG. 5 is a block diagram illustrating a configuration example of the ink jet printer 100. In the following description, an X axis, a Y axis, and a Z axis which are orthogonal to each other are assumed. One direction along the X axis when viewed from a random point is referred to as an X1 direction, and a direction opposite to the X1 direction is referred to as an X2 direction. Similarly, directions opposite to each other along the Y axis from a random point are referred to as a Y1 direction and a Y2 direction, and directions opposite to each other along the Z axis from a random point are referred to as a Z1 direction and a Z2 direction. An X-Y plane including the X axis and the Y axis corresponds to a horizontal plane. The Z axis is an axis line along a vertical direction, and the Z2 direction corresponds to a downward direction in the vertical direction.

The ink jet printer 100 according to the first embodiment is a serial printer that forms an image on the medium PP by a multi-pass method. The multi-pass method refers to forming an image on the medium PP by scanning a plurality of times. Specifically, as illustrated in FIG. 4, the ink jet printer 100 executes the printing processing of forming an image on the medium PP by discharging ink from the nozzle N while transporting the medium PP in the Y1 direction which is the sub-scanning direction, and moving the liquid discharge head 110 in the X1 direction and the X2 direction which are the main scanning directions. In the following description, moving the liquid discharge head 110 once in the main scanning direction is referred to as one pass. One pass and one scan are synonymous. The ink jet printer 100 forms an image on the medium PP by repeating processing of moving the liquid discharge head 110 between one pass to form a partial image corresponding to one pass on the medium PP, and processing of transporting the medium PP by an amount corresponding to one pass. The medium PP may be any medium as long as the ink jet printer 100 can perform printing on the medium, and is not particularly limited. For example, various papers, various cloths, various films, and the like are included. In FIG. 4, a part of the nozzles N of the plurality of nozzles N included in the liquid discharge head 110 are typically illustrated.

As illustrated in FIGS. 4 and 5, the ink jet printer 100 includes a liquid discharge head 110, a liquid container 120, a movement mechanism 130, a transport mechanism 140, a communication device 150, a storage circuit 160, a control circuit 170, a control module 180, and an estimation unit 190.

In the example illustrated in FIG. 5, the liquid discharge head 110 includes a head chip 111 and a drive circuit 112. A part or all of the control module 180 may be incorporated into the liquid discharge head 110. The control module 180 includes a power supply circuit 183 and a driving signal generation circuit 184.

The head chip 111 discharges the ink toward the medium PP. In FIG. 5, some discharge sections D of 2M discharge sections D that are a part of the components of the head chip 111 are typically illustrated. In the present embodiment, M is an even number of 2 or more. However, M may be 1. One discharge section D includes one nozzle N. A detailed example of the head chip 111 will be described later with reference to FIG. 6.

In the following, in order to distinguish each of the 2M discharge sections D provided in the head chip 111, 2M discharge sections D may be referred to as a first stage, a second stage, . . . , and a 2M-th stage in order. In addition, an m-th stage discharge section D may be referred to as a "discharge section D[m]". In the following description, the variable m is an integer of 1 or more and 2M or less. In addition, when a component of the liquid discharge head 110, a signal, or the like corresponds to the ordinal number m of the discharge section D[m], a suffix "[m]" indicating that the component, the signal, or the like corresponds to the ordinal number m may be added to a symbol representing the component, the signal, or the like.

In the example illustrated in FIG. 5, for simplification of the description, the number of head chips 111 included in the liquid discharge head 110 is one, but the number of head chips 111 may be two or more. One or more head chips 111 are arranged such that the plurality of nozzles N are distributed over a part of the X axis in the width direction of the medium PP.

The drive circuit 112 includes a switching circuit 115 and a detection circuit 117. Under the control of the control circuit 170, the switching circuit 115 switches whether or not to supply the driving signal Com output from the driving signal generation circuit 184 to each of the plurality of discharge sections D included in the head chip 111. Further, the switching circuit 115 switches whether or not to electrically couple each discharge section D and the detection circuit 117 to each other. In the present embodiment, it will be assumed that the driving signal Com includes a driving signal Com-A and a driving signal Com-B. Further, among the driving signals Com-A and Com-B, a signal actually supplied to the discharge section D[m] may be referred to as a supply driving signal Vin[m]. The switching circuit 115 includes, for example, a group of switches such as a transmission gate for the switching. Details of the switching circuit 115 will be described later with reference to FIG. 7. After the discharge section D is driven, the detection circuit 117 outputs a residual vibration signal NES indicating the residual vibration in the discharge section D to the estimation unit 190. More specifically, the detection circuit 117 generates the residual vibration signal NES[m] based on a detection signal Vout[m] detected from the discharge section D[m] driven by the driving signal Com. Hereinafter, the vibration remaining in the discharge section D will be referred to as "residual vibration".

The power supply circuit 183 receives the supply of power from a commercial power supply (not illustrated) and generates various predetermined potentials. The various generated potentials are appropriately supplied to each section of the ink jet printer 100. In the example illustrated in FIG. 5, the power supply circuit 183 generates a power supply potential VHV and an offset potential VBS. The offset potential VBS is supplied to the head chip 111 and the like. Further, the power supply potential VHV is supplied to the driving signal generation circuit 184 and the like.

The driving signal generation circuit 184 is a circuit that generates the driving signal Com for driving each discharge section D included in the head chip 111. Specifically, the driving signal generation circuit 184 includes, for example, a DA converter circuit and an amplifier circuit. The driving signal generation circuit 184 generates the driving signal Com by the DA converter circuit converting a waveform designation signal dCom from the control circuit 170, which will be described later, from a digital signal to an analog signal, and the amplifier circuit amplifying the analog signal using the power supply potential VHV from the power supply circuit 183.

As illustrated in FIG. 4, in the ink jet printer 100, the liquid container 120 that stores ink is installed. For example, a cartridge that can be attached to and detached from the ink jet printer 100, a bag-shaped ink pack formed of a flexible film, or an ink tank that can replenish the ink is used as the liquid container 120. In the present embodiment, the liquid container 120 will be described on the premise that two types of inks are stored. The liquid container 120 has a liquid container 121 that stores the first type of ink and a liquid container 122 that stores the second type of ink. The first type of ink and the second type of ink are, for example, inks having different coloring materials from each other. The first type of ink and the second type of ink may be inks of similar colors to each other. Similar colors are colors having the same or similar hues. Examples of inks of similar colors are cyan ink and light cyan ink. The type of ink contained in the liquid container 120 is not limited to two types, and may be one type or three or more types. For example, the liquid container 120 may store four types of ink, such as cyan ink, magenta ink, yellow ink, and black ink. The first type of ink is an example of a "first type of liquid", and the second type of ink is an example of a "second type of liquid".

The movement mechanism 130 and the transport mechanism 140 move the relative positions of the medium PP and the liquid discharge head 110 under the control of the control circuit 170. The movement of the relative position means that the liquid discharge head 110 may be moved while the position of the medium PP is fixed, or the medium PP may be moved while the position of the liquid discharge head 110 is fixed. In the present embodiment, with respect to the direction along the X axis which is the main scanning direction, the liquid discharge head 110 is moved in the direction along the X axis while the position of the medium PP in the X axis is fixed, and with respect to the Y1 direction which is the sub-scanning direction, the medium PP is moved in the Y1 direction while the position of the liquid discharge head 110 in the direction along the Y axis is fixed.

The movement mechanism 130 causes the liquid discharge head 110 to reciprocate along the X axis under the control of the control circuit 170. As illustrated in FIG. 4, the movement mechanism 130 includes a substantially box-shaped carriage 131 that accommodates the liquid discharge head 110, and an endless belt 132 to which the carriage 131 is fixed. A configuration in which the liquid container 120 is mounted on the carriage 131 together with the liquid discharge head 110 can also be employed.

The transport mechanism 140 transports the medium PP in the Y1 direction under the control of the control circuit 170. Specifically, the transport mechanism 140 is provided with a transport roller (not illustrated) of which the rotation axis is parallel to the X axis, and a motor (not illustrated) that rotates the transport roller under control by the control circuit 170.

The communication device 150 is a circuit capable of communicating with the processing device 200. For example, the communication device 150 is a network card such as USB or Bluetooth. Further, the communication device 150 may be integrated with the control circuit 170.

The storage circuit 160 stores various programs executed by the control circuit 170 and various data such as the print job JB processed by the control circuit 170. The storage circuit 160 includes, for example, one or both semiconductor memories of one or more volatile memories such as a RAM and one or more non-volatile memories such as a ROM, an EEPROM, or a PROM. The storage circuit 160 may be configured as a part of the control circuit 170.

The control circuit 170 has a function of controlling the operations of each section of the ink jet printer 100 and a function of processing various data. The control circuit 170 includes, for example, one or more processors such as a CPU. The control circuit 170 may include a programmable logic device such as an FPGA instead of the CPU or in addition to the CPU.

The control circuit 170 controls the operation of each section of the ink jet printer 100 by executing a program stored in the storage circuit 160. Here, the control circuit 170 generates signals such as a control signal Sk1, a control signal Sk2, a print signal SI, and a waveform designation signal dCom as signals for controlling the operations of each section of the ink jet printer 100.

The control signal Sk1 is a signal for controlling the drive of the movement mechanism 130. The control signal Sk2 is a signal for controlling the drive of the transport mechanism 140. The print signal SI is a signal for controlling the drive of the drive circuit 112. Specifically, the print signal SI designates whether or not the drive circuit 112 supplies the driving signal Com from the driving signal generation circuit 184 to the discharge section D, and after the discharge section D is driven, designates whether or not to output the residual vibration signal NES indicating the residual vibration in the discharge section D, which will be described later, for each predetermined unit period. By the designation, the amount of ink discharged from the head chip 111 and the like are designated. The waveform designation signal dCom is a digital signal for defining the waveform of the driving signal Com generated by the driving signal generation circuit 184.

When the printing processing is executed, the control circuit 170 first stores the print job JB supplied from the processing device 200 in the storage circuit 160. Next, the control circuit 170 generates various control signals such as the print signal SI, the waveform designation signal dCom, the control signal Sk1, and the control signal Sk2 based on various data such as the recorded data DP included in the print job JB stored in the storage circuit 160. Thereafter, the control circuit 170 controls the liquid discharge head 110 such that the discharge section D is driven while controlling the transport mechanism 140 and the movement mechanism 130 to change a relative position of the medium PP with respect to the liquid discharge head 110 based on the various control signals and various data stored in the storage circuit 160. In this manner, the control circuit 170 adjusts whether or not ink is discharged from the discharge section D, the amount of discharge of ink, the timing of discharge of ink, and the like and controls the execution of the printing processing of forming an image on the medium PP based on the recorded data DP.

Furthermore, when the viscosity estimation instruction is received from the processing device 200, the ink jet printer 100 according to the present embodiment executes the viscosity estimation processing of estimating the viscosity of ink of the discharge section D in order to determine whether or not the discharge state of the ink from each discharge section D is normal, that is, presence or absence of a discharge abnormality of the nozzle N included in each discharge section D. Hereinafter, the discharge abnormality of the nozzle N included in the discharge section D may be described as a discharge abnormality of the discharge section D. The discharge abnormality is a state where, even when a user tries to discharge ink from the discharge section D by driving the discharge section D by the driving signal Com, the ink cannot be discharged according to an aspect defined by the driving signal Com. An aspect of discharging the ink defined by the driving signal Com is that the discharge section D discharges an amount of ink defined by the waveform of the driving signal Com, and the discharge section D discharges the ink at a discharge speed defined by the waveform of the driving signal Com. That is, a state where the ink cannot be discharged according to the aspect of discharging the ink defined by the driving signal Com includes a state where an amount of ink smaller than the discharge amount of ink defined by the driving signal Com is discharged from the discharge section D, a state where an amount of ink greater than the discharge amount of ink defined by the driving signal Com is discharged from the discharge section D, and a state where the ink cannot land at a desired landing position on the medium PP because the ink is discharged at a speed different from the ink discharge speed defined by the driving signal Com, in addition to a state where the ink cannot be discharged from the discharge section D. In the following, the discharge section D of which the viscosity is the target of estimation may be referred to as an estimation target discharge section D-H.

The discharge abnormality may occur due to thickening of ink or the like. The thickening of the ink proceeds by evaporation of a solvent of the ink, typically water, from the interface of the nozzle N or the like. In the present embodiment, the thickening of the discharge section D is estimated, and the presence or absence of a discharge abnormality of the nozzle N included in the discharge section D is determined based on the estimated viscosity.

In the viscosity estimation processing, the ink jet printer 100 executes a series of processing in which, firstly, the control circuit 170 selects the estimation target discharge section D-H among the 2M discharge sections D, secondly, under the control of the control circuit 170, residual vibration is generated in the estimation target discharge section D-H by driving the estimation target discharge section D-H, thirdly, the detection circuit 117 generates the residual vibration signal NES based on the detection signal Vout detected from the estimation target discharge section D-H, and fourthly, the estimation unit 190 estimates the viscosity based on the residual vibration signal NES, and generates viscosity information NND indicating the estimated viscosity. Since the discharge state changes from normal to abnormal as the viscosity increases, it can be said that the viscosity information NND indicates the discharge state of the nozzle N.

Further, the ink jet printer 100 according to the present embodiment may execute various complementary processing for complementing the discharge abnormality when the discharge abnormality occurs in the discharge section D. The complementary processing is executed when a discharge abnormality occurs even when the supply driving signal Vin determined based on the recorded data DP is applied to the discharge section D. On the other hand, processing of applying the supply driving signal Vin determined based on the recorded data DP to the discharge section D and discharging the ink according to the aspect defined by the supply driving signal Vin may be described as normal printing processing.

Further, the ink jet printer 100 according to the present embodiment may execute maintenance processing for recovering the discharge abnormality of the discharge section D having a discharge abnormality. The maintenance processing includes flushing processing of discharging ink from the discharge section D. The flushing processing is processing of forcibly removing thickened ink and air bubbles mixed in the ink by repeatedly driving the discharge section D using the driving signal Com for flushing processing. By executing the flushing processing, the discharge abnormality may be recovered. The maintenance processing is an example of "recovery processing".

Figure 6:
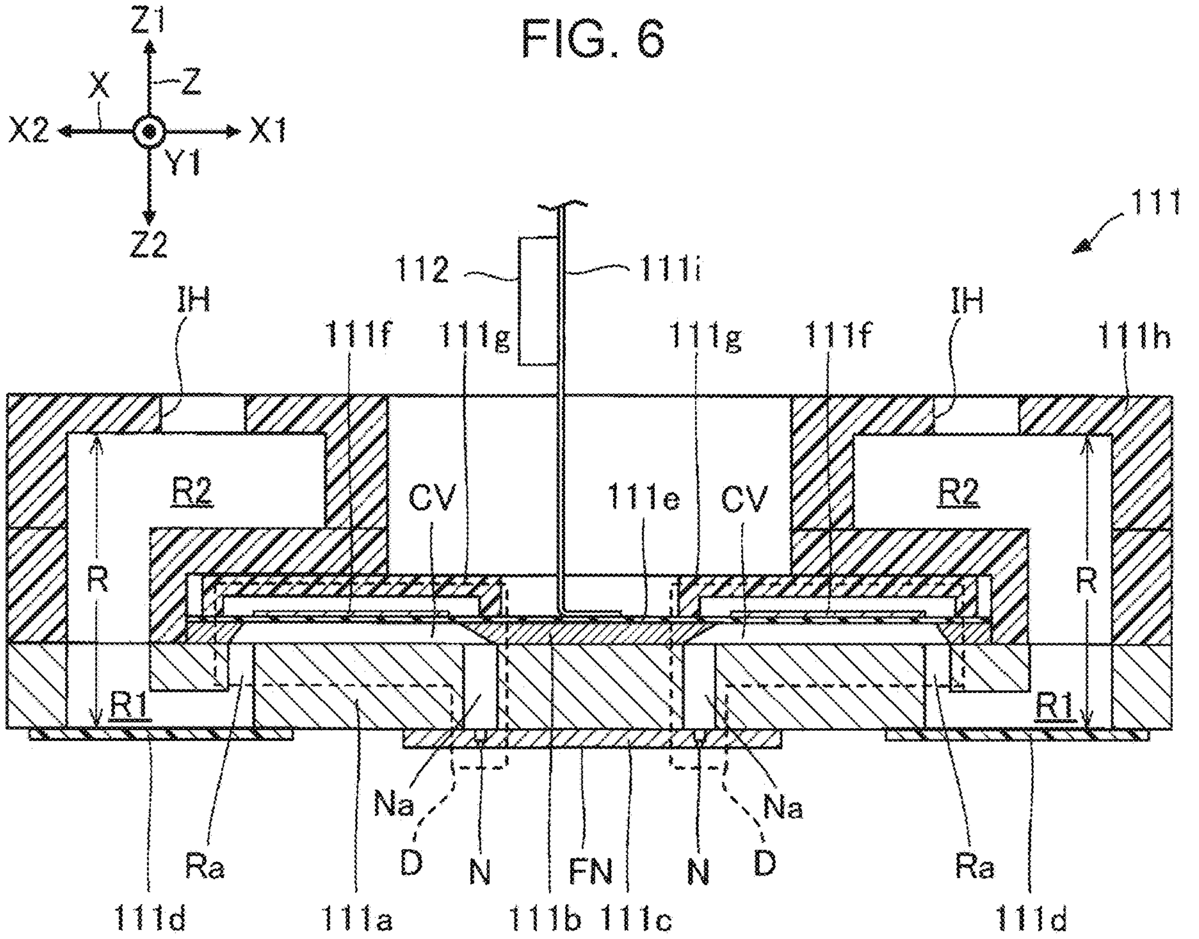
FIG. 6 is a cross-sectional diagram illustrating a configuration example of a head chip.

FIG. 6 is a cross-sectional diagram showing a configuration example of the head chip 111. However, in FIG. 6, the drive circuit 112 is also illustrated in addition to the head chip 111.

As illustrated in FIG. 6, the head chip 111 has 2M nozzles N arranged in the direction along the Y axis. As illustrated in FIG. 4, the 2M nozzles N are classified into a first nozzle array Ln1 and a second nozzle array Ln2 spaced apart from each other in the direction along the X axis. Each of the first nozzle array Ln1 and the second nozzle array Ln2 is a set of the M nozzles N linearly arranged in the direction along the Y axis. Further, as illustrated in FIG. 4, M nozzles N classified into the first nozzle array Ln1 may be described as nozzles N[1] to N[M], and M nozzles N classified into the second nozzle array Ln2 may be described as nozzles N[M+1] to N[2M].

The head chip 111 has a configuration substantially symmetrical with each other in the direction along the X axis. However, the positions of the M nozzles N of the first nozzle array Ln1 and the M nozzles N of the second nozzle array Ln2 in the direction along the Y axis may match each other or be different from each other. In the present embodiment, a configuration in which the positions of the M nozzles N of the first nozzle array Ln1 and the M nozzles N of the second nozzle array Ln2 in the direction along the Y axis match each other is described. Therefore, for all m ranging from 1 to M, the position of the nozzle N[m] in the direction along the Y axis and the position of the nozzle N[M+m] in the direction along the Y axis match each other.

As illustrated in FIG. 6, the head chip 111 includes a flow path substrate 111*a*, a pressure chamber substrate 111*b*, a nozzle plate 111*c*, a vibration absorbing body 111*d*, a vibration plate 11*e*, a plurality of piezoelectric elements 111*f*, a protective plate 11*g*, a case 111*h*, and a wiring substrate liii.

The flow path substrate 111*a* and the pressure chamber substrate 111*b* are laminated in this order in the Z1 direction, and form a flow path for supplying ink to the plurality of nozzles N. The vibration plate 111*e*, the plurality of piezoelectric elements 111*f*, the protective plate 111*g*, the case 111*h*, and the wiring substrate 111*i* are installed in a region positioned in the Z1 direction with respect to the laminated body formed by the flow path substrate 111*a* and the pressure chamber substrate 111*b*. On the other hand, the nozzle plate 111*c* and the vibration absorbing body 111*d* are installed in a region positioned in the Z2 direction with respect to the laminated body. Each element of the head chip 111 is schematically a plate-shaped member elongated in the Y direction, and is joined to each other by, for example, an adhesive. Hereinafter, each element of the head chip 111 will be described in order.

The nozzle plate 111*c* is a plate-shaped member provided with the plurality of nozzles N of each of the first nozzle array Ln1 and the second nozzle array Ln2. Each of the plurality of nozzles N is a through-hole through which ink is passed. Here, the surface of the nozzle plate 111*c* facing the Z2 direction is a nozzle surface FN. The nozzle plate 111*c* is manufactured by processing a silicon single crystal substrate by a semiconductor manufacturing technique using a processing technique such as dry etching or wet etching, for example. However, other known methods and materials may be appropriately used for manufacturing the nozzle plate 111*c*. Further, the cross-sectional shape of the nozzle N is typically a circular shape, but the shape is not limited thereto, and may be, for example, a non-circular shape such as a polygon or an ellipse.

The flow path substrate 111*a* is provided with a space R1, a plurality of supply flow paths Ra, and a plurality of communication flow paths Na for each of the first nozzle array Ln1 and the second nozzle array Ln2. The space R1 is an elongated opening extending in the direction along the Y axis in plan view in the direction along the Z axis. Each of the supply flow path Ra and the communication flow path Na is a through-hole formed for each nozzle N. Each supply flow path Ra communicates with the space R1.

The pressure chamber substrate 111*b* is a plate-shaped member in which a plurality of pressure chambers CV called cavities are formed for each of the first nozzle array Ln1 and the second nozzle array Ln2. The plurality of pressure chambers CV are arranged in the direction along the Y axis. Each pressure chamber CV is an elongated space formed for each nozzle N and extending in the direction along the X axis in plan view. Each of the flow path substrate 111*a* and the pressure chamber substrate 111*b* is manufactured by processing a silicon single crystal substrate by, for example, a semiconductor manufacturing technique, in the same manner as the nozzle plate 111*c* described above. However, other known methods and materials may be appropriately used for the manufacturing of each of the flow path substrate 111*a* and the pressure chamber substrate 111*b*.

The pressure chamber CV is a space positioned between the flow path substrate 111*a* and the vibration plate 111*e*. The plurality of pressure chambers CV are arranged in the direction along the Y axis for each of the first nozzle array Ln1 and the second nozzle array Ln2. Further, the pressure chamber CV communicates with each of the communication flow path Na and the supply flow path Ra. Therefore, the pressure chamber CV communicates with the nozzle N through the communication flow path Na and communicates with the space R1 through the supply flow path Ra.

The vibration plate 111*e* is arranged on the surface of the pressure chamber substrate 111*b* facing the Z1 direction. The vibration plate 11*e* is a plate-shaped member that can elastically vibrate. The vibration plate 11*e* has, for example, a first layer and a second layer, which are laminated in the Z1 direction in this order. The first layer is an elastic film made of, for example, silicon oxide. The elastic film is formed, for example, by thermally oxidizing one surface of a silicon single crystal substrate. The second layer is an insulating film made of, for example, zirconium oxide. The insulating film is formed by, for example, forming a zirconium layer by a sputtering method and thermally oxidizing the layer. It should be noted that the vibration plate 11*e* is not limited to the configuration resulting from the above-described lamination of the first layer and the second layer, and may be, for example, configured by a single layer or three or more layers.

On the surface of the vibration plate 11*e* facing the Z1 direction, the plurality of piezoelectric elements 111*f* mutually corresponding to the nozzles N are arranged for each of the first nozzle array Ln1 and the second nozzle array Ln2. Each piezoelectric element 111*f* is a passive element deformed by the supply of the driving signal Com. Each piezoelectric element 111*f* has an elongated shape extending in the direction along the X axis in plan view. The plurality of piezoelectric elements 111*f* are arranged in the direction along the Y axis to correspond to the plurality of pressure chambers CV. The piezoelectric element 111*f* overlaps with the pressure chamber CV in plan view. The piezoelectric element 111*f* is an example of a “driving element”.

Figure 7:
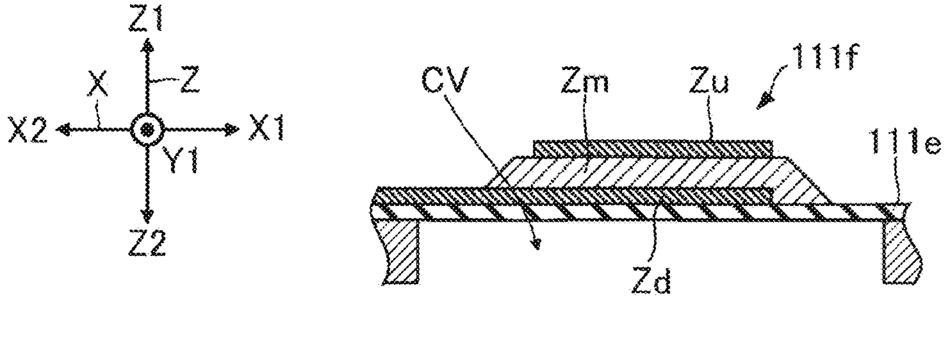
FIG. 7 is an enlarged cross-sectional diagram illustrating a vicinity of a piezoelectric element.

FIG. 7 is an enlarged cross-sectional diagram illustrating the vicinity of the piezoelectric element 111*f*. However, in FIG. 7, the protective plate 11*g* is not illustrated such that the drawing is not complicated.

As illustrated in FIG. 7, the piezoelectric element 111*f* is a laminated body in which a piezoelectric body Zm is interposed between an upper electrode Zu to which the offset potential VBS is supplied and a lower electrode Zd to which the driving signal Com is supplied. The piezoelectric element 111*f* is, for example, a part where the lower electrode Zd, the upper electrode Zu, and the piezoelectric body Zm overlap each other when viewed from the Z1 direction. Further, the pressure chamber CV is provided in the Z2 direction of a piezoelectric element PZ. In the first embodiment, the offset potential VBS is supplied to the upper electrode Zu and the driving signal Com is supplied to the lower electrode Zd. However, the driving signal Com may be supplied to the upper electrode Zu and the offset potential VBS may be supplied to the lower electrode Zd.

The description will be made referring again to FIG. 6. The protective plate 11*g* is a plate-shaped member installed on the surface of the vibration plate 11*e* facing the Z1 direction, protects the plurality of piezoelectric elements 111*f*, and reinforces the mechanical strength of the vibration plate 11*e*. Here, the plurality of piezoelectric elements 111*f* are accommodated between the protective plate 11*g* and the vibration plate 11*e*. The protective plate 11*g* is made of, for example, a resin material.

The case 111*h* is a member for storing ink supplied to the plurality of pressure chambers CV. The case 111*h* is made of, for example, a resin material. The case 111*h* is provided with a space R2 for each of the first nozzle array Ln1 and the second nozzle array Ln2. The space R2 is a space communicating with the above-described space R1 and, together with the space R1, functions as a reservoir R for storing ink supplied to the plurality of pressure chambers CV. The case 111*h* is provided with an introduction port IH for supplying ink to each reservoir R. The ink in each reservoir R is supplied to the pressure chamber CV through each supply flow path Ra.

The vibration absorbing body 111*d* is also referred to as a compliance substrate, is a flexible resin film constituting a wall surface of the reservoir R, and absorbs pressure fluctuations of ink in the reservoir R. The vibration absorbing body 111*d* may be a flexible thin plate made of metal. The surface of the vibration absorbing body 111*d* facing the Z1 direction is joined to the flow path substrate 111*a* with an adhesive or the like.

The wiring substrate liii is mounted on the surface of the vibration plate 11*e* facing the Z1 direction, and is a mounting component for electrically coupling the head chip 111, the drive circuit 112, the control module 110*b*, and the like. The wiring substrate 111*i* is, for example, a flexible wiring substrate such as COF, FPC, or FFC. The drive circuit 112 described above is mounted on the wiring substrate 111*i* of the present embodiment. The COF is an abbreviation for Chip On Film. FPC is an abbreviation for Flexible Printed Circuit. FFC is an abbreviation for Flexible Flat Cable.

As illustrated in FIG. 6, one discharge section D includes one piezoelectric element 111*f*, one pressure chamber CV, and one nozzle N. That is, the 2M piezoelectric elements 111*f* have a one-to-one correspondence with the 2M pressure chambers CV. As understood from FIG. 6 and the like, the piezoelectric element 111*f* corresponding to the pressure chamber CV means a piezoelectric element 111*f* that overlaps with a part or all of the pressure chamber CV in plan view in the Z2 direction. When the driving signal Com is supplied to the piezoelectric element 111*f* based on the print signal SI, the discharge section D drives the piezoelectric element 111*f* by the driving signal Com such that ink in the pressure chamber CV is discharged from the nozzle N.

1-5. Configuration of Liquid Discharge Head 110

Hereinafter, a configuration of the liquid discharge head 110 will be described with reference to FIG. 8.

Figure 8:
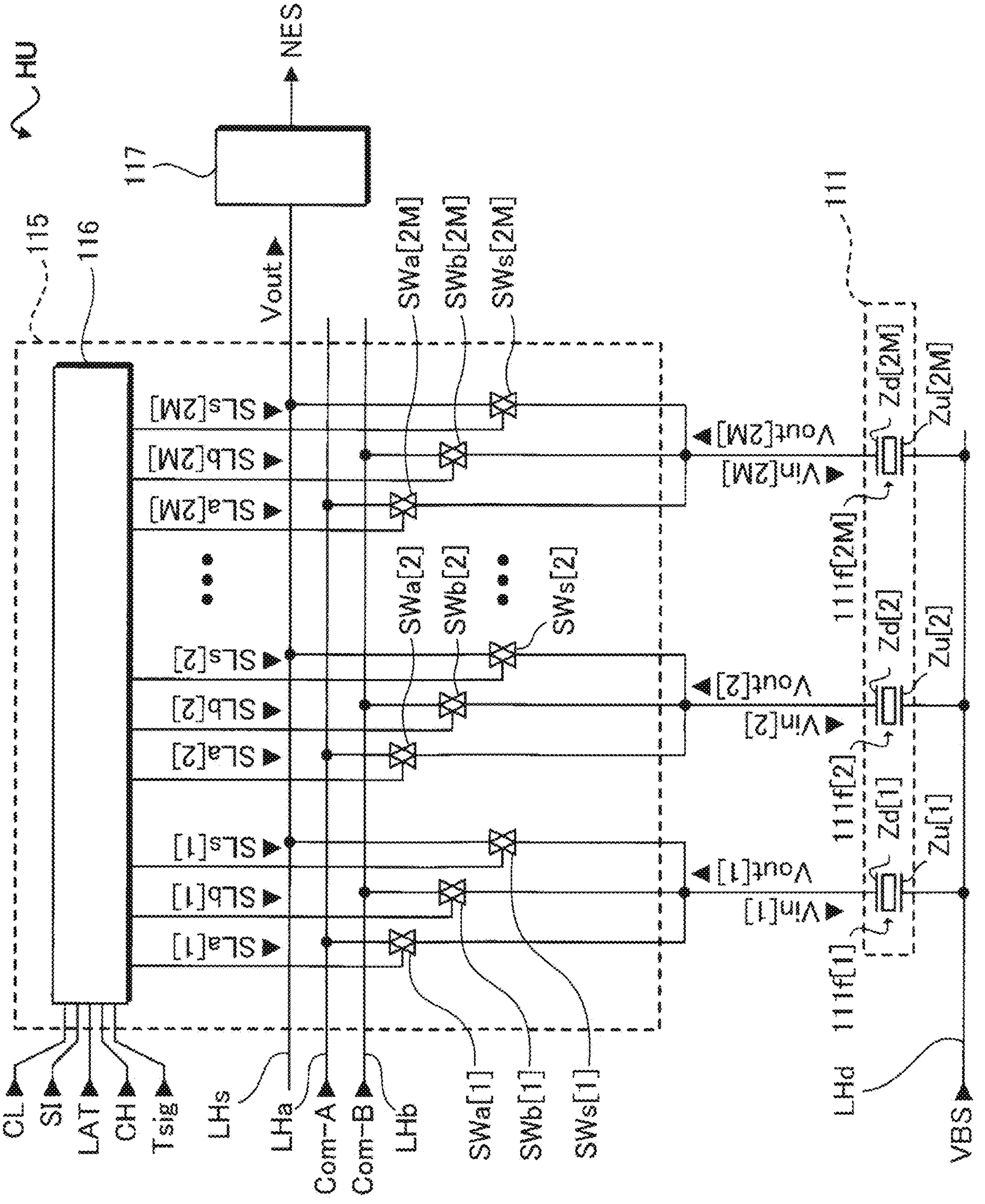
FIG. 8 is a block diagram illustrating an example of a configuration of a liquid discharge head.

FIG. 8 is a block diagram illustrating an example of the configuration of the liquid discharge head 110. As described above, the liquid discharge head 110 includes a recording head HD, the switching circuit 115, and the detection circuit 117. Further, the liquid discharge head 110 includes an internal wiring LHa to which the driving signal Com-A is supplied from the driving signal generation circuit 184, an internal wiring LHb to which the driving signal Com-B is supplied from the driving signal generation circuit 184, and an internal wiring LHs for supplying the detection signal Vout detected from the piezoelectric element 111*f* to the detection circuit 117.

As illustrated in FIG. 8, the switching circuit 115 includes 2M switches SWa[1] to SWa[2M], 2M switches SWb[1] to SWb[2M], 2M switches SWs[1] to SWs[2M], and a coupling state designation circuit 116 that designates the coupling state of each switch. As each switch, for example, a transmission gate can be employed.

The coupling state designation circuit 116 generates coupling state designation signals SLa[1] to SLa[2M] that designate the on/off of the switches SWa[1] to SWa[2M], coupling state designation signals SLb[1] to SLb[2M] that designate on/off of the switches SWb[1] to SWb[2M], and coupling state designation signals SLs[1] to SLs[2M] that designate on/off of the switches SWs[1] to SWs[2M] based on at least a part of a signal of the print signal SI, a latch signal LAT, a change signal CH, and a period designation signal Tsig supplied from the control circuit 170.

For any m ranging from 1 to 2M, each switch SWa[m] switches conduction and non-conduction between the internal wiring LHa and the lower electrode Zd[m] of the piezoelectric element 111*f*[m] in accordance with the coupling state designation signal SLa[m]. For example, the switch SWa[m] is turned on when the coupling state designation signal SLa[m] is at a high level and is turned off when the coupling state designation signal SLa[m] is at a low level.

For any m ranging from 1 to 2M, the switch SWb[m] switches conduction and non-conduction between the internal wiring LHb and the lower electrode Zd[m] of the piezoelectric element PZ[m] provided in the discharge section D[m] in accordance with the coupling state designation signal SLb[m]. For example, the switch SWb[m] is turned on when the coupling state designation signal SLb[m] is at a high level and is turned off when the coupling state designation signal SLb[m] is at a low level.

For any m ranging from 1 to 2M, the switch SWs[m] switches conduction and non-conduction between the internal wiring LHs and the lower electrode Zd[m] of the piezoelectric element PZ[m] in accordance with the coupling state designation signal SLs[m]. For example, the switch SWs[m] is turned on when the coupling state designation signal SLs[m] is at a high level and is turned off when the coupling state designation signal SLs[m] is at a low level.

For any m ranging from 1 to 2M, the detection signal Vout[m] output from the piezoelectric element 111*f*[m] is supplied to the detection circuit 117 through the internal wiring LHs. Thereafter, the detection circuit 117 generates the residual vibration signal NES based on the detection signal Vout[m].

1-6. Operation of Liquid Discharge Head 110

Hereinafter, an operation of the liquid discharge head 110 will be described with reference to FIGS. 9 and 10.

In the present embodiment, an operation period of the ink jet printer 100 includes one or a plurality of recording periods Tu. In the ink jet printer 100 according to the present embodiment, in each recording period Tu, it is assumed to execute one of the driving of each discharge section D in the printing processing, and the driving of the estimation target discharge section D-H and the detection of the residual vibration in the preparatory processing of the viscosity estimation processing. However, the present disclosure is not limited to such an aspect, and in each recording period Tu, it may be possible to execute both of the driving of each discharge section D in the printing processing, and the driving of the estimation target discharge section D-H and the detection of the residual vibration in the preparatory processing of the viscosity estimation processing.

In general, the ink jet printer 100 forms an image based on the recorded data DP by discharging ink once or a plurality of times from each discharge section D over a plurality of continuous or intermittent recording periods Tu. Further, in the 2M recording periods Tu provided continuously or intermittently, the ink jet printer 100 according to the present embodiment executes the preparatory processing of the viscosity estimation processing 2M times, and accordingly, executes the viscosity estimation processing in which each of the 2M discharge sections D[1] to D[2M] is defined as the estimation target discharge section D-H.

Figure 9:
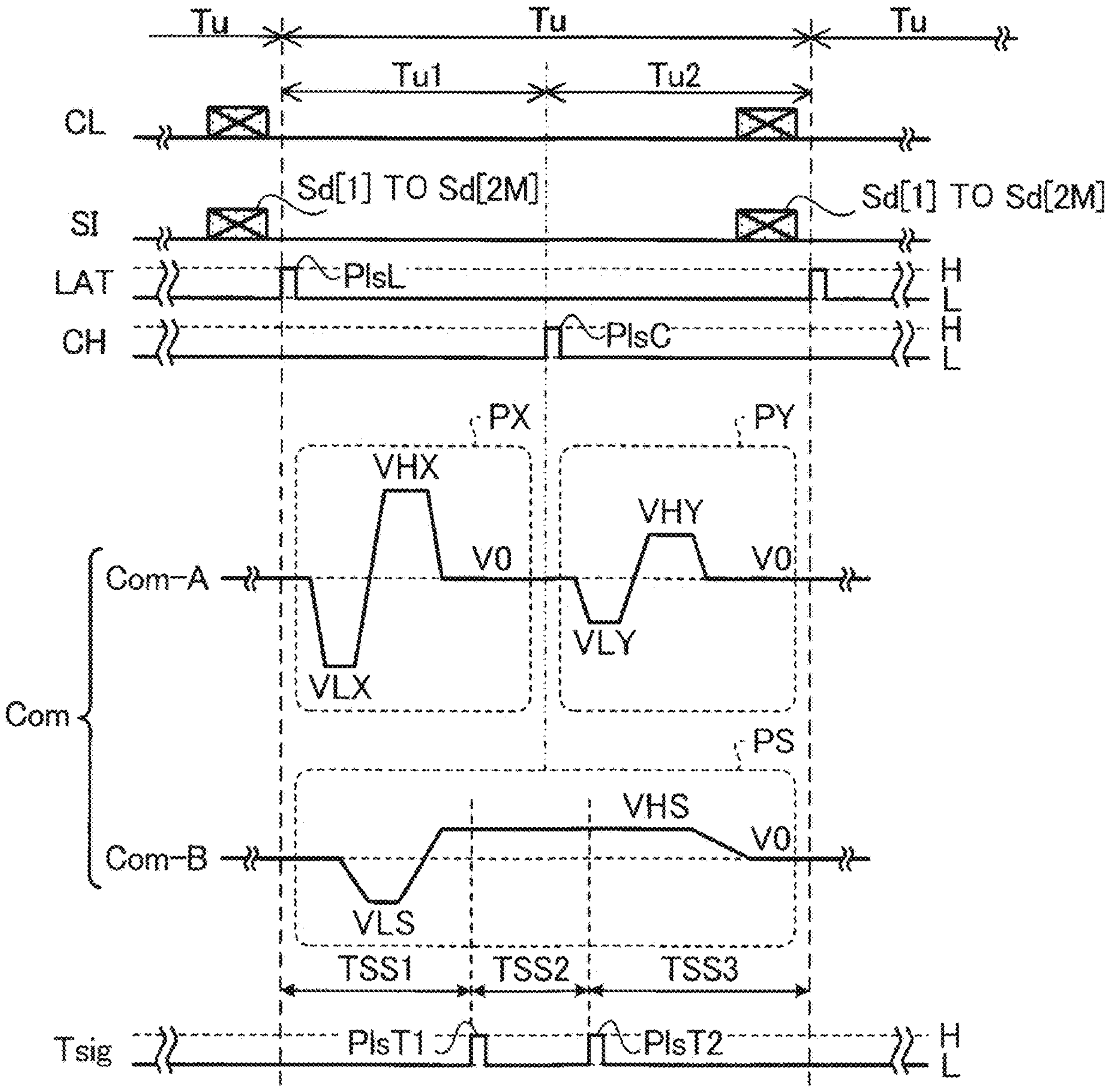
FIG. 9 is a diagram illustrating a timing chart for describing an operation of the ink jet printer in a recording period.

FIG. 9 is a timing chart for describing an operation of the ink jet printer 100 in the recording period Tu.

As illustrated in FIG. 9, the control circuit 170 outputs the latch signal LAT having a pulse PlsL and the change signal CH having a pulse PlsC. Accordingly, the control circuit 170 defines the recording period Tu as a period from the rise of the pulse PlsL to the rise of the next pulse PlsL. The control circuit 170 classifies the recording period Tu into two control periods Tu1 and Tu2 with the pulse PlsC.

The print signal SI includes individual designation signals Sd[1] to Sd[2M] that designate the aspect of the driving of the discharge sections D[1] to D[2M] in each recording period Tu. Thereafter, when at least one of the printing processing and the viscosity estimation processing is executed in the recording period Tu, as illustrated in FIG. 9, the control circuit 170 synchronizes the print signal SI including the individual designation signals Sd[1] to Sd[2M] with the clock signal CL prior to the start of the recording period Tu and supplies the print signal SI to the coupling state designation circuit 116. In this case, for any m ranging from 1 to 2M, the coupling state designation circuit 116 generates the coupling state designation signals SLa[m], SLb[m], and SLs[m] based on an individual designation signal Sd[m] in the recording period Tu.

For any m ranging from 1 to 2M, the individual designation signal Sd[m] according to the present embodiment is a signal for designating any one of the driving aspects among the five driving aspects including the discharge of the amount of ink corresponding to a large dot, the discharge of the amount of ink corresponding to a medium dot, the discharge of the amount of ink corresponding to a small dot, the non-discharge of the ink, and the driving as the determination target in the viscosity estimation processing, with respect to the discharge section D[m], in each recording period Tu. In the following description, the amount corresponding to the large dot may be referred to as a "large amount", and the discharge of the amount of ink corresponding to the large dot may be referred to as "formation of a large dot". Similarly, the amount corresponding to the medium dot may be referred to as a "medium amount", and the discharge of the amount of ink corresponding to the medium dot may be referred to as "formation of a medium dot". Similarly, the amount corresponding to the small dot may be referred to as a "small amount", and the discharge of the amount of ink corresponding to the small dot may be referred to as "formation of a small dot". The driving as the estimation target in the viscosity estimation processing may be referred to as "driving as the estimation target discharge section D-H". In the present embodiment, as an example, it is assumed that the individual designation signal Sd[m] is a 3-bit digital signal as illustrated in FIG. 10.

As illustrated in FIG. 9, the driving signal generation circuit 184 outputs the driving signal Com-A having a medium dot waveform PX provided in a control period Tu1 and a small dot waveform PY provided in a control period Tu2. In the present embodiment, the medium dot waveform PX and the small dot waveform PY are defined such that the potential difference between the highest potential VHX and the lowest potential VLX of the medium dot waveform PX is greater than the potential difference between the highest potential VHY and the lowest potential VLY of the small dot waveform PY. Specifically, for any m ranging from 1 to 2M, when the discharge section D[m] is driven by the driving signal Com-A having the medium dot waveform PX, the medium dot waveform PX is defined such that a medium amount of ink is discharged from the discharge section D[m]. Further, when the discharge section D[m] is driven by the driving signal Com-A having the small dot waveform PY, the small dot waveform PY is defined such that a small amount of ink is discharged from the discharge section D[m]. The potentials at the start and end of the medium dot waveform PX and the small dot waveform PY are set to a reference potential V0.

In addition, for any m ranging from 1 to 2M, when the individual designation signal Sd[m] designates the discharge section D[m] to form a large dot, the coupling state designation circuit 116 sets the coupling state designation signal SLa[m] to a high level in the control periods Tu1 and Tu2, and sets the coupling state designation signals SLb[m] and SLs[m] to a low level in the recording period Tu. In this case, the discharge section D[m] is driven by the driving signal Com-A having the medium dot waveform PX in the control period Tu1 to discharge a medium amount of ink, and is driven by the driving signal Com-A having the small dot waveform PY in the control period Tu2 to discharge a small amount of ink. Accordingly, the discharge section D[m] discharges a large amount of ink in total in the recording period Tu, and thus a large dot is formed on the medium PP.

When the individual designation signal Sd[m] designates the discharge section D[m] to form a medium dot, the coupling state designation circuit 116 sets the coupling state designation signal SLa[m] respectively to a high level in the control period Tu1 and to a low level in the control period Tu2, and sets the coupling state designation signals SLb[m] and SLs[m] to a low level in the recording period Tu. In this case, the discharge section D[m] discharges a medium amount of ink in the recording period Tu, and a medium dot is formed on the medium PP.

For any m ranging from 1 to 2M, when the individual designation signal Sd[m] designates the discharge section D[m] to form a small dot, the coupling state designation circuit 116 sets the coupling state designation signal SLa[m] respectively to a low level in the control period Tu1 and to a high level in the control period Tu2, and sets the coupling state designation signals SLb[m] and SLs[m] to a low level in the recording period Tu. In this case, the discharge section D[m] discharges a small amount of ink in the recording period Tu, and a small dot is formed on the medium PP.

Further, for any m from 1 to 2M, when the individual designation signal Sd[m] designates the discharge section D[m] to the non-discharge of the ink, the coupling state designation circuit 116 sets the coupling state designation signals SLa[m], SLb[m], and SLs[m] to a low level in the recording period Tu. In this case, the discharge section D[m] does not discharge ink and does not form dots on the medium PP in the recording period Tu.

As illustrated in FIG. 9, the driving signal generation circuit 184 outputs the driving signal Com-B having an inspection waveform PS provided in the recording period Tu. In the present embodiment, the inspection waveform PS is defined such that the potential difference between the highest potential VHS and the lowest potential VLS of the inspection waveform PS is smaller than the potential difference between the highest potential VHY and the lowest potential VLY of the small dot waveform PY. Specifically, for any m ranging from 1 to 2M, when the driving signal Com-B having the inspection waveform PS is supplied to the discharge section D[m], the inspection waveform PS is defined such that the discharge section D[m] is driven to the extent that the ink is not discharged from the discharge section D[m]. The potential at the start and end of the inspection waveform PS is set to the reference potential V0.

The control circuit 170 outputs the period designation signal Tsig having a pulse PlsT1 and a pulse PlsT2. Accordingly, the control circuit 170 classifies the recording period Tu into a control period TSS1 from the start of the pulse PlsL to the start of the pulse PlsT1, a control period TSS2 from the start of the pulse PlsT1 to the start of the pulse PlsT2, and a control period TSS3 from the start of the pulse PlsT2 to the start of the next pulse PlsL.

Further, for any m from 1 to 2M, when the individual designation signal Sd[m] designates the discharge section D[m] as the estimation target discharge section D-H, the coupling state designation circuit 116 sets the coupling state designation signal SLa[m] to a low level in the recording period Tu, sets the coupling state designation signal SLb[m] respectively to a high level in the control periods TSS1 and TSS3 and to a low level in the control period TSS2, and sets the coupling state designation signal SLs[m] respectively to a low level in the control periods TSS1 and TSS3 and to a high level in the control period TSS2.

In this case, the estimation target discharge section D-H is driven by the driving signal Com-B having the inspection waveform PS in the control period TSS1. Specifically, the piezoelectric element PZ included in the estimation target discharge section D-H is displaced by the driving signal COM-B having the inspection waveform PS in the control period TSS1. As a result, vibration is generated in the estimation target discharge section D-H, and this vibration remains even in the control period TSS2. In the control period TSS2, the lower electrode Zd included in the piezoelectric element 111*f* of the estimation target discharge section D-H changes the potential in accordance with the residual vibration generated in the estimation target discharge section D-H. In other words, in the control period TSS2, the lower electrode Zd included in the piezoelectric element 111*f* of the estimation target discharge section D-H indicates a potential corresponding to an electromotive force of the piezoelectric element 111*f* caused by the residual vibration generated in the estimation target discharge section D-H. The potential of the lower electrode Zd may be detected as the detection signal Vout in the control period TSS2.

FIG. 10 is an explanatory diagram for explaining generation of the coupling state designation signals SLa[m], SLb[m], and SLs[m] for any m ranging from 1 to 2M. The coupling state designation circuit 116 decodes the individual designation signal Sd[m] and generates the coupling state designation signals SLa[m], SLb[m], and SLs[m] according to FIG. 10.

As illustrated in FIG. 10, the individual designation signal Sd[m] according to the present embodiment indicates any one of a value (1, 1, 0) that designates the formation of the large dot, a value (1, 0, 0) that designates the formation of the medium dot, a value (0, 1, 0) that designates the formation of the small dot, a value (0, 0, 0) that designates the non-discharge of the ink, and a value (1, 1, 1) that designates the drive as the estimation target discharge section D-H. The coupling state designation circuit 116 sets the coupling state designation signal SLa[m] to a high level in the control periods Tu1 and Tu2 when the individual designation signal Sd[m] has the value (1, 1, 0), sets the coupling state designation signal SLa[m] to a high level in the control period Tu1 when the individual designation signal Sd[m] has the value (1, 0, 0), sets the coupling state designation signal SLa[m] to a high level in the control period Tu2 when the individual designation signal Sd[m] has the value (0, 1, 0), sets the coupling state designation signal SLb[m] to a high level in the control periods TSS1 and TSS3 and sets the coupling state designation signal SLs[m] to a high level in the control period TSS2 when the individual designation signal Sd[m] has the value (1, 1, 1), and sets each signal to a low level when the above conditions are not satisfied.

As described above, the detection circuit 117 generates the residual vibration signal NES based on the detection signal Vout. The residual vibration signal NES is a signal obtained by shaping the detection signal Vout into a waveform suitable for processing in the estimation unit 190 by amplifying the amplitude of the detection signal Vout and removing the noise component from the detection signal Vout. The residual vibration signal NES is an analog signal.

For example, the detection circuit 117 may be configured to include a negative feedback amplifier for amplifying the detection signal Vout, a low pass filter for attenuating a high frequency component of the detection signal Vout, and a voltage follower that outputs a low-impedance residual vibration signal NES by converting an impedance.

1-7. Estimation Unit 190

Next, the estimation unit 190 will be described.

Figure 11:
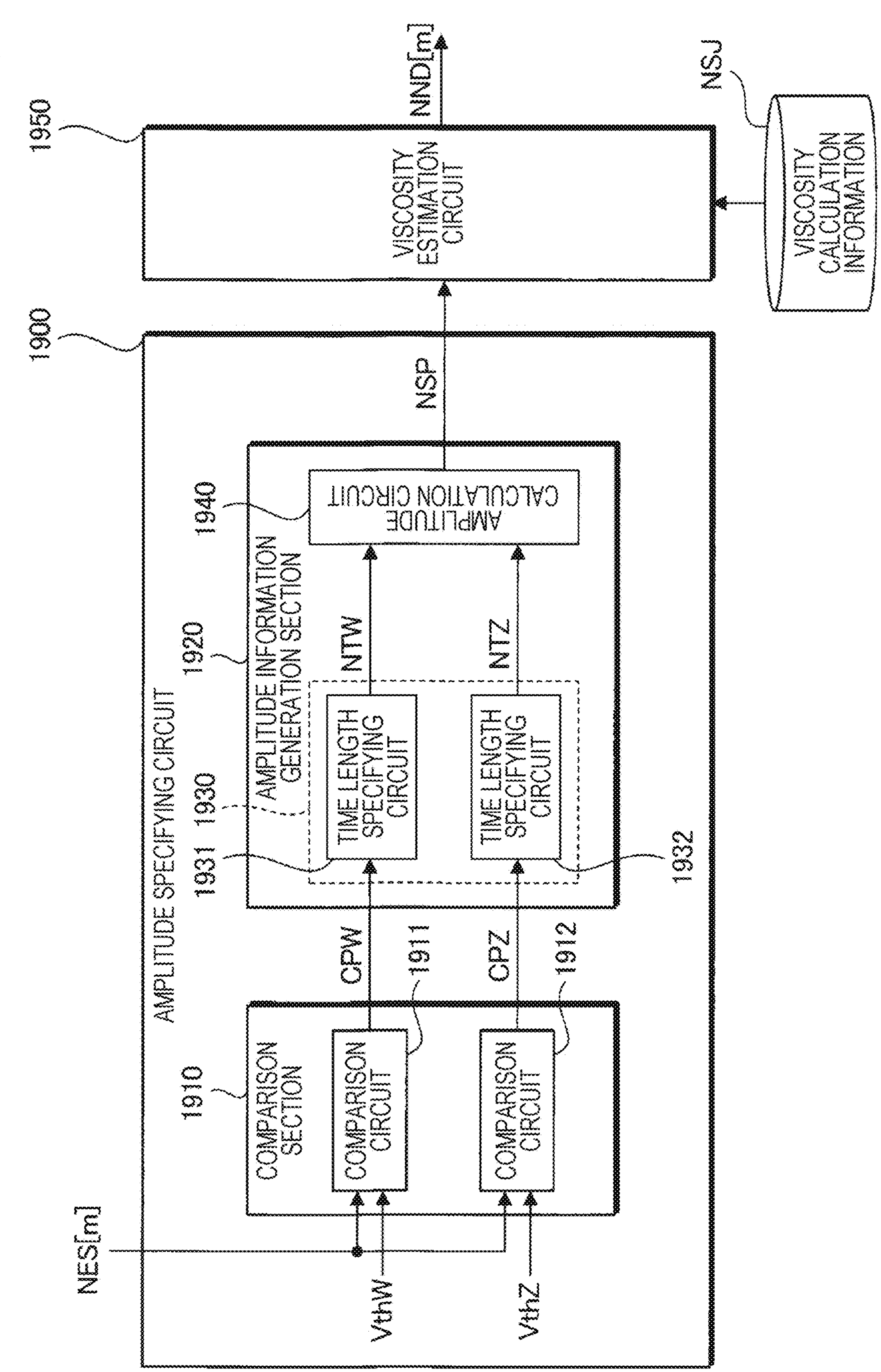
FIG. 11 is a block diagram illustrating an example of a configuration of an estimation unit.
Figure 12:
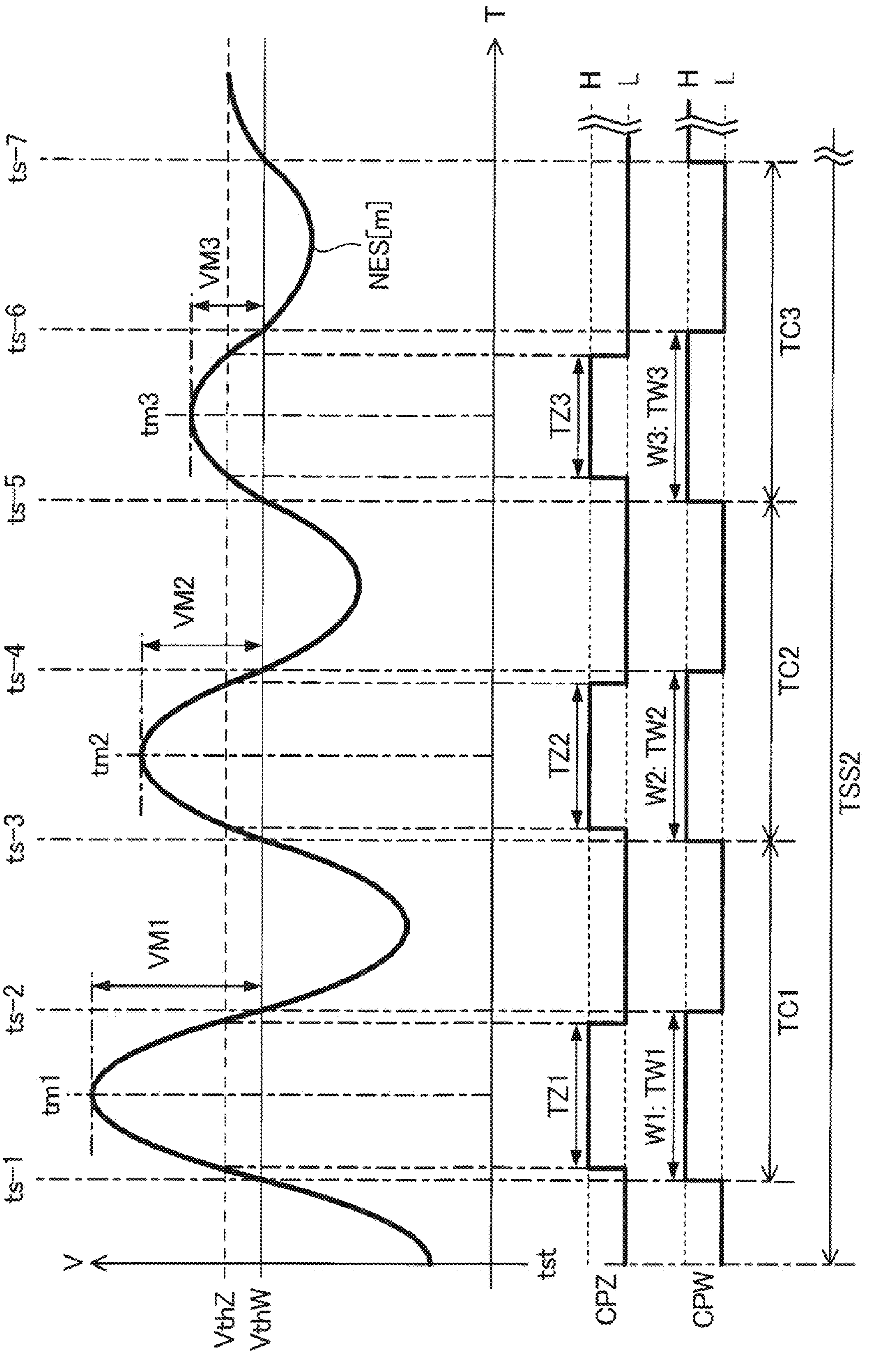
FIG. 12 is an explanatory diagram for explaining a residual vibration signal.

FIG. 11 is a block diagram illustrating an example of a configuration of the estimation unit 190. In addition, FIG. 12 is an explanatory diagram for explaining the residual vibration signal NES[m]. As illustrated in FIG. 11, the estimation unit 190 includes an amplitude specifying circuit 1900 and a viscosity estimation circuit 1950. The amplitude specifying circuit 1900 generates amplitude information NSP indicating the amplitude of the residual vibration signal NES[m] based on the residual vibration signal NES[m]. The viscosity estimation circuit 1950 estimates the viscosity of the ink existing inside the discharge section D based on the amplitude information NSP, and generates the viscosity information NND indicating the estimated viscosity of the ink.

As illustrated in FIG. 11, the amplitude specifying circuit 1900 includes a comparison section 1910 that binarizes the residual vibration signal NES[m] by comparing the residual vibration signal NES[m] with a threshold potential, and an amplitude information generation section 1920 that generates the amplitude information NSP indicating an amplitude of the residual vibration signal NES[m] based on the comparison result of the comparison section 1910.

As illustrated in FIG. 11, the comparison section 1910 includes a comparison circuit 1911 that compares the potential of the residual vibration signal NES[m] with a threshold potential VthW which is the potential of the amplitude center level of the residual vibration signal NES[m] to generate a comparison signal CPW indicating the result of the comparison, and a comparison circuit 1912 that compares the potential of the residual vibration signal NES[m] with the threshold potential VthZ having a higher potential than the threshold potential VthW to generate a comparison signal CPZ indicating the result of the comparison. Specifically, as illustrated in FIG. 12, the comparison circuit 1911 generates the comparison signal CPW having a high level when the potential of the residual vibration signal NES[m] is equal to or higher than the threshold potential VthW. Further, the comparison circuit 1912 generates the comparison signal CPZ having a high level when the potential of the residual vibration signal NES[m] is equal to or higher than the threshold potential VthZ.

As illustrated in FIG. 11, the amplitude information generation section 1920 includes a time length specifying circuit 1930 and an amplitude calculation circuit 1940. The time length specifying circuit 1930 includes a time length specifying circuit 1931 that specifies the time length of the period in which the comparison signal CPW is at a high level, and a time length specifying circuit 1932 that specifies the time length of the period in which the comparison signal CPZ is at a high level.

As illustrated in FIG. 12, the time length specifying circuit 1931 specifies a time length TWq of a period Wq at which the comparison signal CPW becomes the q-th highest level in the control period TSS2, and generates the time information NTW indicating the time length TWq. Here, the variable q is a natural number that satisfies "q 1". In the following, the time at which the potential of the residual vibration signal NES[m] matches the j-th threshold potential VthW in the control period TSS2 is referred to as time ts–j. Here, the variable j is a natural number that satisfies "j≥1". In the present embodiment, a case where the period Wq is a period from the time ts–(2*q–1) to the time ts–2*q is assumed as an example. In addition, the time length specifying circuit 1931 specifies a time length from time ts–(2*q–1), which is a start time of the period Wq, to time ts–(2*q+1), which is a start time of the period W(q+1), as a cycle TCq, and generates time information NTC indicating a cycle TCq. That is, the time length specifying circuit 1931 specifies the time length from the start time of the period Wq to the start time of the period W(q+1) as the cycle TCq.

In this manner, the time length specifying circuit 1931 specifies Q time lengths TW1 to TWQ corresponding to one-to-one with Q periods W1 to WQ in the control period TSS2 and generates Q time information NTW indicating the Q time lengths TW1 to TWQ, and specifies Q cycles TC1 to TCQ corresponding to one-to-one with Q periods W1 to WQ and generates Q time information NTC indicating the Q cycles TC1 to TCQ. Here, the value Q is a natural number that satisfies "Q≥2". It should be noted that the above-described variable q satisfies "1≤q≤Q".

Further, the time length specifying circuit 1932 specifies a time length TZq of a period at which the comparison signal CPZ becomes the q-th highest level in the control period TSS2, and generates the time information NTZ indicating the time length TZq. As illustrated in FIG. 12, the period in which the comparison signal CPZ becomes the q-th highest level is a part of the period Wq. That is, the time length specifying circuit 1932 specifies the time length of the period in which the comparison signal CPZ is at a high level in the period Wq, as the time length TZq.

In this manner, the time length specifying circuit 1932 specifies the Q time lengths TZ1 to TZQ corresponding to one-to-one with the Q periods W1 to WQ in the control period TSS2, and generates the Q time information NTZ indicating the Q time lengths TZ1 to TZQ.

As illustrated in FIGS. 11 and 12, the amplitude calculation circuit 1940 specifies an amplitude VMq of the residual vibration signal NES[m] in the period Wq based on the time information NTW and the time information NTZ, and generates the amplitude information NSP indicating the amplitude VMq. Specifically, the amplitude calculation circuit 1940 specifies the amplitude VMq by using Equation (1) illustrated below by approximating the residual vibration signal NES[m] to a sine wave.

$$VM_q = \frac{VthZ - VthW}{\sin\left\{\frac{\pi}{2}\left(\frac{TW_q - TZ_q}{TW_q}\right)\right\}} \tag{1}$$

Incidentally, in general, the amplitude VMq of the residual vibration signal NES[m] is represented by the following Equation (2). Here, an initial amplitude A is an amplitude of the residual vibration signal NES [m] at the time tst when the control period TSS2 is started, and the time tmq is a time intermediate between the start time of the period Wq and the end time of the period Wq, and an attenuation value λ is a scalar value corresponding to the attenuation rate of the residual vibration signal NES[m].

$$VM_q = A\left(\sin\frac{\pi}{2}\right)\exp(-\lambda \cdot tm_q) \tag{2}$$

Further, when a variable q1 is a natural number that satisfies "q1≥1" and a variable q2 is a natural number that satisfies "q2>1" and "q2>q1", the ratio of an amplitude VMq2 to an amplitude VMq1 is represented by the following Equation (3) based on Equation (2). Then, Equation (3) is transformed into Equation (4) illustrated below. Further, Equation (4) is transformed into Equation (5) illustrated below by approximating the time length from the time tmq to the time tm(q+1) with the cycle TCq.

$$\frac{VM_{q2}}{VM_{q1}} = \frac{A\left(\sin\frac{\pi}{2}\right)\exp(-\lambda \cdot tm_{q2})}{A\left(\sin\frac{\pi}{2}\right)\exp(-\lambda \cdot tm_{q1})} \tag{3}$$

$$\log_e\left(\frac{VM_{q2}}{VM_{q1}}\right) = -\lambda(tm_{q2} - tm_{q1}) \tag{4}$$

$$\lambda = -\left(\sum_{q=q1}^{q2-1}(TC_q)\right)^{-1}\{\log_e(VM_{q2}) - \log_e(VM_{q1})\} \tag{5}$$

The viscosity estimation circuit 1950 calculates the attenuation value λ by substituting cycles TCql to TC(q2−1) indicated by the (q2−q1) pieces of time information NTC corresponding to the period from the period Wq1 to the period W(q2−1), and the amplitude VMq1 and the amplitude VMq2 indicated by the two pieces of amplitude information NSPs corresponding to the period Wq1 and the period Wq2, into Equation (5). Then, the viscosity estimation circuit 1950 estimates the viscosity of ink filled by the discharge section D[m] driven as the estimation target discharge section D-H based on the attenuation value λ related to the residual vibration signal NES[m] and the viscosity calculation information NSJ. Here, the viscosity calculation information NSJ is information indicating the relationship between the attenuation value λ of the residual vibration signal NES[m] generated in the discharge section D[m] driven as the estimation target discharge section D-H and the viscosity of ink filled by the discharge section D[m]. Specifically, for example, the viscosity calculation information NSJ may be information indicating coefficients of an equation linearly approximating the relationship between the viscosity of the ink filled in the discharge section D[m] and the attenuation value λ of the residual vibration signal NES[m] generated in the discharge section D[m] by using the attenuation value λ of the residual vibration signal NES[m] generated in the discharge section D[m], which is specified by filling the discharge section D[m] with one ink having a known viscosity and by driving the discharge section D[m] as the estimation target discharge section D-H, and the attenuation value λ of the residual vibration signal NES[m] generated in the discharge section D[m], which is specified by filling the discharge section D[m] with another ink different from the one ink and having a known viscosity and by driving the discharge section D[m] as the estimation target discharge section D-H. The viscosity calculation information NSJ is stored in, for example, a storage area in the estimation unit 190.

When the viscosity estimation circuit 1950 estimates the viscosity of the ink filled in the discharge section D[m] driven as the estimation target discharge section D-H, the viscosity estimation circuit 1950 outputs the viscosity information NND[m] indicating the estimation result.

When the control circuit 170 outputs the print signal SI designating that the discharge section D[m] is driven as the estimation target discharge section D-H, the control circuit 170 transmits the viscosity information NND[m] acquired from the viscosity estimation circuit 1950 to the processing device 200 in association with the number "m" of the discharge section D[m].

1-8. Details of Complementary Processing

When the viscosity information NND is higher than the threshold value, the ink jet printer 100 determines that the thickening is progressing, and determines that the discharge section D has a discharge abnormality. Hereinafter, the discharge section D determined to have a discharge abnormality may be referred to as an abnormal discharge section D-S. Further, the nozzle N included in the abnormal discharge section D-S may be referred to as an abnormal nozzle N-S. When a discharge abnormality occurs in the discharge section D, the ink jet printer 100 can improve the quality of an image by executing one of a plurality of complementary processing for complementing the discharge abnormality. In the present embodiment, the plurality of complementary processing include, for example, five complementary processing such as waveform correction processing, other color complementary processing, other pass complementary processing, adjacent complementary processing, and normal printing processing with flushing processing.

Figure 13:
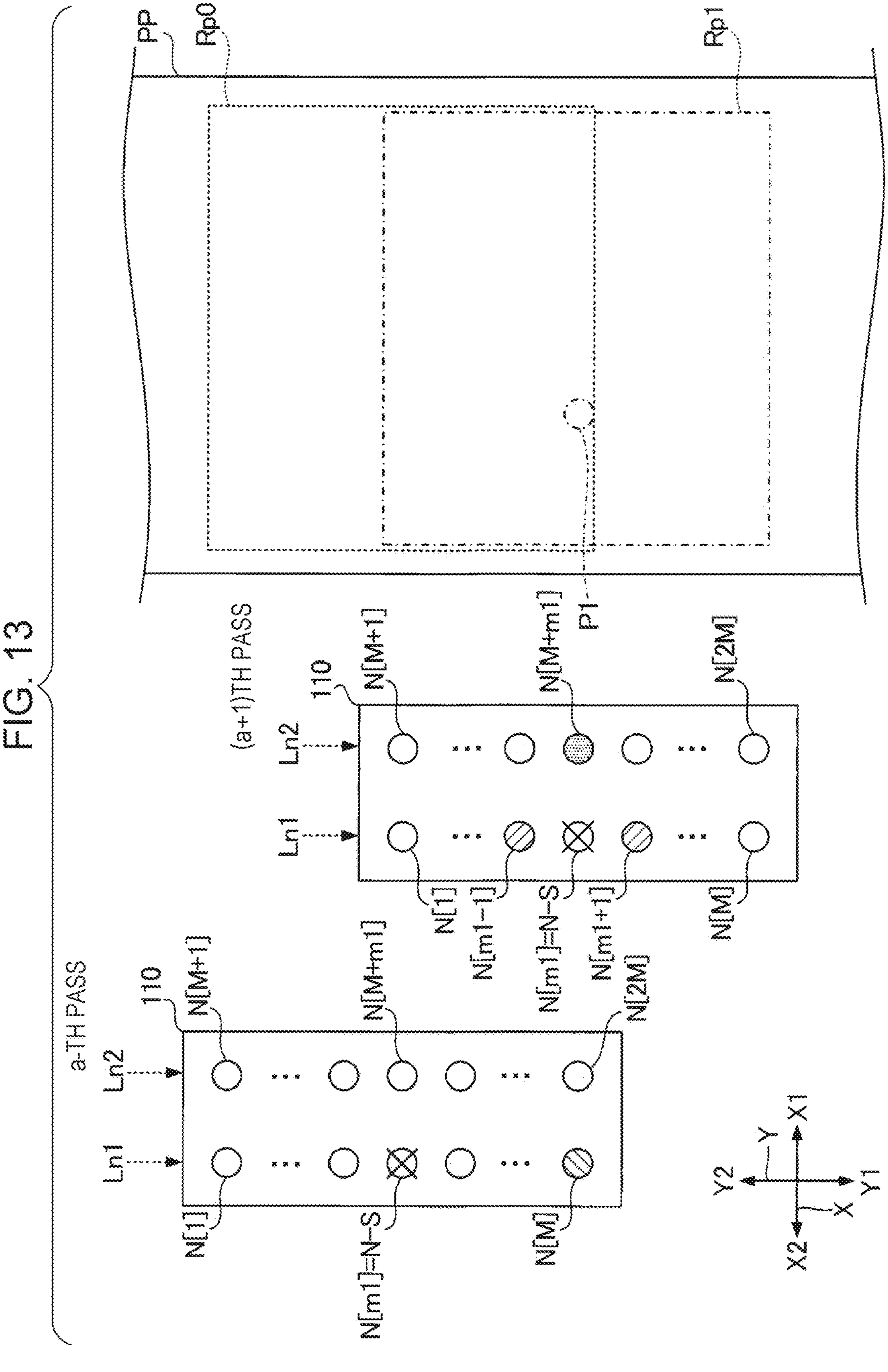
FIG. 13 is a diagram for explaining complementary processing.

FIG. 13 is a diagram for explaining the complementary processing. As described above, in the present embodiment, it has been described that the medium PP is moved in the Y1 direction while the position of the liquid discharge head 110 in the direction along the Y axis is fixed, but in order to make it easy to describe, in FIG. 13, the position of the medium PP is fixed, and the liquid discharge head 110 at the a-th pass with respect to the position of the medium PP and the liquid discharge head 110 at the (a+1)th pass with respect to the medium PP are illustrated. a is an integer of 1 or more. Further, in FIG. 13, in the medium PP, a discharge region Rp0 where the liquid discharge head 110 discharges the first type of ink and the second type of ink at the a-th pass, and a discharge region Rp1 where the liquid discharge head 110 discharges the first type of ink and the second type of ink at the (a+1)th pass, are illustrated. In the following description, the discharge region where the ink is discharged in one pass may be referred to as discharge region Rp. Originally, the width of the discharge region Rp0 in the direction along the X axis and the width of the discharge region Rp1 in the direction along the X axis are substantially the same. However, in order to make it easy to understand, in FIG. 13, the width of the discharge region Rp1 in the direction along the X axis is displayed to be shorter than the width of the discharge region Rp0 in the direction along the X axis. As can be understood from FIG. 13, a part of the discharge region Rp0 and the discharge region Rp1 overlap each other.

In order to make it easy to describe the complementary processing, it is assumed that the nozzle N[m1] classified in the first nozzle array Ln1 has a discharge abnormality. In FIG. 13, m1 is an integer of 2 to M−1. That is, the nozzle N[m1] is the abnormal nozzle N-S.

The waveform correction processing performs complementation by varying the waveform of the driving signal Com applied to the piezoelectric element 111*f* of the discharge section D including the nozzle N[m1] when the nozzle N[m1] has a discharge abnormality. For example, it is assumed that the nozzle N[m1] is in a state where an ink discharge amount smaller than the ink discharge amount defined by the driving signal Com is discharged as the discharge abnormality. As an aspect for increasing the discharge amount, for example, there are the following two aspects. In the first aspect, the control circuit 170 changes the waveform designation signal dCom to increase the potential difference between the lowest potential and the highest potential of the waveform of the driving signal Com. As the potential difference increases, the discharge amount increases. As a second aspect, the control circuit 170 outputs the individual designation signal Sd for designating the dot waveform for discharging the ink in a larger amount than the amount of ink discharged by the dot waveform originally designated based on the recorded data DP. For example, when the control circuit 170 originally outputs the individual designation signal Sd for designating the small dot waveform PY, the control circuit 170 outputs the individual designation signal Sd for designating the medium dot waveform PX.

In the other color complementary processing, when the nozzle N[m1] has a discharge abnormality, complementation is performed by discharging the second type of ink from the nozzle N classified into the second nozzle array Ln2. For example, it is assumed that the nozzle N[m1] is in a state where the first type of ink is not discharged as the discharge abnormality. The ink jet printer 100 discharges the second type of ink from any one of the plurality of nozzles N classified in the second nozzle array Ln2. The second type of ink may be discharged from any nozzle N of the plurality of nozzles N classified into the second nozzle array Ln2, but in order to improve the quality of the image formed on the medium PP, the position where the second type of ink lands on the medium PP is preferably closer to the position where the nozzle N[m1] is supposed to land the first type of ink on the medium PP. In FIG. 13, the position P1 where the nozzle N[m1] is supposed to land the first type of ink on the medium PP at the (a+1)th pass is illustrated.

The processing device 200 and the ink jet printer 100 jointly execute the other color complementary processing. In the example of FIG. 13, the recorded data DP indicating that the control circuit 210 lands the second type of ink at the position P1 from the nozzle N[M+m1] of which the direction along the Y axis is the same as that of the nozzle N[m1] at the (a+1)th pass, is generated. Based on the recorded data DP, the ink jet printer 100 discharges the second type of ink from the nozzle N[M+m1] to land at the position P1 at the (a+1)th pass.

In the other pass complementary processing, when the nozzle N[m1] has a discharge abnormality, among the M nozzles N classified into the first nozzle array Ln1 at a pass different from the pass at which the nozzle N[m1] is supposed to discharge ink, the nozzle N different from the abnormal nozzle N-S discharges the ink. As illustrated in FIG. 13, the position P1 is included in the discharge region Rp1 as well as in the discharge region Rp0. As illustrated in FIG. 13, the other pass complementary processing can be executed when the discharge regions overlap each other in two continuous passes. In the example of FIG. 13, the ink jet printer 100 discharges the first type of ink from the nozzle N[M] to land at the position P1 at the a-th pass. The nozzle N[M] is the nozzle N of which position in the direction along the Y axis is closest to the position P1 among the M nozzles N classified into the first nozzle array Ln1 at the a-th pass.

The processing device 200 and the ink jet printer 100 jointly execute the other pass complementary processing. In the example of FIG. 13, the control circuit 210 generates the recorded data DP indicating that the first type of ink is discharged from the nozzle N[M] to the vicinity of the position P1 at the a-th pass. Based on the recorded data DP, the ink jet printer 100 discharges the second type of ink from the nozzle N[M] to land at the position P1 at the a-th pass.

In the adjacent complementary processing, when the nozzle N[m1] has a discharge abnormality, complementation is performed by discharging the first type of liquid from the nozzle N[m1−1] or the nozzle N[m1+1] which is adjacent to the nozzle N[m1] out of the M nozzles N classified into the first nozzle array Ln1 in the same pass as the pass at which the nozzle N[m1] is supposed to discharge ink. In the example of FIG. 13, the ink jet printer 100 discharges the first type of ink from the nozzle N[m1−1] or the nozzle N[m1+1] to land in the vicinity of the position P1 at the (a+1)th pass. In the adjacent complementary processing, the amount of the first type of ink discharged from the nozzle N[m1−1] or the nozzle N[m1+1] at the (a+1)th pass is preferably greater than, but may be the same as the amount which is supposed to be discharged by the nozzle N[m1] at the (a+1)th pass.

The processing device 200 and the ink jet printer 100 jointly execute the adjacent complementary processing. In the example of FIG. 13, the control circuit 210 generates the recorded data DP indicating that the first type of ink from the nozzle N[m1−1] or the nozzle N[m1+1] is discharged to the vicinity of the position P1 at the (a+1)th pass. Based on the recorded data DP, the first type of ink is discharged from the nozzle N[m1−1] or the nozzle N[m1+1] to the vicinity of the position P1 at the (a+1)th pass.

In the normal printing processing with flushing processing, the flushing processing is executed for the nozzle N[m1], and the normal printing processing is executed after the flushing processing. The ink jet printer 100 may execute the flushing processing only for the nozzle N[m1], or may execute the flushing processing for all the nozzles N including the nozzle N[m1].

The waveform correction processing is an example of "first complementary processing". The other color complementary processing is an example of "second complementary processing". The other pass complementary processing is an example of "third complementary processing". The adjacent complementary processing is an example of "fifth complementary processing". The normal printing processing with flushing processing is an example of "sixth complementary processing". In the example of FIG. 13, when the nozzle N[m1] assumed to have the discharge abnormality corresponds to the "first nozzle", the nozzle N[M+m1] corresponds to the "second nozzle", the nozzle N[M] corresponds to the "third nozzle", and the nozzle N[m1−1] and the nozzle N[m1+1] correspond to the "fifth nozzle".

1-9. Regarding Determination Accuracy of Presence or Absence of Discharge Abnormality As described above, the viscosity indicated by the viscosity information NND is estimated based on the attenuation value λ related to the residual vibration signal NES[m] and the viscosity calculation information NSJ. As described above, the viscosity calculation information NSJ is information generated by using ink having a known viscosity. Therefore, when the unknown ink is used for the ink jet printer 100, there is a problem that the accuracy of the estimated viscosity deteriorates. When the estimation accuracy of the estimated viscosity deteriorates, there is a problem that the determination processing based on the estimated viscosity, specifically, the determination accuracy of the presence or absence of a discharge abnormality also deteriorates. The type of the ink to be used for the ink jet printer 100 is selected by the user U, and this is the information that the head manufacturer cannot know. In the unknown ink, ink density and ink compliance are required in order to obtain accurate viscosity based on residual vibration. However, there are cases where the user U does not know the ink density and ink compliance.

When the unknown ink is used for the ink jet printer 100, there is a possibility that the estimation accuracy of the viscosity information NND deteriorates, but the aspect of change in viscosity indicated by the viscosity information NND tends to be close to the aspect of change in true viscosity. More specifically, due to the deterioration of the estimation accuracy, there is a possibility that the estimated viscosity itself indicated by the viscosity information NND deviates from the true viscosity of the ink, but when the true viscosity of the ink increases, the estimated viscosity indicated by the viscosity information NND also increases, and when the true viscosity of the ink decreases, the estimated viscosity indicated by the viscosity information NND also tends to decrease. Therefore, in the first embodiment, determination reference information HDI on the determination reference for determining the presence or absence of a discharge abnormality of the nozzle N is received from the user U. Even when the estimation accuracy of the estimated viscosity deteriorates by appropriately setting the determination reference information HDI by the user U according to the difference between the true viscosity of the ink and the estimated viscosity, the deterioration of the determination accuracy of the presence or absence of a discharge abnormality can be suppressed. For example, when the estimated viscosity is higher than the true viscosity of the ink, it is possible to suppress deterioration of the determination accuracy of the presence or absence of a discharge abnormality by setting the determination reference to be high. When the estimated viscosity is lower than the true viscosity of the ink, it is possible to suppress deterioration of the determination accuracy of the presence or absence of a discharge abnormality by setting the determination reference to be low.

1-10. Regarding Selection of Appropriate Complementary Processing

Further, in a state where it is determined that the nozzle N has a discharge abnormality, when the head manufacturer incorporates the liquid discharge head 110 manufactured by the head manufacturer itself into the ink jet printer 100, the characteristics of the ink used in the ink jet printer 100 and the characteristics of the printer main body are also known to the head manufacturer, and thus it is possible to uniquely determine which of the plurality of complementary processing is the most suitable. Here, the optimum complementary processing is, for example, complementary processing in which an image having the highest quality is obtained from the viewpoint of the user U among the plurality of complementary processing. A plurality of viewpoints of the user U can be considered. For example, there may be a viewpoint that an image in which dots of other colors are formed is an image having a higher quality than that of an image in which dots are missing, and there may be a viewpoint that an image in which dots are missing is an image having a higher quality than an image in which dots of other colors are formed. Further, the optimum complementary processing is not limited to the complementary processing in which the image having the highest quality is obtained, and for example, may be the complementary processing in which the period required for obtaining the image is the shortest. The user U may determine one complementary processing as the optimum complementary processing, or may determine a plurality of complementary processing as the optimum complementary processing.

In the ink jet printers 100_1 to 100_3, the head manufacturer cannot uniquely determine the characteristics of the ink used in the ink jet printer 100 and the characteristics of the printer main body. For example, when an end user uses the ink jet printer 100, in the ink jet printer 100 used for industrial purposes, a wide variety of inks may be used for each end user, and even when the end user is the same depending on the situation, different inks may be used. Therefore, only the end user can determine the optimum complementary processing among the plurality of complementary processing. The end user notifies the head manufacturer and the printer manufacturer of the type of ink to be used, and the head manufacturer and the printer manufacturer can determine the optimum complementary processing by setting appropriate complementary processing, but an enormous man-hour load is generated. Further, even when the ink jet printer 100 is used by a worker belonging to the printer manufacturer, since the characteristics of the ink used for the ink jet printer 100 and the characteristics of the printer main body are unknown to the head manufacturer, it is not possible to determine the optimum complementary processing.

Therefore, in the first embodiment, the quality of the image formed on the medium PP can be improved by receiving complementary processing designation information CSI indicating the appropriate complementary processing designated by the user U. The complementary processing designation information CSI will be described later with reference to FIG. 14.

1-11. Function of Liquid Discharge System 10

The functions of the liquid discharge system 10 will be described with reference to FIGS. 14 to 17.

Figure 14:
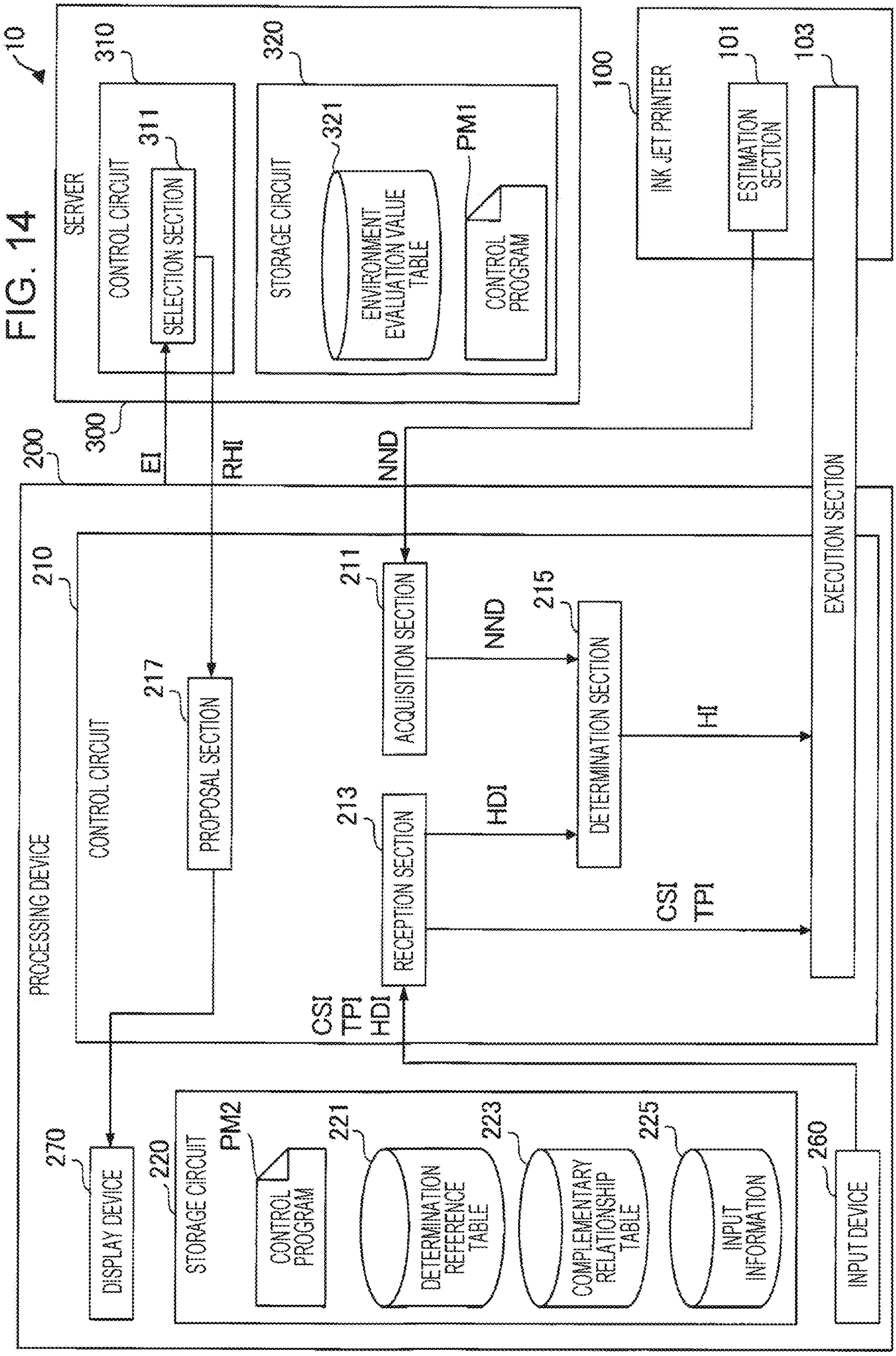
FIG. 14 is a diagram illustrating a function of the liquid discharge system.

FIG. 14 is a diagram illustrating a function of the liquid discharge system 10. As illustrated in FIG. 14, the control circuit 310 of the server 300 reads the control program PM1 from the storage circuit 320, and functions as a selection section 311 by executing the read control program PM1. The control circuit 210 of the processing device 200 reads the control program PM2 from the storage circuit 220 and executes the read control program PM2 to function as an acquisition section 211, a reception section 213, a determination section 215, and a proposal section 217. The ink jet printer 100 functions as an estimation section 101. Further, in cooperation with the ink jet printer 100 and the processing device 200, the function as the execution section 103 is realized.

Further, in order to execute a series of operations of the liquid discharge system 10, as illustrated in FIG. 14, the storage circuit 220 stores a determination reference table 221, a complementary relationship table 223, and an input information 225, and the storage circuit 320 stores an environment evaluation value table 321.

The selection section 311, the acquisition section 211, the reception section 213, the determination section 215, the proposal section 217, the estimation section 101, and the execution section 103 will be described with reference to the flow charts illustrated in FIGS. 15 to 17.

Figure 15:
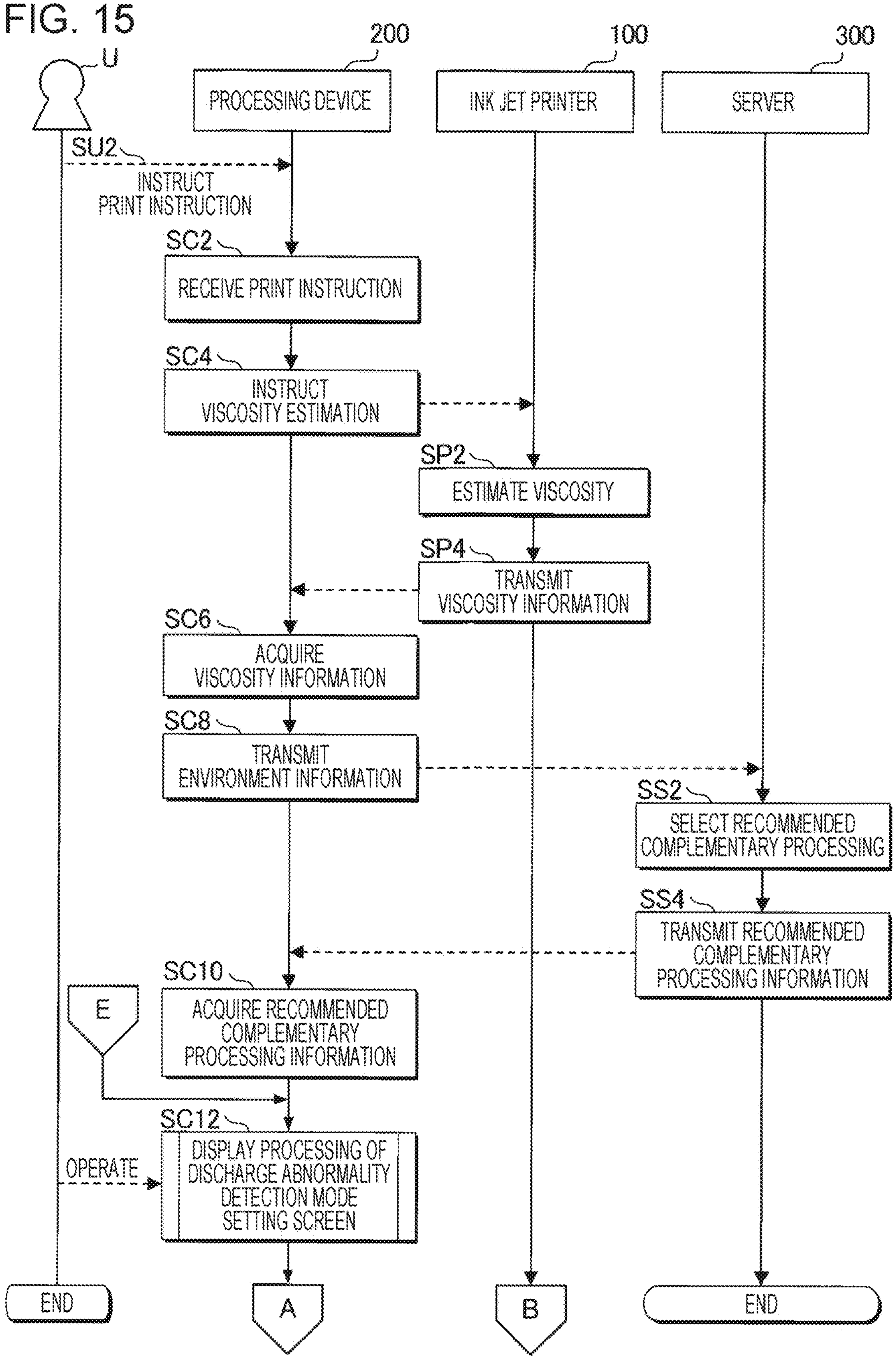
FIG. 15 is a flow chart illustrating a series of operations of the liquid discharge system.
Figure 16:
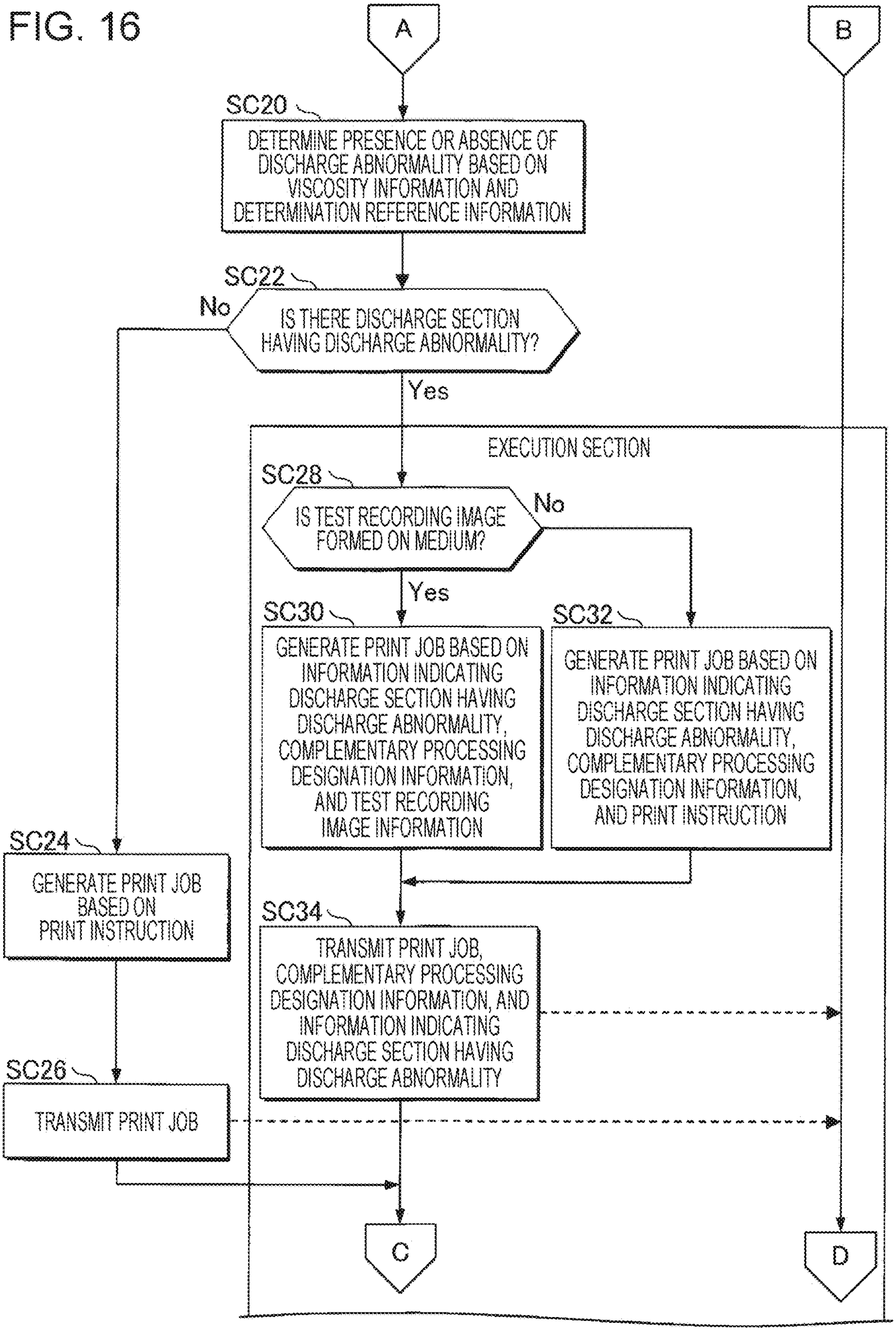
FIG. 16 is a flow chart illustrating a series of operations of the liquid discharge system.
Figure 17:
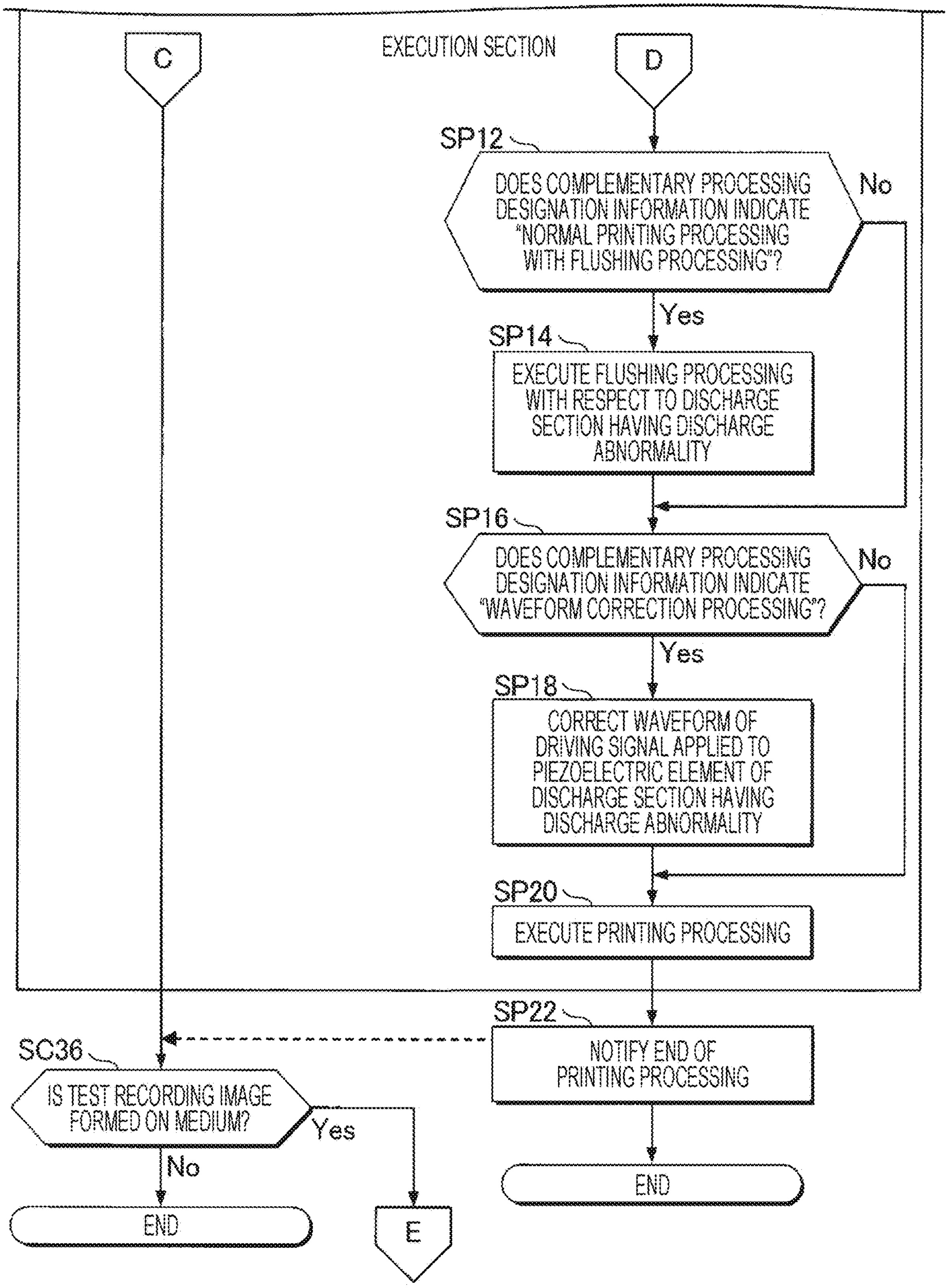
FIG. 17 is a flow chart illustrating a series of operations of the liquid discharge system.

FIGS. 15, 16, and 17 are flow charts illustrating a series of operations of the liquid discharge system 10. As illustrated in FIG. 15, in step SU2, the user U notifies the processing device 200 of the print instruction PI by operating the input device 260. For example, the user U notifies the processing device 200 of the operation information indicating the print instruction PI by pressing the "print" button in the window displayed on the display device 270 with a mouse. In the present embodiment, in the above-described window, there is a widget indicating whether or not to display the discharge abnormality detection mode setting screen CD capable of receiving the determination reference information HDI and the complementary processing designation information CSI, and it is assumed that this widget is turned on.

In step SC2, the control circuit 210 of the processing device 200 receives the print instruction PI. When the print instruction PI is received, the control circuit 210 transmits the viscosity estimation instruction to the ink jet printer 100 in step SC4. The ink jet printer 100 that functions as the estimation section 101 executes viscosity estimation processing for the discharge sections D[1] to D[2M] in step SP2, and transmits the viscosity information NND for each of the discharge sections D[1] to D[2M] to the processing device 200 in step SP4. After the processing of step SP4 is ended, the control circuit 210 that functions as the acquisition section 211 acquires the viscosity information NND for each of the discharge sections D[1] to D[2M] in step SC6.

When the print instruction PI is received, the control circuit 210 transmits environmental information EI on the environment in which the user U uses the liquid discharge head 110 to the server 300 in step SC8. In FIG. 15, the processing device 200 executes step SC8 after the processing of step SC6 is ended. However, step SC8 may be executed after step SC2, may be executed before step SC4, or may be executed at the same time as step SC4.

The environmental information EI includes, for example, any one piece of or a plurality of pieces of information among information on ink discharged by the liquid discharge head 110, information on the medium PP on which the liquid discharge head 110 forms an image, information indicating an environmental temperature of the liquid discharge head 110, and the serial number of the liquid discharge head 110. The information on the ink is, for example, one or both of the information indicating the color of the ink and the information indicating the manufacturer of the ink. The information on the medium PP is, for example, information indicating the type of the medium PP. Furthermore, the information on the medium PP may include information indicating the thickness of the medium PP. The environmental information EI is generated, for example, by operating the input device 260 of the user U. However, the environmental information EI may be generated by an operation other than the operation of the input device 260 of the user U. For example, when the ink jet printer 100 has a temperature sensor, the ink jet printer 100 may transmit information indicating a temperature measured by the temperature sensor to the processing device 200, and the control circuit 210 of the processing device 200 may transmit the received information to the server 300 as the information indicating the environmental temperature.

When the environmental information EI is received, in step SS2, the selection section 311 of the server 300 selects a part of the complementary processing recommended to be executed by the execution section 103 among the plurality of complementary processing based on the environmental information EI. Hereinafter, a part of the complementary processing recommended to be executed by the execution section 103 may be described as "recommended complementary processing". For example, as illustrated in FIG. 14, the selection section 311 selects the recommended complementary processing with reference to the environment evaluation value table 321 stored in the storage circuit 320.

FIG. 18 is a table illustrating an example of the contents of the environment evaluation value table 321. The environment evaluation value table 321 is information for storing evaluation values indicating a degree of recommendation for each of the plurality of complementary processing for various types of information indicated by the environmental information EI. In the example of FIG. 18, it is described that, in the environment evaluation value table 321, the information on the ink is the information indicating the color of the ink and the information indicating the manufacturer of the ink, and the information on the medium PP is the information indicating the type of the medium PP. [° C.] illustrated in FIG. 18 means a temperature in degrees Celsius. a11 to a15, a21 to a25, b11 to b15, and c11 to c15 displayed in FIG. 18 are integers indicating evaluation values. For example, when the ink is cyan ink manufactured by company A, the evaluation value of the waveform correction processing is all, the evaluation value of the other color complementary processing is a12, the evaluation value of the other pass complementary processing is a13, the evaluation value of the adjacent complementary processing is a14, and the normal printing processing with flushing processing is a15. The environment evaluation value table 321 is generated by the head manufacturer.

As a specific method for setting the evaluation value, the head manufacturer sets a higher evaluation value for the correction processing in which an image having a higher quality can be obtained. As an example of the information on ink, for example, in the adjacent complementary processing, ink is discharged from the nozzle N adjacent to the abnormal nozzle N-S. Therefore, even when the adjacent complementary processing is executed when the ink has a property of being less likely to bleed, the ink is discharged to the vicinity of the position where the abnormal nozzle N-S is supposed to land, and thus dot omission at the position where the abnormal nozzle N-S is supposed to land becomes conspicuous. On the other hand, when the adjacent complementary processing is executed when the ink has a property of easily bleeding, the landed ink bleeds in the vicinity of the position where the abnormal nozzle N-S is supposed to land. Therefore, dot omission at the position where the abnormal nozzle N-S is supposed to land is less conspicuous. Therefore, for example, when the cyan ink manufactured by company A has a property of easily bleeding as compared with the cyan ink manufactured by company B, the head manufacturer sets a14, which is an evaluation value of the adjacent complementary processing of the cyan ink manufactured by company A, to be higher than a24, which is an evaluation value of the adjacent complementary processing of the cyan ink manufactured by company A.

Regarding the information on the medium PP and the environmental temperature, the head manufacturer also sets a higher evaluation value for the correction processing in which an image having a higher quality can be obtained. For example, depending on the type of medium PP, the degree of color development may differ even when the same ink is discharged. In the medium PP having a good degree of color development, for example, since there is a possibility that the user U emphasizes the degree of color development, the evaluation value of the other color complementary processing may be set low. In addition, with respect to the environmental temperature, in general, as the temperature of the liquid rises, the viscosity of the liquid decreases, and the bleeding tends to be easy. Since the temperature of the ink tends to be higher as the environmental temperature is higher, the head manufacturer may set an evaluation value of the adjacent complementary processing higher as the environmental temperature is higher.

Further, although not illustrated in FIG. 18, the head manufacturer may set a higher evaluation value for the correction processing in which an image having a higher quality can be obtained, depending on the serial number of the liquid discharge head 110 as well. Since the shape of the pressure chamber CV and the like varies due to the assembly accuracy of the liquid discharge head 110 at the time of manufacturing and the dimensional accuracy of the parts, even when it is assumed that the same driving signal Com is applied to the same liquid discharge head 110, the discharge amount may be different. For example, for the liquid discharge head 110 in which the discharge amount of ink is smaller than the original discharge amount, the discharge abnormality may be solved by correcting the driving signal Com such that the potential difference becomes large. The head manufacturer sets a high evaluation value of the waveform correction processing for the liquid discharge head 110 in which the discharge amount of the ink is smaller than the original discharge amount.

The selection section 311 totals the evaluation values for various types of information indicated by the environmental information EI for each complementary processing, and selects the complementary processing in which the total of the evaluation values is equal to or greater than a predetermined threshold value as the recommended complementary processing. The predetermined threshold value is set by the head manufacturer. The selection section 311 may select one complementary processing as the recommended complementary processing, or may select a plurality of complementary processing as the recommended complementary processing. For example, when the information on the ink included in the environmental information EI indicates cyan ink manufactured by Company A, the information on the medium PP included in the environmental information EI indicates printing paper, and the information indicating the environmental temperature indicates less than 10° C., the selection section 311 calculates the evaluation value of the waveform correction processing as a11+b11+c11.

Although not illustrated in FIG. 18, the selection section 311 may increase or decrease the total evaluation value for the specific complementary processing by combining various types of information indicated by the environmental information EI. For example, when the liquid discharge head 110 uses a plurality of types of inks having similar colors, the selection section 311 may increase the total evaluation value of the other color complementary processing.

After the processing in step SS2 is ended, the control circuit 310 controls the communication device 380 in step SS4 to transmit recommended complementary processing information RHI indicating the recommended complementary processing to the processing device 200. After the processing in step SS4 is ended, in step SC10, the control circuit 210 of the processing device 200 acquires the recommended complementary processing information RHI from the server 300.

When the viscosity information NND and the recommended complementary processing information RHI for each of the discharge sections D[1] to D[2M] are received, the control circuit 210 of the processing device 200 executes the display processing of the discharge abnormality detection mode setting screen CD in step SC12. The display processing of the discharge abnormality detection mode setting screen CD will be described with reference to FIGS. 19 and 20.

Figure 19:
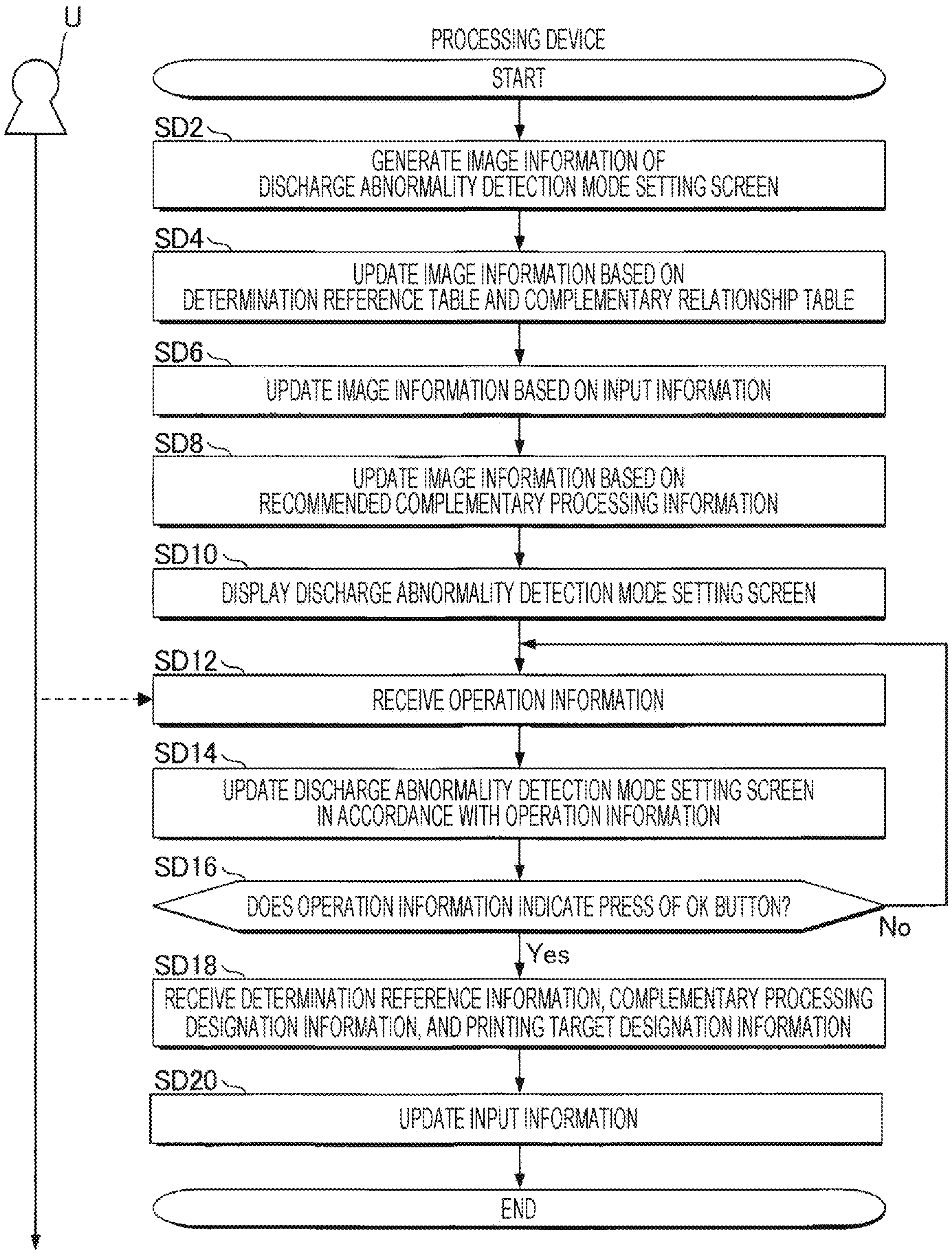
FIG. 19 is a flow chart illustrating an example of display processing of a discharge abnormality detection mode setting screen.
Figure 20:
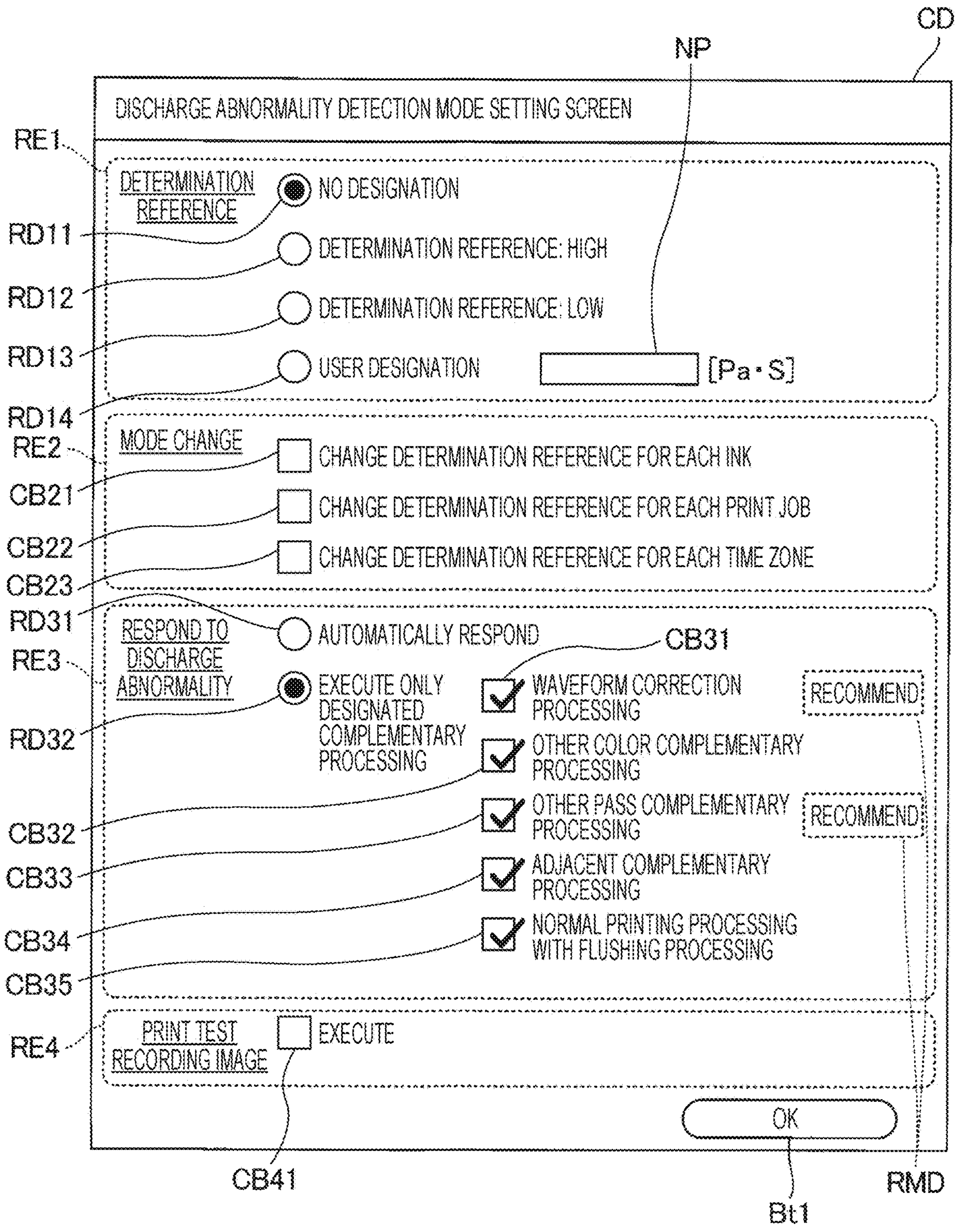
FIG. 20 is a view illustrating an example of the discharge abnormality detection mode setting screen.

FIG. 19 is a flow chart illustrating an example of display processing of the discharge abnormality detection mode setting screen CD. FIG. 20 is a diagram illustrating an example of the discharge abnormality detection mode setting screen CD. The display processing of the discharge abnormality detection mode setting screen CD is a series of processing for displaying the discharge abnormality detection mode setting screen CD on the display device 270.

In step SD2, the control circuit 210 generates image information indicating the discharge abnormality detection mode setting screen CD. As illustrated in FIG. 20, the discharge abnormality detection mode setting screen CD includes a region RE1 where the user U is allowed to designate a determination reference for determining that the discharge state is abnormal, a region RE2 where the user U is allowed to designate a mode for changing this determination reference under specific conditions, a region RE3 where the user U is allowed to designate the response when a discharge abnormality occurs, a region RE4 where the user U is allowed to designate whether or not to print the test recording image, and an OK button Bt1.

The region RE1 is a region for receiving the determination reference information HDI. The determination reference information HDI is information on the determination reference for determining that the discharge state of the nozzle N is abnormal. The determination reference information HDI may be the threshold value itself with respect to the estimated viscosity of the discharge section D or may be the information indicating the degree of the magnitude of the threshold value with respect to the estimated viscosity of the discharge section D, as the information on the determination reference.

The region RE1 includes a radio button RD11 indicating that the determination reference is not designated, a radio button RD12 indicating that a high determination reference is designated, a radio button RD13 indicating that a low determination reference is designated, a radio button RD14 indicating that the user U designates the determination reference, and an input field NP in which the user U inputs a threshold value as a determination reference. In the input field NP, a threshold value of viscosity as a determination reference is input. The unit of viscosity is Pascal second. In FIG. 20, the Pascal second is described as [Pa·S].

The region RE2 has a check box CB21 indicating that the determination reference is changed for each ink, a check box CB22 indicating that the determination reference is changed for each print job JB, and a check box CB23 indicating that the determination reference is changed for each time zone. In the present embodiment, the time zone includes a start time and an end time indicated by a 24-hour system. The start time and the end time mean the time in the day. For example, the start time is 11 o'clock and does not include the date.

The region RE3 includes a radio button RD31 indicating that the response to the discharge abnormality is automatically executed, and a radio button RD32 indicating that only the designated complementary processing is executed. Further, the region RE3 includes a check box CB31 indicating to execute the waveform correction processing when the discharge abnormality occurs, a check box CB32 indicating to execute the other color complementary processing when the discharge abnormality occurs, a check box CB33 indicating to execute the other pass complementary processing when the discharge abnormality occurs, a check box CB34 indicating to execute the adjacent complementary processing when the discharge abnormality occurs, and a check box CB35 indicating to execute the normal printing processing with flushing processing when the discharge abnormality occurs.

The region RE4 includes a check box CB41 indicating to print the test recording image. The test recording image is an image for the user U to confirm an image formed on the medium PP by the complementary processing indicated by the complementary processing designation information CSI when the discharge section D is determined to have the discharge abnormality by the determination reference information HDI. By confirming the test recording image, the user U can confirm the degree of quality of image by the complementary processing indicated by the complementary processing designation information CSI. The test recording image is an image indicated by the test recording image information stored in advance in the storage circuit 220. The size of the test recording image is preferably smaller than the size of the image indicated by the image data identified by the print instruction PI. The content of the test recording image may be any content, but in order to confirm the discharge states of all the nozzles N of the liquid discharge head 110, for example, the image is preferably formed by discharging ink from all the nozzles N of the liquid discharge head 110. However, the test recording image may be a partial image of the image indicated by the image data identified by the print instruction PI.

After the processing of step SD2 is ended, in step SD4, the control circuit 210 updates the image information of the discharge abnormality detection mode setting screen CD based on the determination reference table 221 and the complementary relationship table 223. The determination reference table 221 will be described with reference to FIG. 21, and the complementary relationship table 223 will be described with reference to FIG. 22.

FIG. 21 is a table illustrating an example of contents of the determination reference table 221. The determination reference table 221 stores the threshold value for the estimated viscosity and the initial selection information indicating whether or not the determination reference is selected in the initial state in association with each other for each determination reference. The determination reference table 221 is information on each of the plurality of determination references. As illustrated in FIG. 21, the determination reference table 221 has one record for one determination reference.

The determination reference table 221 includes a record RC11 corresponding to a case where no determination reference is designated, a record RC12 corresponding to a case where a high determination reference is designated, a record RC13 corresponding to a case where a low determination reference is designated, and a record RC14 corresponding to a case where the user U designates a determination reference. For example, the record RC11 indicates that, when the determination reference is not designated, the threshold value for the estimated viscosity is a threshold value μth1 and the determination reference is the determination reference used in the initial state. Further, the record RC12 indicates that, when a high determination reference is designated, the threshold value for the estimated viscosity is a threshold value μth2, and the determination reference is not the determination reference used in the initial state. Further, the record RC12 indicates that, when a low determination reference is designated, the threshold value for the estimated viscosity is a threshold value μth3, and the determination reference is not the determination reference used in the initial state. In the following description, the threshold value μth1, the threshold value μth2, and the threshold value μth3 may be collectively referred to as a threshold value μth without distinguishing the threshold values μth1, μth2, and μth3. Regarding the magnitude relationship of the threshold value μth1, the threshold value μth2, and the threshold value μth3, the threshold value μth3 is the largest, the threshold value μth1 is the next largest, and the threshold value μth2 is the smallest. The initial selection information for each determination reference is an example of "information on the determination reference used in the initial state".

In step SD4, the control circuit 210 selects the determination reference radio button selected in the initial state with reference to the initial selection information of the determination reference table 221 among the radio buttons RD11, RD12, RD13, and RD14. In the example of FIG. 21, the control circuit 210 updates the image information of the discharge abnormality detection mode setting screen CD such that the discharge abnormality detection mode setting screen CD on which the radio button RD11 is selected is displayed.

FIG. 22 is a table illustrating an example of the contents of complementary relationship table 223. The complementary relationship table 223 stores automatic execution information indicating whether or not the complementary processing is executed at the time of automatic execution, and initial selection information indicating whether or not the complementary processing is selected in the initial state in association with each other for each complementary processing. As illustrated in FIG. 22, the complementary relationship table 223 has one record for one complementary processing.

The complementary relationship table 223 includes a record RC21 related to the waveform correction processing, a record RC22 related to the other color complementary processing, a record RC23 related to the other pass complementary processing, a record RC24 related to the adjacent complementary processing, and a record RC25 related to the normal printing processing with flushing processing.

In step SD4, the control circuit 210 selects the check box for the complementary processing selected in the initial state with reference to the automatic execution information in the complementary relationship table 223 for the check boxes CB31, CB32, CB33, CB34, and CB35. In the example of FIG. 22, it is illustrated that all the complementary processing registered in the complementary relationship table 223 are the complementary processing selected in the initial state. Therefore, the control circuit 210 updates the image information of the discharge abnormality detection mode setting screen CD such that the discharge abnormality detection mode setting screen CD in which the check boxes CB31, CB33, CB34, and CB35 are selected is displayed.

In step SD6, the control circuit 210 updates the image information indicating the discharge abnormality detection mode setting screen CD based on the input information 225 stored in the storage circuit 220. The input information 225 indicates the past input contents of the user U. For example, the input information 225 includes first past information indicating a check box selected in the past by the user U among the radio buttons RD11 to RD14, second past information indicating a check box selected by the user U in the past among the radio buttons RD31 and RD32, third past information indicating that which of the check boxes CB21 to CB23, CB31 to CB35, and CB41 is selected or not by the user U in the past, and fourth past information indicating the numerical value input in the input field NP. For example, the control circuit 210 selects a check box indicated by the first past input information, a check box indicated by the second past input information, and a check box indicating that the third past information is selected in the past, and sets the numerical value indicated by the fourth past information in the input field NP. When the input information 225 is not stored in the storage circuit 220, the control circuit 210 does not execute the processing of step SD6.

After the processing of step SD6 is ended, the proposal section 217 proposes the recommended complementary processing to the user U. Specifically, in step SD8, the control circuit 210 that also functions as the proposal section 217 updates the image information indicating the discharge abnormality detection mode setting screen CD based on the recommended complementary processing information RHI indicating the recommended complementary processing. FIG. 20 illustrates an example in which the recommended complementary processing information RHI shows the waveform correction processing and the other pass complementary processing. In FIG. 20, a "recommended" character string RMD indicating that the waveform correction processing and the other pass complementary processing are recommended is displayed in the right direction with respect to the check boxes CB31 and CB33. However, the aspect proposed to the user U is not limited to the aspect of FIG. 20. For example, when the recommended complementary processing information RHI indicates the waveform correction processing, the proposal section 217 may display the character string "waveform correction processing is recommended".

After the processing of step SD8 is ended, in step SD10, under the control of the control circuit 210, the display device 270 displays the discharge abnormality detection mode setting screen CD based on the image information updated by each processing of step SD4, step SD6, and step SD8. The image indicated by the image information updated in step SD6 is an example of an "updated image". Then, in step SD12, the control circuit 210 receives the operation information corresponding to the operation of the user U. After the processing in step SD12 is ended, the control circuit 210 updates the discharge abnormality detection mode setting screen CD in step SD14 in accordance with the operation information. Specific update contents in accordance with the operation information will be described.

When the operation information indicates an operation of selecting one of the radio buttons RD11 to RD14, the control circuit 210 updates the discharge abnormality detection mode setting screen CD such that a state where the selected radio button is pressed and a state where the remaining pressed radio buttons are released are achieved. Further, when the operation information indicates an operation of selecting the radio button RD14, the control circuit 210 updates the discharge abnormality detection mode setting screen CD such that the input field NP is changed to be inputtable. When the operation information indicates an operation of selecting one of the radio buttons RD31 to RD32, the control circuit 210 updates the discharge abnormality detection mode setting screen CD such that a state where one selected radio button is pressed and a state where the other pressed radio buttons are released are achieved. When the operation information indicates an operation of selecting one of the check boxes CB21 to CB23, CB31 to CB35, and CB41, the control circuit 210 updates the discharge abnormality detection mode setting screen CD such that a state where the selected check box is pressed is achieved. When the operation information indicates an operation of deselecting one of the check boxes CB21 to CB23 and CB31 to CB35, the discharge abnormality detection mode setting screen CD is updated such that a state where the deselected pressed check box is released is achieved.

As described above, it is illustrated that all the complementary processing registered in the complementary relationship table 223 are the complementary processing selected in the initial state. Therefore, deselecting the check boxes CB31 to CB35 can be said to select the complementary processing for which the user U does not permit the execution by the execution section 103.

Further, when the operation information indicates an operation of selecting the check box CB21, the control circuit 210 updates the discharge abnormality detection mode setting screen CD such that the region RE1 changes a determination reference for each ink to be inputtable. An example of a screen on which a determination reference for each ink can be input will be described with reference to FIG. 23.

Figure 23:
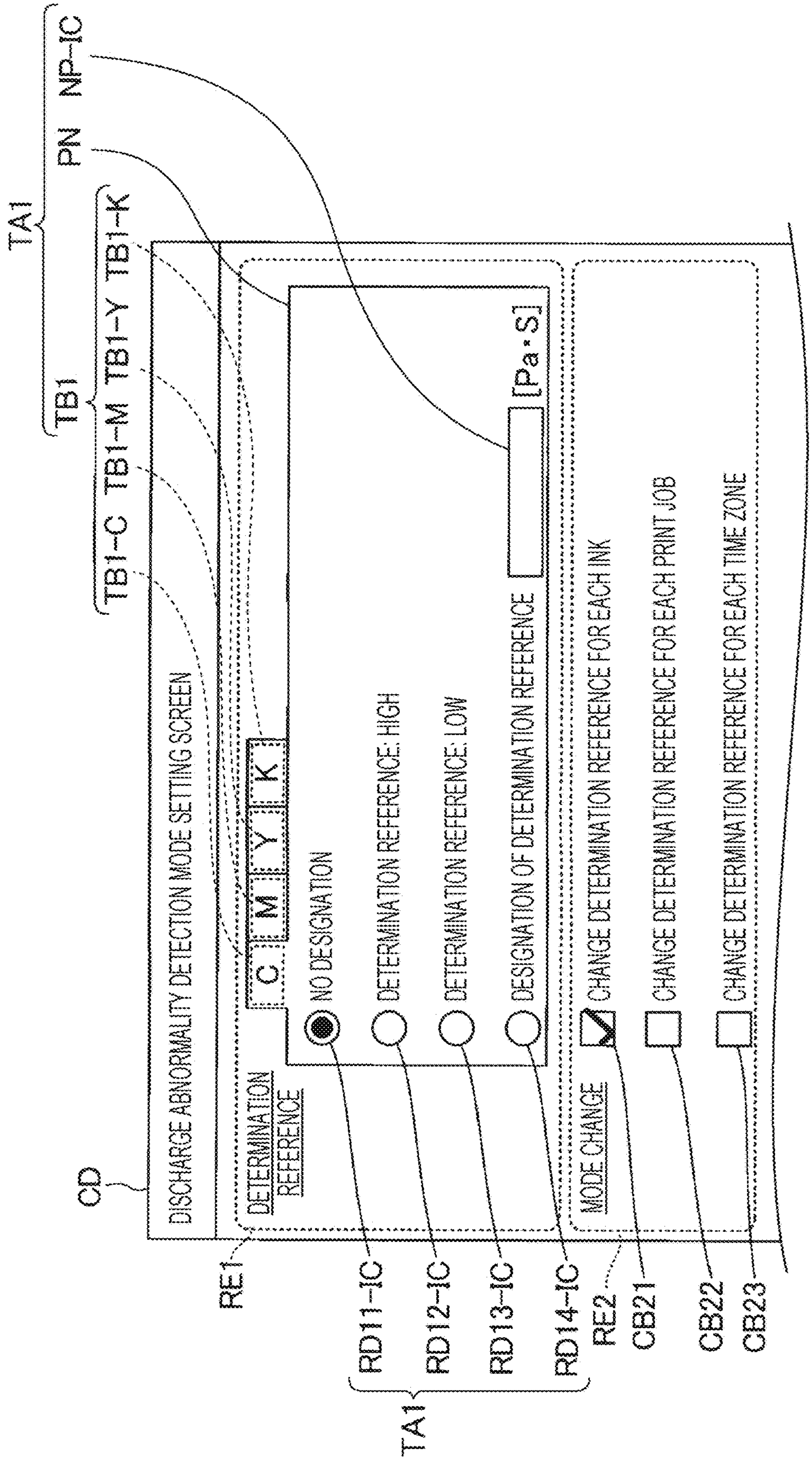
FIG. 23 is a view illustrating an example of a part of the discharge abnormality detection mode setting screen in which a determination reference for each ink can be input.

FIG. 23 is a diagram illustrating an example of a part of the discharge abnormality detection mode setting screen CD in which the determination reference for each ink can be input. When the check box CB21 is selected, a tab control TA1 is displayed. The tab control TA1 has a tab TB1 provided for each ink and one panel PN. In the example of FIG. 23, the tab control TA1 includes a tab TB1-C where a determination reference of the discharge section D for discharging cyan ink can be input, a tab TB1-M where a determination reference of the discharge section D for discharging magenta ink can be input, a tab TB1-Y where a determination reference of the discharge section D for discharging yellow ink can be input, and a tab TB1-K where a determination reference of the discharge section D for discharging black ink can be input, as four tabs TB1 provided for each ink.

The tab control TA1 can input the determination reference of the ink corresponding to the tab selected from the four tabs TB1. In the example of FIG. 23, the tab TB1-C is selected. Therefore, in the example of FIG. 23, the tab control TA1 includes a radio button RD11-IC indicating that the determination reference for cyan ink is not designated, a radio button RD12-IC indicating that the determination reference for cyan ink is a high determination reference, a radio button RD13-IC indicating that the determination reference for cyan ink is a low determination reference, a radio button RD14-IC indicating that the determination reference for cyan ink is designated by the user U, and an input field NP-IC in which the user U inputs a threshold value which is a determination reference for cyan ink.

Although the tab control TA1 is hidden in the example of FIG. 23, the tab control TA1 includes a radio button for designating the determination reference corresponding to each of the tab TB1-M, the tab TB1-Y, and the tab TB1-K, and an input field for inputting a threshold value. Hereinafter, the radio buttons indicating that the determination reference for each of the cyan ink, magenta ink, yellow ink, and black ink is not designated may be collectively referred to as a radio button RD11-I. Similarly, the radio buttons indicating that the determination reference for each of the cyan ink, magenta ink, yellow ink, and black ink is a high determination reference may be collectively referred to as a radio button RD12-I. The radio buttons indicating that the determination reference is a low determination reference for each of the cyan ink, magenta ink, yellow ink, and black ink may be collectively referred to as a radio button RD13-I. The radio buttons indicating that the determination reference for each of the cyan ink, magenta ink, yellow ink, and black ink is designated by the user U may be collectively referred to as a radio button RD14-I. An input field in which the user U inputs a threshold value as a determination reference for each of cyan ink, magenta ink, yellow ink, and black ink may be collectively referred to as an input field NP-I.

The description will be made referring again to step SD14 of FIG. 19. When the operation information indicates an operation for selecting the check box CB22, no particular processing is performed except for updating the discharge abnormality detection mode setting screen CD such that the check box CB22 is selected. However, when the OK button Bt1 is pressed in a state where the check box CB22 is selected, when the user U notifies the processing device 200 of the print instruction PI after this processing, and when the widget indicating whether or not to display the discharge abnormality detection mode setting screen CD is turned off, the screen for setting each item in the region RE1 is displayed. Since a screen for setting each item of the region RE1 is displayed after the print instruction PI, the print job JB is generated by the processing of step SC24 and one of the processing of step SC30 and step SC32, which will be described later, and thus the determination reference can be changed each time the print job JB is generated.

When the operation information indicates an operation of selecting the check box CB23, the control circuit 210 updates the discharge abnormality detection mode setting screen CD such that the region RE1 changes a determination reference for each time zone to be inputtable. An example of a screen on which a determination reference for each time zone can be input will be described with reference to FIG. 24.

Figure 24:
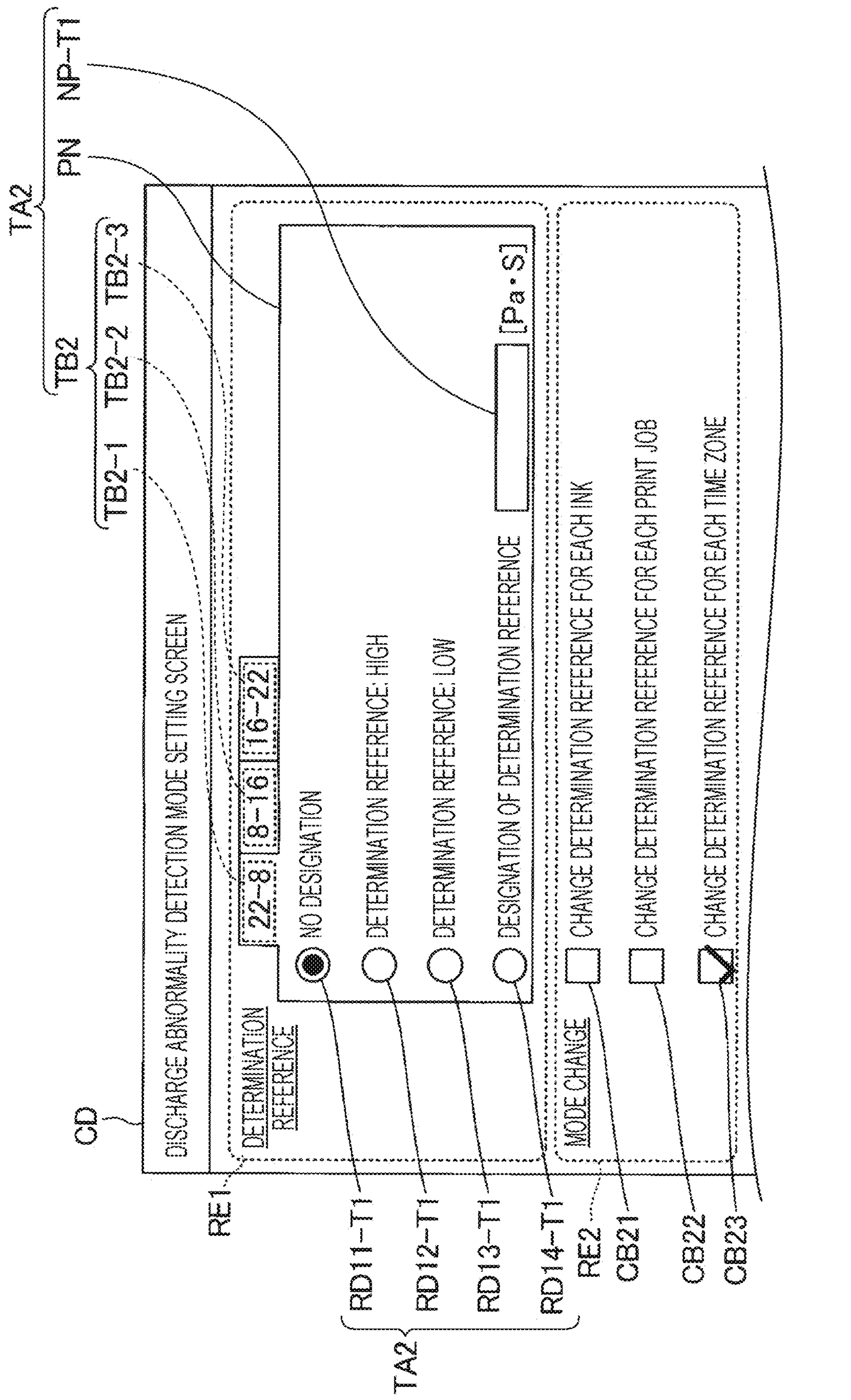
FIG. 24 is a view illustrating an example of a part of the discharge abnormality detection mode setting screen in which a determination reference for each time zone can be input.

FIG. 24 is a diagram illustrating an example of a part of the discharge abnormality detection mode setting screen CD in which the determination reference for each time zone can be input. When the check box CB23 is selected, a tab control TA2 is displayed. The tab control TA2 has a tab TB2 provided for each time zone and one panel PN. In the example of FIG. 24, the tab control TA2 includes a tab TB2-1 where a determination reference of the discharge section D from 22:00 to 8:00 can be input, a tab TB2-2 where a determination reference of the discharge section D from 8:00 to 16:00 can be input, and a tab TB2-3 where the determination reference of the discharge section D from 16:00 to 22:00 can be input, as three tabs TB2 provided for each time zone. In the example of FIG. 24, an aspect in which a time zone of a day is divided into three time zones and a determination reference corresponding to each of the three divided time zones can be input, is illustrated, but the present disclosure is not limited to this. For example, there may be an aspect in which a determination reference corresponding to each of the two time zones obtained by dividing the time zone of the day can be input, or an aspect in which four or more determination references corresponding to each of the time zones can be input.

The tab control TA2 can input the determination reference of the ink corresponding to the tab selected from the three tabs TB2. In the example of FIG. 24, the tab TB2-1 is selected. Therefore, in the example of FIG. 24, the tab control TA2 includes a radio button RD11-T1 indicating that the determination reference from 22:00 to 8:00 is not designated, a radio button RD12-T1 indicating that the determination reference from 22:00 to 8:00 is a high determination reference, a radio button RD13-T1 indicating that the determination reference from 22:00 to 8:00 is a low determination reference, a radio button RD14-T1 indicating that the determination reference from 22:00 to 8:00 is designated by the user U, and an input field NP-T1 in which the user U inputs a threshold value which is a determination reference from 22:00 to 8:00.

Although the tab control TA2 is not displayed in the example of FIG. 24, the tab control TA2 includes a radio button for designating the determination reference corresponding to each of the tab TB2-2 and the tab TB2-3, and an input field for inputting a threshold value. Hereinafter, the radio buttons indicating that the determination reference for each of the plurality of time zones is not designated may be collectively referred to as a radio button RD11-T. Similarly, the radio buttons indicating that the determination reference for each of the plurality of time zones is a high determination reference may be collectively referred to as a radio button RD12-T. The radio buttons indicating that the determination reference for each of the plurality of time zones is a low determination reference may be collectively referred to as a radio button RD13-T. The radio buttons indicating that the determination reference for each of the plurality of time zones is designated by the user U may be collectively referred to as a radio button RD14-T. An input field in which the user U inputs a threshold value that is a determination reference for each of the plurality of time zones may be collectively referred to as an input field NP-T.

In the present embodiment, it is assumed that the check boxes CB21 and CB23 are not selected at the same time.

The description will be made referring again to step SD14 of FIG. 19. When the operation information indicates an operation for selecting the check box CB22, no particular processing is performed except for updating the discharge abnormality detection mode setting screen CD such that the check box CB22 is selected.

After the processing in step SD14 is ended, the control circuit 210 determines whether or not the operation information indicates the pressing of the OK button Bt1 in step SD16. When the determination result in step SD16 is negative, the control circuit 210 returns the processing to step SD12. When the determination result in step SD16 is affirmative, the control circuit 210 that functions as the reception section 213 receives the determination reference information HDI, the complementary processing designation information CSI, and printing target designation information TPI based on the current state of the discharge abnormality detection mode setting screen CD in step SD18. The printing target designation information TPI is information for designating an image to be formed on the medium PP.

The state where the check boxes CB21 and CB23 are not selected will be described. When any of the radio buttons RD11 to RD13 is selected, the reception section 213 receives information indicating the selected radio button as the determination reference information HDI. The information indicating the radio button RD11 is synonymous with the information indicating that the magnitude of the threshold value with respect to the estimated viscosity is medium. The information indicating the radio button RD12 is synonymous with the information indicating that the magnitude of the threshold value with respect to the estimated viscosity is small. The information indicating the radio button RD13 is synonymous with the information indicating that the magnitude of the threshold value with respect to the estimated viscosity is large. When the radio button RD14 is selected and the numerical value is input in the input field NP, the reception section 213 receives the numerical value input in the input field NP as the determination reference information HDI.

The information indicating the radio button selected in the initial state when the OK button Bt1 is pressed without selecting any of the radio buttons RD11, RD12, RD13, and RD14, and the input field NP in the region RE1 by the user U, is received as the determination reference information HDI. The radio button selected in the initial state is selected based on the initial selection information in the determination reference table 221. In the examples of FIGS. 20 and 21, the reception section 213 receives the information indicating the radio button RD11 as the determination reference information HDI.

Next, a state where the check box CB21 is selected will be described. For each of the plurality of types of ink, the reception section 213 receives the information indicating the radio button selected from the radio buttons RD11-I to RD13-I, or the determination reference information HDI including a numerical value input in the input field NP-I. In the following description, the information indicating the radio button selected from the radio buttons RD11-I to RD13-I for one type of ink among the plurality of types of ink, or the numerical value input in the input field NP for the one type of ink is referred to as "ink-specific information". Therefore, in a state where the check box CB21 is selected, the reception section 213 receives the determination reference information HDI including the ink-specific information for each of the plurality of inks.

In addition, a state where the check box CB23 is selected will be described. For each of the plurality of time zones, the reception section 213 receives the information indicating the radio button selected from the radio buttons RD11-T to RD13-T, or the determination reference information HDI including a numerical value input in the input field NP-T. In the following description, the information indicating the radio button selected from the radio buttons RD11-T to RD13-T for one time zone among the plurality of time zones, or the numerical value input in the input field NP for the one time zone is referred to as "time zone-specific information". Therefore, in a state where the check box CB23 is selected, the reception section 213 receives the determination reference information HDI including the time zone-specific information for each of the plurality of time zones.

Further, when the radio button RD31 is selected, the reception section 213 receives the automatic execution information in the complementary relationship table 223 as the complementary processing designation information CSI. For example, in the example of FIG. 22, the reception section 213 receives automatic execution information for automatically executing the waveform correction processing, the other pass complementary processing, the adjacent complementary processing, and the normal printing processing with flushing processing as the complementary processing designation information CSI. In addition, when the radio button RD32 is selected, the reception section 213 receives information indicating the complementary processing corresponding to the check box selected from the check boxes CB31, CB32, CB33, CB34, and CB35 as the complementary processing designation information CSI.

When the OK button Bt1 is pressed in a state where the check box CB41 is selected, the reception section 213 receives the printing target designation information TPI indicating that the test recording image is formed on the medium PP. When the OK button Bt1 is pressed while the check box CB41 is not selected, the printing target designation information TPI indicating that the image indicated by the image data identified by the print instruction PI is formed on the medium PP is received.

After the processing of step SD18 is ended, the control circuit 210 updates the input information 225 based on the current state of the discharge abnormality detection mode setting screen CD in step SD20, and ends a series of processing illustrated in FIG. 19.

The description will be made referring again to FIGS. 15, 16, and 17. After the processing of step SC12 is ended, the control circuit 210 that functions as the determination section 215 determines the presence or absence of a discharge abnormality based on the viscosity information NND acquired in step SC6 and the determination reference information HDI for each of the discharge sections D[1] to D[2M] in step SC20. The control circuit 210 generates determination result information HI[1] to HI[2M] indicating the presence or absence of a discharge abnormality for each of the discharge sections D[1] to D[2M].

A specific example of step SC20 will be described. When the estimated viscosity indicated by the viscosity information NND[m] is equal to or greater than the threshold value based on the determination reference information HDI for all m ranging from 1 to 2M, the determination section 215 determines that the discharge section D[m] has a discharge abnormality, that is, the discharge state of the discharge section D[m] is abnormal. On the other hand, when the estimated viscosity indicated by the viscosity information NND[m] is less than the threshold value based on the determination reference information HDI for all m ranging from 1 to 2M, the determination section 215 determines that the discharge section D[m] does not have a discharge abnormality, that is, the discharge state is normal.

First, a state where the check boxes CB21 and CB23 are not selected will be described. When the determination reference information HDI indicates the radio button RD11, the determination section 215 compares the viscosity information NND of each of the discharge sections D[1] to D[2M] with the threshold value μth1 of the record RC11 in the determination reference table 221. When the determination reference information HDI indicates the radio button RD12, the determination section 215 compares the viscosity information NND of each of the discharge sections D[1] to D[2M] with the threshold value μth2 of the record RC12 in the determination reference table 221. When the determination reference information HDI indicates the radio button RD13, the determination section 215 compares the viscosity information NND of each of the discharge sections D[1] to D[2M] with the threshold value μth3 of the record RC13 in the determination reference table 221. When the determination reference information HDI is a numerical value input in the input field NP, the determination section 215 compares the viscosity information NND of each of the discharge sections D[1] to D[2M] and the numerical value which is the determination reference information HDI.

Next, a state where the check box CB21 is selected will be described. Using the example of FIG. 24, the determination section 215 determines the presence or absence of a discharge abnormality of the discharge section D that discharges cyan ink among the discharge sections D[1] to D[2M] based on the viscosity information NND of the discharge section D and the ink-specific information of cyan ink included in the determination reference information HDI. Further, the determination section 215 determines the presence or absence of a discharge abnormality of the discharge section D that discharges magenta ink among the discharge sections D[1] to D[2M] based on the viscosity information NND of the discharge section D and the ink-specific information of magenta ink included in the determination reference information HDI. The determination section 215 determines the presence or absence of a discharge abnormality of the discharge section D that discharges yellow ink among the discharge sections D[1] to D[2M] based on the viscosity information NND of the discharge section D and the ink-specific information of yellow ink included in the determination reference information HDI. The determination section 215 determines the presence or absence of a discharge abnormality of the discharge section D that discharges black ink among the discharge sections D[1] to D[2M] based on the viscosity information NND of the discharge section D and the ink-specific information of black ink included in the determination reference information HDI.

Next, a state where the check box CB23 is selected will be described. Using the example of FIG. 24, when the current time is included in the time zone from 22:00 to 8:00, for example, the determination section 215 determines the presence or absence of a discharge abnormality of each of the discharge sections D[1] to D[2M] based on the viscosity information NND of the discharge section D and the time zone-specific information for the time zone from 22:00 to 8:00 included in the determination reference information HDI.

After the processing of step SC20 is ended, in step SC22, the control circuit 210 determines whether or not there is the discharge section D having a discharge abnormality with reference to the determination result information HI[1] to HI[2M] of the discharge sections D[1] to D[2M]. When the determination result in step SC22 is negative, in other words, when there is no discharge section D having a discharge abnormality, the control circuit 210 generates the print job JB based on the print instruction PI in step SC24. Then, in step SC26, the control circuit 210 transmits the print job JB to the ink jet printer 100.

When the determination result in step SC22 is affirmative, the execution section 103 executes the complementary processing indicated by the complementary processing designation information CSI received by reception section 213 by steps SC28, SC30, SC32, SC34, SP12, SP14, SP16, SP18, and SP20. Hereinafter, steps SC28, SC30, SC32, SC34, SP12, SP14, SP16, SP18, and SP20 will be described.

When the determination result in step SC22 is affirmative, in step SC28, the control circuit 210 determines whether the printing target designation information TPI indicates that the test recording image is formed on the medium PP.

When the determination result in step SC28 is affirmative, in step SC30, the control circuit 210 generates the print job JB based on the information indicating the discharge section D having a discharge abnormality, the complementary processing designation information CSI indicating the complementary processing, and the test recording image information. The recorded data DP included in the print job JB generated by the processing of step SC30 is data obtained by executing various processing such as RIP processing or color conversion processing on the test recording image information.

When the determination result in step SC28 is negative, in step SC32, the control circuit 210 generates the print job JB based on the information indicating the discharge section D having a discharge abnormality, the complementary processing designation information CSI, and the print instruction PI. The case where the determination result in step SC24 is negative is a case where the printing target designation information TPI indicates that the image indicated by the image data identified by the print instruction PI is formed on the medium PP.

In the processing of step SC30 and step SC32, when the complementary processing designation information CSI indicates one complementary processing of the other color complementary processing, the other pass complementary processing, and the adjacent complementary processing, or a plurality of complementary processing, the control circuit 210 generates the recorded data DP according to the method described with reference to FIG. 13.

After the processing in step SC30 is ended or after the processing in step SC32 is ended, in step SC34, the control circuit 210 transmits the print job JB, the complementary processing designation information CSI, and the information indicating the discharge section D having a discharge abnormality to the ink jet printer 100 via the communication device 240.

After the processing in step SC26 is ended or after the processing in step SC34 is ended, the control circuit 210 waits for the response of the ink jet printer 100.

When the ink jet printer 100 receives the print job JB, the complementary processing designation information CSI, and information indicating the discharge section D having a discharge abnormality, or when the ink jet printer 100 receives the print job JB, in step SP12, the control circuit 170 determines whether or not the complementary processing designation information CSI indicates "normal printing processing with flushing processing". When the ink jet printer 100 is not receiving the complementary processing designation information CSI, the control circuit 170 determines that the determination result in step SP12 is negative. When the determination result in step SP12 is affirmative, in step SP14, the ink jet printer 100 executes the flushing processing on the discharge section D having a discharge abnormality.

When the determination result in step S12 is negative, or after the processing in step SP14 is ended, in step SP16, the control circuit 170 determines whether or not the complementary processing designation information CSI indicates "waveform correction processing". When the ink jet printer 100 is not receiving the complementary processing designation information CSI, the control circuit 170 determines that the determination result in step SP16 is negative. When the determination result in step SP16 is affirmative, in step SP18, the control circuit 170 corrects the waveform of the driving signal Com applied to the piezoelectric element **111*f*** of the discharge section D having a discharge abnormality.

When the determination result in step SP16 is negative, or after the processing in step SP18 is ended, in step SP20, the control circuit 170 executes the printing processing based on the print job JB. After the processing of step SP20 is ended, the control circuit 170 notifies the processing device 200 of the end of the printing processing in step SP22. After the processing of step SP22 is ended, the ink jet printer 100 ends a series of processing from FIG. 15 to FIG. 17.

When the processing device 200 receives the end of the printing processing, in step SC36, the control circuit 210 determines whether or not the printing target designation information TPI indicates whether the test recording image is formed on the medium PP. When the determination result in step SC36 is affirmative, the control circuit 210 returns the processing to step SC12. By returning the processing to step SC12, the discharge abnormality detection mode setting screen CD is displayed again. When the user U confirms the test recording image formed on the medium PP, for example, determines that the determination reference information HDI is correct, and determines that the quality of the image by the complementary processing indicated by the complementary processing designation information CSI is good, the user U releases the selection of the check box CB41. The case where the determination reference information HDI is incorrect is, for example, the following two situations. The first situation is a situation in which the complementary processing is not executed because it is determined that there is no discharge abnormality in spite of the fact that there is a discharge abnormality and the ink is not correctly discharged onto the medium PP. The second situation is a case where the complementary processing is executed because it is determined that there is a discharge abnormality in spite of the fact that there is no discharge abnormality and the ink is correctly discharged onto the medium PP. When the determination reference information HDI is incorrect, the user U changes the radio button selected from the radio buttons RD11, RD12, RD13, and RD14, or changes the numerical value input in the input field NP. When it is determined that the degree of image quality by the complementary processing selected by the user U is poor, the user U changes the check box selected from the check boxes CB31, CB32, CB33, CB34, and CB35. When the determination result in step SC36 is negative, the processing device 200 ends a series of processes from FIGS. 15 to 17.

1-12. Summary of First Embodiment

Hereinafter, by taking as an example the m1-st nozzle N[m1] classified into the first nozzle array Ln1 provided in the liquid discharge head 110, the determination accuracy of the presence or absence of a discharge abnormality and the selection of an appropriate complementary processing will be described respectively. m1 is an integer of 1 or more and M or less. The nozzle N[m1] is an example of a "first nozzle".

1-12-1. Summary of Determination Accuracy of Presence or Absence of Discharge Abnormality As described above, the liquid discharge system 10 according to the first embodiment is a system for controlling the operation of the liquid discharge head 110 provided with the nozzle N[m1] for discharging the first type of ink. The liquid discharge system 10 includes the acquisition section 211 that acquires the viscosity information NND[m1] indicating the discharge state of the nozzle N[m1], the reception section 213 that receives the determination reference information HDI on the determination reference for determining that the discharge state of the nozzle N[m1] is abnormal according to an operation of the user U, and the determination section 215 that determines the presence or absence of a discharge abnormality of the nozzle N[m1] based on the viscosity information NND[m1] and the determination reference information HDI.

In the liquid discharge system 10 according to the first embodiment, even when the accuracy of the estimated viscosity deteriorates by appropriately setting the determination reference information HDI by the user U, the deterioration of the determination accuracy of the presence or absence of a discharge abnormality can be suppressed.

In addition, in the liquid discharge system 10 according to the first embodiment, the storage circuit 220 that stores the determination reference table 221, which is information on each of the plurality of determination references for determining that the discharge state of the nozzle N[m1] is abnormal, is further provided, and the determination reference information HDI is information on a determination reference selected by the user U among the plurality of determination references.

According to the liquid discharge system 10 according to the first embodiment, the user U can select a determination reference from the determination reference table 221 stored in advance in the storage circuit 220.

The determination reference information HDI may be information on the determination reference input by the user U.

According to the liquid discharge system 10 according to the first embodiment, the user U can set a specific determination reference. For example, the user U can fine-tune the determination reference.

In addition, the determination reference table 221 stores the initial selection information on the determination reference used in the initial state among the plurality of determination references for determining that the discharge state of the nozzle N[m1] is abnormal, and the reception section 213 receives the information on the determination reference used in the initial state as the determination reference information HDI when the determination reference used in the initial state is selected by the user U.

According to the liquid discharge system 10 according to the first embodiment, even when the user U does not know an appropriate determination reference for ink, the presence or absence of a discharge abnormality of the nozzle N[m1] can be determined based on the information on the determination reference used in the initial state.

Since the nozzle N[m1] is classified into the first nozzle array Ln1, the first type of ink is discharged. Further, the determination accuracy of the presence or absence of a discharge abnormality will be described using the nozzle N[m2] classified into the second nozzle array Ln2. m2 is an integer of M+1 or more and 2M or less. The liquid discharge head 110 may further be provided with the nozzle N[m2] for discharging the second type of ink different from the first type of ink, and the determination reference information HDI may include the ink-specific information of the first type of ink and the ink-specific information of the second type of ink. The acquisition section 211 further acquires the viscosity information NND[m2] indicating the discharge state of the nozzle N[m2], and the determination section 215 determines the presence or absence of a discharge abnormality of the nozzle N[m1] based on the ink-specific information of the first type of ink and the viscosity information NND[m1], and determines the presence or absence of a discharge abnormality of the nozzle N[m2] based on the ink-specific information of the second type of ink and the viscosity information NND[m2].

Since the characteristics of the ink differ for each ink, it is preferable that a determination reference for determining the presence or absence of a discharge abnormality can also be set for each ink. According to the liquid discharge system 10 according to the first embodiment, the determination accuracy of the presence or absence of a discharge abnormality can be improved as compared with the aspect of determining the presence or absence of a discharge abnormality of the plurality of types of ink using one determination reference information HDI.

Further, the reception section 213 may be able to receive the determination reference information HDI each time the print job JB is generated.

When the number of copies to be printed by the print job JB is large and the determination reference is lowered, it is determined that there is no discharge abnormality, and the complementary processing is not executed even though the discharge abnormality is originally caused, and there is a concern that many images with deteriorated quality are formed. Therefore, the user U is requested to set the determination reference higher as the number of copies to be printed by the print job JB increases. According to the liquid discharge system 10 according to the first embodiment, the determination reference information HDI can be received each time the print job JB is generated, and accordingly, the user U raises the determination reference as the number of copies to be printed increases, and it is possible to suppress the formation of many images with deteriorated quality.

Further, the determination reference information HDI may include time zone-specific information for the first time zone and time zone-specific information for the second time zone that does not overlap with the first time zone among the plurality of time zones. The time zone-specific information for the first time zone is information on the determination reference for determining that the discharge state of the nozzle N[m1] is abnormal when the determination section 215 determines the presence or absence of a discharge abnormality of the nozzle N[m1] in the first time zone. The time zone-specific information for the second time zone is information on the determination reference for determining that the discharge state of the nozzle N[m1] is abnormal when the determination section 215 determines the presence or absence of a discharge abnormality of the nozzle N[m1] in the second time zone. When the current time is included in the first time zone, the determination section 215 determines the presence or absence of a discharge abnormality of the nozzle N[m1] based on the viscosity information NND[m1] and the time zone-specific information for the first time zone. When the current time is included in the second time zone, the determination section 215 determines the presence or absence of a discharge abnormality of the nozzle N[m1] based on the viscosity information NND[m1] and the time zone-specific information for the second time zone.

The user U is requested to change the determination reference according to the time zone. For example, when the printing processing is executed at midnight, there is a high possibility that there is no worker who confirms the image formed on the medium PP. Therefore, when the determination reference is low, it is determined that there is no discharge abnormality even though discharge abnormality is originally caused, the complementary processing is not executed, and there is a concern that many images with deteriorated quality are formed. On the other hand, when the printing processing is executed in the daytime, there is a high possibility that there is a worker who confirms the image formed on the medium PP. Therefore, even when it is determined that there is no discharge abnormality even though discharge abnormality is originally caused, the complementary processing is not executed, the worker can notice that the image having deteriorated quality is formed, and the printing processing can be stopped. Therefore, according to the liquid discharge system 10 according to the first embodiment, the determination reference can be set for each of the plurality of time zones, and accordingly, the user U can set the determination reference higher at a time when there is no worker such as midnight, and it is possible to suppress the formation of many images with deteriorated quality.

Further, the viscosity information NND[m1] is an estimated viscosity obtained by estimating the viscosity of the ink in the nozzle N[m1], the determination reference information HDI is a threshold value with respect to the estimated viscosity, and the determination section 215 determines that the discharge state of the nozzle N[m1] is abnormal when the estimated viscosity is higher than the threshold value, and determines that the discharge state of the nozzle N[m1] is normal when the estimated viscosity is lower than the threshold value.

Since a discharge abnormality tends to occur as the estimated viscosity increases, a discharge state of the nozzle N[m1] can be determined by using the estimated viscosity according to the first embodiment.

1-12-2. Summary of Selection of Appropriate Complementary Processing

As described above, the liquid discharge system 10 according to the first embodiment is a system for controlling the operation of the liquid discharge head 110 provided with the plurality of nozzles N for discharging the ink. The liquid discharge system 10 includes the determination section 215 that determines the presence or absence of a discharge abnormality of the nozzle N[m1] among the plurality of nozzles N; the reception section 213 that receives the complementary processing designation information CSI indicating the complementary processing designated by the user U among the plurality of complementary processing for complementing the discharge abnormality of the nozzle N[m1] when the nozzle N[m1] has a discharge abnormality, that is, among the plurality of complementary processing different from each other, according to the operation of the user U; and the execution section 103 that executes the complementary processing indicated by the complementary processing designation information CSI received by the reception section 213 when the determination section 215 determines that the nozzle N[m1] has a discharge abnormality.

In the liquid discharge system 10 according to the first embodiment, the quality of the image formed on the medium PP can be improved by receiving the complementary processing designation information CSI indicating the appropriate complementary processing designated by the user U.

The liquid discharge head 110 is an example of the "first liquid discharge head".

The complementary processing designation information CSI indicates the complementary processing other than the complementary processing for which the user U does not permit the execution by the execution section 103 among the plurality of complementary processing.

Although the quality of the image can be improved by executing the complementary processing, it is also assumed that the user U thinks that it is preferable not to execute the specific complementary processing among the plurality of complementary processing. For example, in the other color complementary processing, dots of a color different from the assumed color are formed. Therefore, it is assumed that the user U thinks that the image in which dot omission occurs is higher in quality than the image in which the dots of other colors are formed. As described above, it is assumed that there is complementary processing for which the user U does not permit the execution by the execution section 103. However, the number of times of complementary processing for which the user U permits the execution by the execution section 103 tends to be larger than the number of times of complementary processing for which the user U does not permit the execution by the execution section 103. Therefore, the liquid discharge system 10 according to the first embodiment can reduce the trouble of selecting the complementary processing to be executed by the execution section 103 by selecting the complementary processing for which the user U does not permit the execution by the execution section 103 as compared with a case of selecting the complementary processing for which the user U permits the execution by the execution section 103.

In addition, the storage circuit 220 that stores the complementary relationship table 223 having the automatic execution information indicating the complementary processing to be automatically executed among the plurality of complementary processing, is provided. When the operation of the user U indicating to execute the complementary processing to be automatically executed is received, the reception section 213 receives the automatic execution information stored in the storage circuit 220 as the complementary processing designation information CSI.

It is possible to improve the quality of the image formed on the medium PP by executing the complementary processing indicated by the automatic execution information even when the user U does not know an appropriate complementary processing among the plurality of complementary processing.

In addition, the liquid discharge system 10 according to the first embodiment further includes the selection section 311 that selects a part of complementary processing recommended to be executed among the plurality of complementary processing based on environmental information EI on the environment in which the user U uses the liquid discharge head 110; and the proposal section 217 that proposes the part of complementary processing to the user U.

According to the liquid discharge system 10 according to the first embodiment, even in a state where the user U does not know appropriate complementary processing, by selecting the complementary processing according to the proposal of the proposal section 217, the quality of the image formed on the medium PP can be improved according to the environmental information EI.

In addition, the liquid discharge system 10 according to the first embodiment further includes the storage circuit 220 that stores the input information 225 indicating past input contents of the user U; and the display device 270 that displays an image for selecting a plurality of complementary processing. The display device 270 displays the discharge abnormality detection mode setting screen CD updated based on the input information 225, and the reception section 213 receives the complementary processing designation information CSI by the operation of the user U according to the discharge abnormality detection mode setting screen CD.

When the type of ink used by the ink jet printer 100, the type of medium PP, and the like do not change, there is a possibility that the complementary processing selected by the user U does not change. Therefore, according to the liquid discharge system 10 according to the first embodiment, the operation amount of the user U can be reduced by displaying the discharge abnormality detection mode setting screen CD based on the past input contents of the user U, and thus the trouble of the user U can be reduced.

The discharge abnormality detection mode setting screen CD is an example of "image based on the input information".

The reception section 213 can further receive the printing target designation information TPI indicating that the test recording image is formed on the medium PP for the user to confirm an image formed on the medium PP by the complementary processing indicated by the complementary processing designation information CSI.

By confirming the test recording image, the user U can confirm the degree of quality of image by the complementary processing indicated by the complementary processing designation information CSI. When the size of the test recording image is smaller than the size of the image indicated by the image data identified by the print instruction PI, as compared with the aspect of forming the image data identified by the print instruction PI on the medium PP, with a small number of copies to be printed, it is possible to confirm the quality of the image obtained by the complementary processing indicated by the complementary processing designation information CSI.

The printing target designation information TPI is an example of "information indicating that the test recording image is formed on the medium PP".

The liquid discharge head 110 further includes the piezoelectric element 111*f* that discharges a liquid from the nozzle N[m1] by driving based on the driving signal Com. The plurality of complementary processing include the waveform correction processing of performing the complementation by varying the waveform of the driving signal Com applied to the piezoelectric element 111*f* when the nozzle N[m1] has a discharge abnormality.

According to the liquid discharge system 10 according to the first embodiment, the user U may execute the waveform correction processing when it is considered that a high-quality image can be formed on the medium PP by executing the waveform correction processing. The discharge amount of ink can be increased by executing the waveform correction processing, but it is unknown how much the discharge amount will increase unless the waveform correction processing is actually executed. Therefore, for example, when the user U does not emphasize the size of the dots formed on the medium PP, the execution section 103 executes the waveform correction processing, and when the user U emphasizes the size of the dots formed on the medium PP, the complementary processing different from the waveform correction processing may be executed by the execution section 103.

Since the nozzle N[m1] is classified into the first nozzle array Ln1, the first type of ink is discharged. Further, the selection of appropriate complementary processing will be described using the nozzle N[m2] classified into the second nozzle array Ln2. m2 is an integer of M+1 or more and 2M or less. The ink discharged by the nozzle N[m1] is the first type of ink, and the liquid discharge head 110 further includes the nozzle N[m2] for discharging the second type of ink different from the first type of ink. The plurality of complementary processing include the other color complementary processing of performing the complementation by discharging the second type of ink from the second nozzle when the nozzle N[m1] has a discharge abnormality.

According to the liquid discharge system 10 according to the first embodiment, the user U may execute the other color complementary processing when it is considered that a high-quality image can be formed on the medium PP by executing the other color complementary processing. For example, when the user U does not emphasize the color of the dots formed on the medium PP, the execution section 103 executes the other color complementary processing, and when the user U emphasizes the color of the dots formed on the medium PP, the complementary processing different from the other color complementary processing may be executed by the execution section 103.

In addition, the liquid discharge head 110 forms an image on the medium PP by scanning a plurality of times, and the plurality of complementary processing include the other pass complementary processing of performing the complementation by discharging ink from the nozzle N[m3] different from the nozzle N[m1] among the plurality of nozzles N in the pass different from the pass at which the nozzle N[m1] is supposed to discharge ink, when the nozzle N[m1] has a discharge abnormality. m3 is an integer of 1 or more and M or less, and is different from m1.

According to the liquid discharge system 10 according to the first embodiment, the user U may execute the other pass complementary processing when it is considered that a high-quality image can be formed on the medium PP by executing the other pass complementary processing.

The nozzle N[m3] is an example of a "third nozzle".

The liquid discharge head 110 forms an image on the medium PP by scanning a plurality of times, and the plurality of complementary processing include the adjacent complementary processing of performing the complementation by discharging ink from the nozzle N[m1−1] or the nozzle N[m1+1] adjacent to the nozzle N[m1] among the plurality of nozzles N in the same scanning as the pass at which the nozzle N[m1] is supposed to discharge ink, when the nozzle N[m1] has a discharge abnormality. However, when m1 is 1, ink is discharged from the nozzle N[2], and when m1 is M, ink is discharged from the nozzle N[M−1].

According to the liquid discharge system 10 according to the first embodiment, the user U may execute the adjacent complementary processing when it is considered that a high-quality image can be formed on the medium PP by executing the adjacent complementary processing. For example, when the user U does not emphasize the position of the dots formed on the medium PP in the direction along the Y axis, the execution section 103 executes the adjacent complementary processing, and when the user U emphasizes the position of the dots formed on the medium PP in the direction along the Y axis, the complementary processing different from the adjacent complementary processing may be executed by the execution section 103.

The nozzle N[m1−1] and the nozzle N[m1+1] are examples of a "fifth nozzle".

The plurality of complementary processing include the normal printing processing with flushing processing including the flushing processing for resolving the discharge abnormality of the nozzle N[m1] and the processing of discharging ink from the nozzle N after the flushing processing when the nozzle N[m1] has a discharge abnormality.

According to the liquid discharge system 10 according to the first embodiment, the user U may execute the adjacent complementary processing when it is considered that a high-quality image can be formed on the medium PP by executing the adjacent complementary processing. For example, when the user U thinks that the discharge abnormality is resolved by the flushing processing, the execution section 103 may execute the normal printing processing with flushing processing, and when it is considered that the discharge abnormality is not resolved by the flushing processing, the execution section 103 may execute the complementary processing different from the normal printing processing with flushing processing.

2. Modification Example

Each aspect exemplified above can be variously modified. Specific modifications will be described below. Two or more aspects selected in any manner from the following examples can be appropriately combined with each other within a range of not being inconsistent with each other.

2-1. First Modification Example

In the first embodiment, the selection section 311 selects the recommended complementary processing based on the environmental information EI, but may select the recommended complementary processing based on other information. In the first modification example, the recommended complementary processing is selected based on determination result information HI[1] to HI[2M], which is the determination result of the determination section 215.

Figure 25:
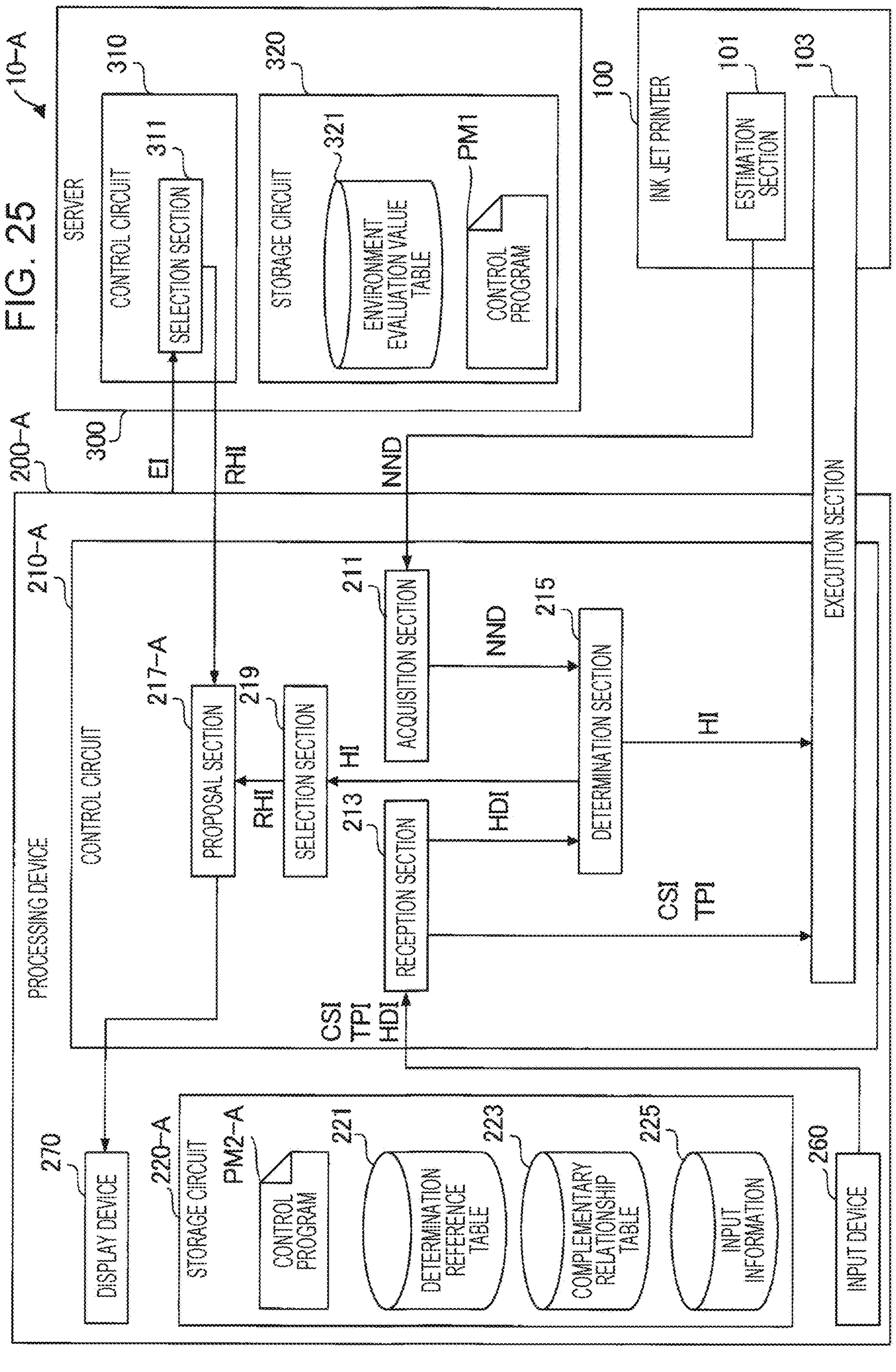
FIG. 25 is a diagram illustrating a function of a liquid discharge system according to a first modification example.

FIG. 25 is a diagram illustrating a function of a liquid discharge system 10-A according to the first modification example. The liquid discharge system 10-A differs from the liquid discharge system 10 in that the processing device 200-A is provided instead of the processing device 200. The processing device 200-A differs from the processing device 200 in that a storage circuit 220-A is provided instead of the storage circuit 220 and a control circuit 210-A is provided instead of the control circuit 210. The storage circuit 220-A differs from the storage circuit 220 in that a control program PM2-A is stored instead of the control program PM2. The control circuit 210-A differs from the control circuit 210 in reading the control program PM2-A, executing the read control program PM2-A, and accordingly, functioning as a proposal section 217-A instead of the proposal section 217, and further functioning as the selection section 219.

A series of operations of the liquid discharge system 10-A differs in that the display processing of the discharge abnormality detection mode setting screen CD according to the first modification example is executed, and step SC14 illustrated in FIG. 16 is not executed, instead of the display processing of the discharge abnormality detection mode setting screen CD in step SC12 illustrated in FIG. 15, and is common in other points. The proposal section 217-A and the selection section 219 will be described using a discharge abnormality detection mode setting screen CD-A illustrated in FIG. 26 and a flow chart of display processing of the discharge abnormality detection mode setting screen CD according to the first modification example illustrated in FIG. 27.

Figure 26:
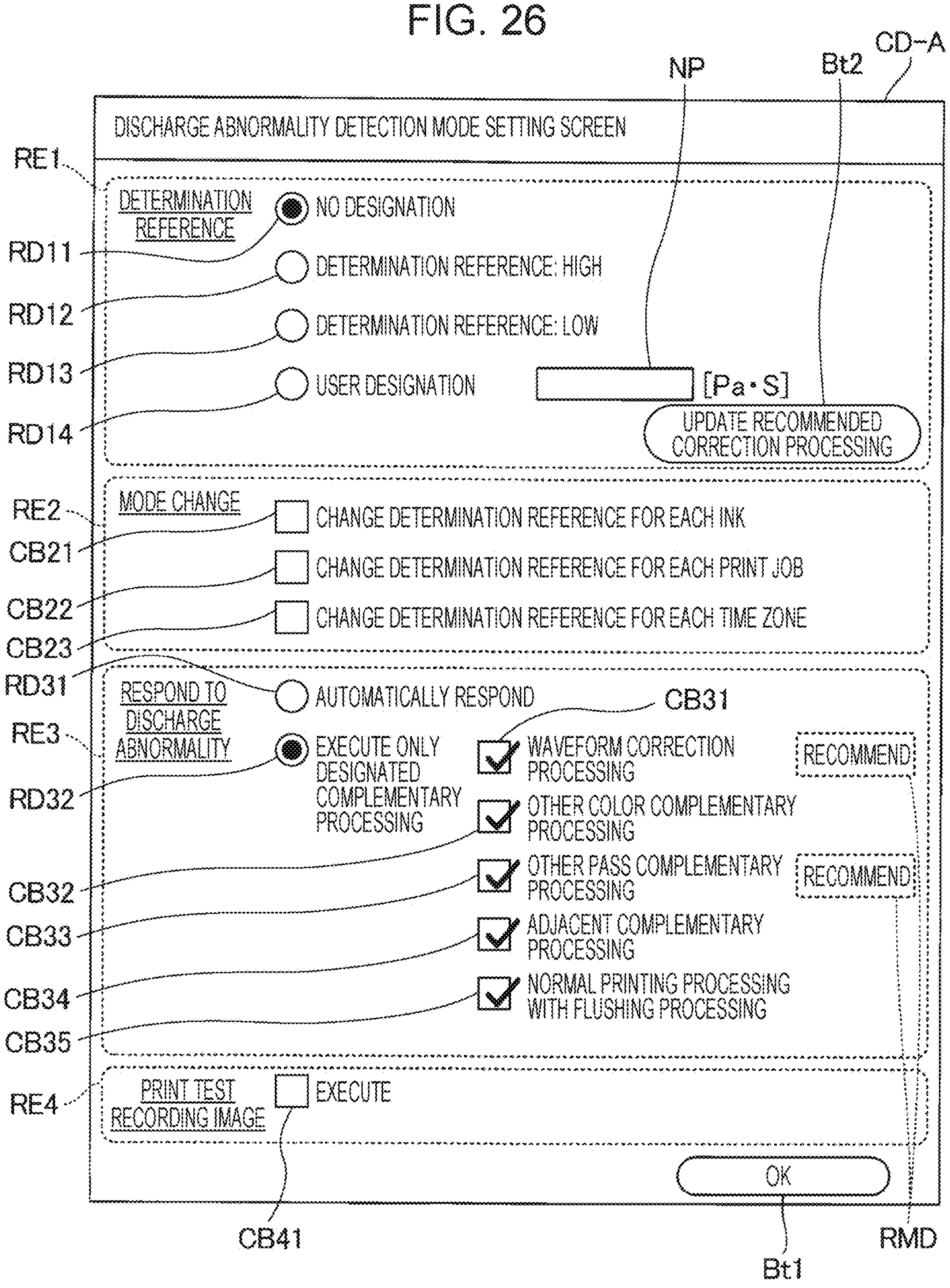
FIG. 26 is a view illustrating an example of a discharge abnormality detection mode setting screen.

FIG. 26 is a diagram illustrating an example of the discharge abnormality detection mode setting screen CD-A. The discharge abnormality detection mode setting screen CD-A differs from the discharge abnormality detection mode setting screen CD in that an update button Bt2 for the recommended correction processing is provided in the region RE1.

Figure 27:
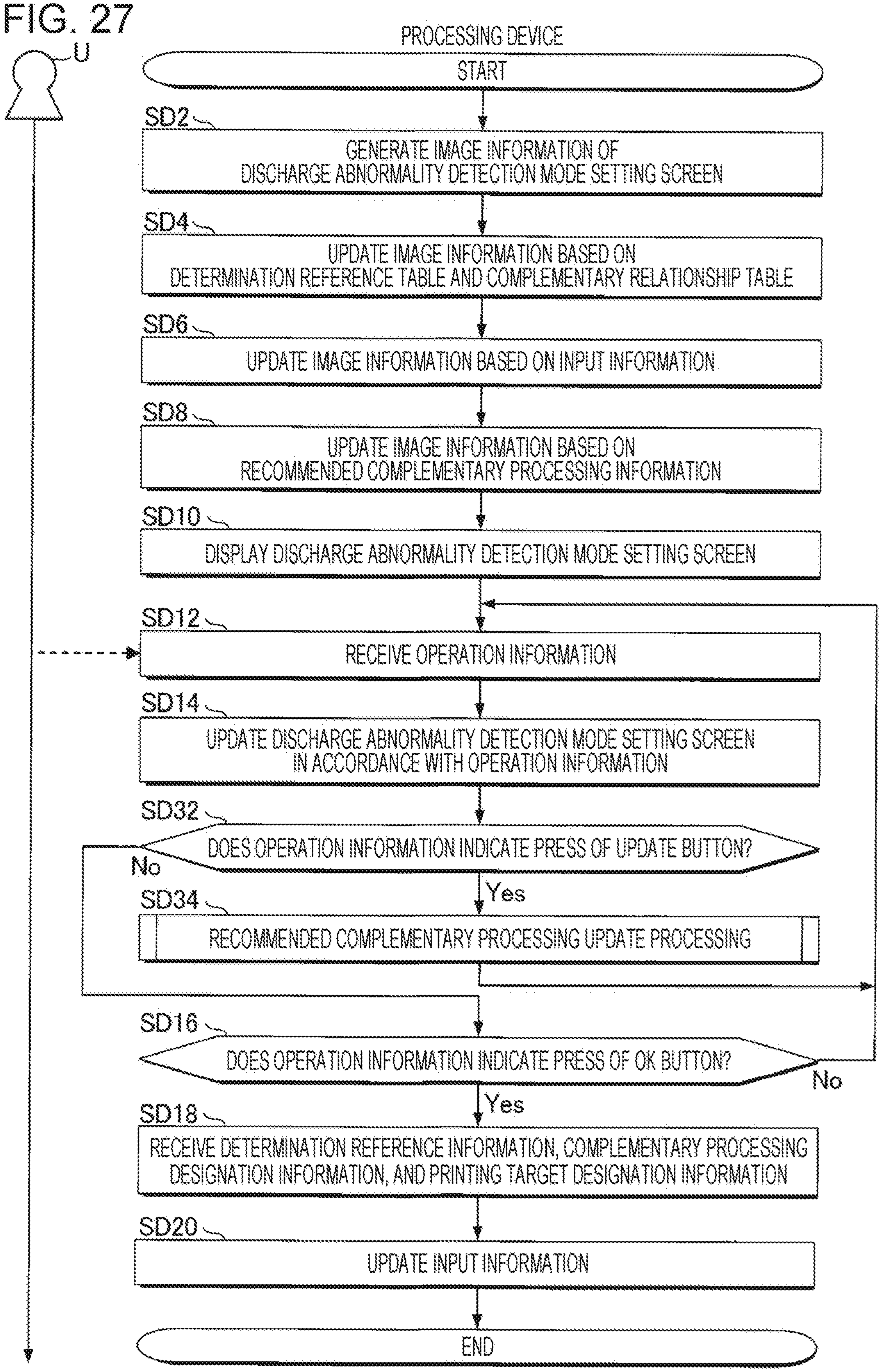
FIG. 27 is a flow chart illustrating display processing of a discharge abnormality detection mode setting screen according to the first modification example.

FIG. 27 is a flow chart illustrating display processing of the discharge abnormality detection mode setting screen CD according to the first modification example. The flow chart illustrated in FIG. 27 differs from the flow chart illustrated in FIG. 19 in that the processing of step SD32 and step SD34 is executed after the processing of step SD14 is ended, and the processing of step SD16 is executed when the determination result of step SD32 is negative, and matches in other points. Hereinafter, only the differences from the flow chart illustrated in FIG. 19 will be described.

After the processing in step SD14 is ended, the control circuit 210 determines whether or not the operation information indicates the pressing of the update button Bt2 in step SD32. When the determination result in step SD32 is affirmative, the control circuit 210 executes recommended complementary processing update processing in step SD34.

Figure 28:
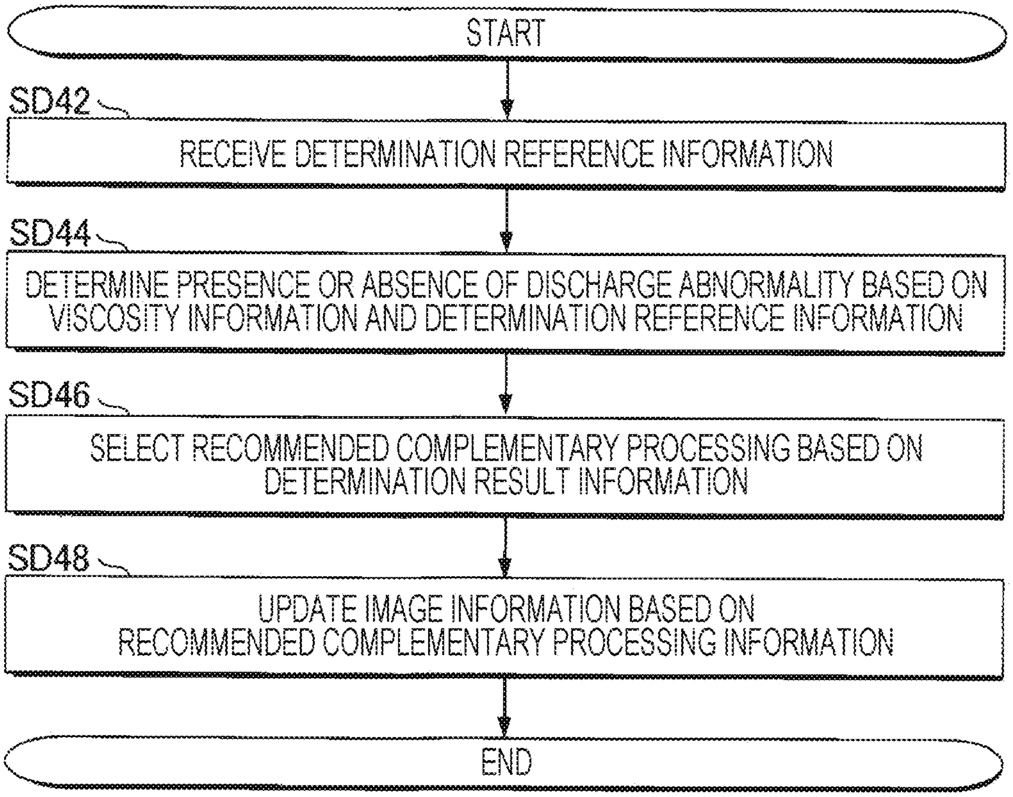
FIG. 28 is a flow chart illustrating an example of recommended complementary processing update processing.

FIG. 28 is a flow chart illustrating an example of a recommended complementary processing update processing. The recommended complementary processing update processing is processing of selecting the recommended complementary processing and updating the discharge abnormality detection mode setting screen CD-A.

In step SD42, the control circuit 210-A functioning as the reception section 213 receives the determination reference information HDI based on the current state in the region RE1 of the discharge abnormality detection mode setting screen CD-A.

After the processing of step SD42 is ended, the control circuit 210-A that functions as the determination section 215 determines that the presence or absence of a discharge abnormality based on the viscosity information NND acquired in step SC6 and the determination reference information HDI for each of the discharge sections D[1] to D[2M] in step SD44. The control circuit 210-A generates determination result information HI[1] to HI[2M] indicating the presence or absence of a discharge abnormality for each of the discharge sections D[1] to D[2M].

After the processing in step SD44 is ended, the control circuit 210-A functioning as the selection section 219 selects the recommended complementary processing in step SD46 based on the determination result information HI[1] to HI[2M].

A specific example of step SD46 will be described. Based on the determination result information HI[1] to HI[2M], the selection section 219 does not select any of the other color complementary processing, the other pass complementary processing, and the adjacent complementary processing as the recommended complementary processing when the nozzle N that performs discharge is also the abnormal nozzle N-S instead of the abnormal nozzle N-S.

Hereinafter, the nozzle N[m1] will be described as the abnormal nozzle N-S by using the example of FIG. 13. When the determination result information HI[M+m1] indicates a discharge abnormality, the selection section 219 does not select the other color complementary processing as the recommended complementary processing. Further, when the determination result information HI[M] indicates a discharge abnormality, the selection section 219 does not select the other pass complementary processing as the recommended complementary processing. In addition, when the determination result information HI[m1−1] and the determination result information HI[m1+1] indicate a discharge abnormality, the selection section 219 does not select the adjacent complementary processing as the recommended complementary processing. The selection section 219 generates the recommended complementary processing information RHI.

After the processing of step SD46 is ended, the control circuit 210-A functioning as the proposal section 217-A makes a proposal to the user U based on the recommended complementary processing information RHI generated by the selection section 311 and the recommended complementary processing information RHI generated by the selection section 219. Specifically, in step SD48, the control circuit 210 updates the image information indicating the discharge abnormality detection mode setting screen CD-A based on the recommended complementary processing information RHI generated by the selection section 311 and the recommended complementary processing information RHI generated by the selection section 219. For example, the control circuit 210 displays the character string RMD indicating that the complementary processing indicated by both the recommended complementary processing information RHI generated by the selection section 311 and the recommended complementary processing information RHI generated by the selection section 219 is recommended. Alternatively, the control circuit 210 may display the character string RMD indicating that the complementary processing indicated by one or both of the recommended complementary processing information RHI generated by the selection section 311 and the recommended complementary processing information RHI generated by the selection section 219 is recommended.

After the processing of step SD48 is ended, the control circuit 210-A ends the series of processing illustrated in FIG. 28.

The description will be made referring again to FIG. 27. After the processing in step SD34 is ended, the control circuit 210-A returns the processing to step SD12.

Above, the determination section 215 determines the presence or absence of a discharge abnormality of each of the plurality of nozzles N, and the liquid discharge system 10-A according to the first modification example further includes: the selection section 219 that selects the recommended complementary processing among the plurality of complementary processing based on the determination result of the determination section 215; and the proposal section 217-A that proposes the part of complementary processing to the user U.

As described above, according to the first modification example, by selecting the recommended complementary processing based on the determination result of the determination section 215, the complementary processing in which the nozzle N for discharging ink, instead of the nozzle N having a discharge abnormality, also has a discharge abnormality and cannot be appropriately complemented is not recommended to the user U, and thus the user U can designate the complementary processing that can appropriately perform the complementation, and can improve the quality of the image formed on the medium PP.

In addition, in the first modification example, in step SD48, the control circuit 210 updates the image information indicating the discharge abnormality detection mode setting screen CD-A based on the recommended complementary processing information RHI generated by the selection section 311 and the recommended complementary processing information RHI generated by the selection section 219, but the present disclosure is not limited to this. The control circuit 210 may update the image information indicating the discharge abnormality detection mode setting screen CD-A based only on the recommended complementary processing information RHI generated by the selection section 219.

2-2. Second Modification Example

Although the ink jet printer 100 in each of the above aspects is a serial printer, a line printer that forms an image on the medium PP by a single pass method may also be used. The single pass method means forming an image on the medium PP by one scanning.

Figure 29:
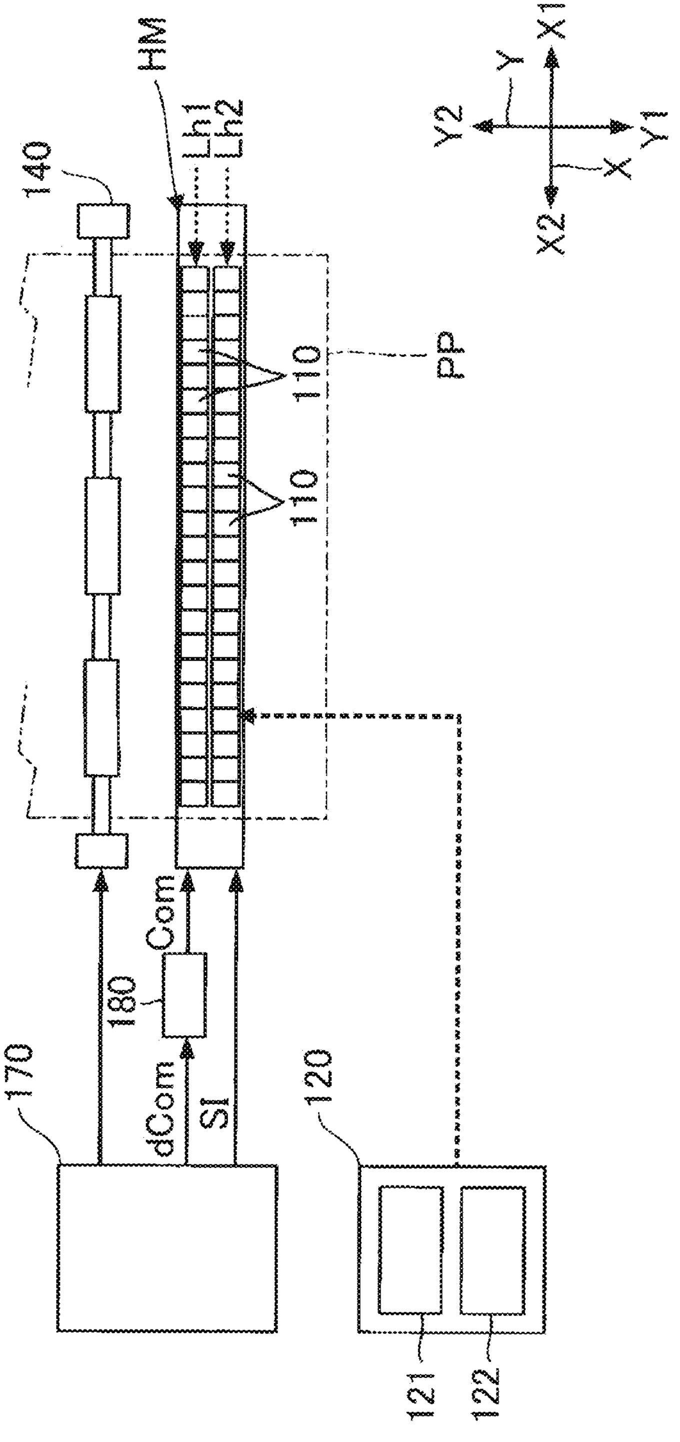
FIG. 29 is a schematic diagram illustrating an example of a configuration of an ink jet printer according to a second modification example.

FIG. 29 is a schematic diagram illustrating an example of a configuration of an ink jet printer 100-B according to a second modification example. The ink jet printer 100-B differs from the ink jet printer 100 in that the movement mechanism 130 is not provided and the head module HM is provided.

The head module HM is a line head having the plurality of liquid discharge heads 110 arranged such that a plurality of nozzles N are distributed over the entire range of the medium PP in the X axis. That is, an aggregate of the plurality of liquid discharge heads 110 constitutes an elongated line head that extends in the direction along the X axis. Further, as illustrated in FIG. 29, the plurality of liquid discharge heads 110 are classified into a first head array Lh1 and a second head array Lh2 spaced apart from each other in the direction along the Y axis.

The liquid discharge system 10 according to the second modification example can execute the other head complementary processing instead of the other pass complementary processing. The other head complementary processing performs the complementation by discharging the ink from the nozzle N provided in the liquid discharge head 110 classified into the second head array Lh2 when the nozzle N provided in the liquid discharge head 110 classified into the first head array Lh1 has a discharge abnormality. Among the plurality of nozzles N provided in the liquid discharge head 110 classified into the second head array Lh2, the position of the X axis of the nozzle N that complements the abnormal nozzle N-S is preferably close to, and is most preferably the same as the position of the X axis of the abnormal nozzle N-S in the liquid discharge head 110 classified into the first head array Lh1. Further, the type of ink discharged by the nozzle N that complements the abnormal nozzle N-S is preferably the same as the type of ink supposed to be discharged by the abnormal nozzle N-S, but may be different.

The other head complementary processing is an example of “fourth complementary processing”. When the abnormal nozzle N-S corresponds to the “first nozzle”, the liquid discharge head 110 having the abnormal nozzle N-S is an example of a “first liquid discharge head”, the nozzle N that complements the abnormal nozzle N-S is an example of a “fourth nozzle”, and the liquid discharge head 110 having the nozzle N is an example of a “second liquid discharge head”.

Above, the liquid discharge system 10 according to the second modification example further controls the operation of the plurality of liquid discharge heads 110 provided with the nozzle N for discharging ink, and the plurality of complementary processing include the other head complementary processing of performing the complementation by discharging ink from the nozzle N provided in the liquid discharge head 110, which is different from the nozzle N, when the nozzle N has a discharge abnormality.

According to the liquid discharge system 10 according to the second modification example, the user U may execute the other head complementary processing when it is considered that a high-quality image can be formed on the medium PP by executing the other head complementary processing.

Further, in the adjacent complementary processing, in the first embodiment, the nozzle N adjacent to the abnormal nozzle N-S discharges ink in the same pass as the pass at which the abnormal nozzle N-S is supposed to discharge ink out of the plurality of passes. On the other hand, in the second modification example, an image is formed on the medium PP by one pass. Therefore, in the adjacent complementary processing in the second modification example, the nozzle N adjacent to the abnormal nozzle N-S may discharge ink during this one pass.

2-3. Third Modification Example

In the first embodiment, the plurality of complementary processing for complementing the discharge abnormality include five complementary processing such as the waveform correction processing, the other color complementary processing, the other pass complementary processing, the adjacent complementary processing, and the normal printing processing with flushing processing, but the present disclosure is not limited to this. For example, when the ink jet printer 100 has a plurality of liquid discharge heads 110 that discharge ink of the same color, the plurality of complementary processing for complementing the discharge abnormality may include six complementary processing including the complementary processing of discharging ink from the nozzle N of the liquid discharge head 110 different from the liquid discharge head 110 having the abnormal nozzle N-S among the plurality of liquid discharge heads 110.

2-4. Fourth Modification Example

In the first embodiment, the number of the plurality of complementary processing for complementing the discharge abnormality is five, and in the third modification example, the number is six, but the present disclosure is not limited to this. For example, when the discharge regions Rp of two continuous passes do not overlap each other, the number of the plurality of complementary processing for complementing the discharge abnormality is four excluding the other pass complementary processing.

2-5. Fifth Modification Example

In each of the above aspects, the viscosity information NND indicates the estimated viscosity, but the present disclosure is not limited to this. For example, the viscosity information NND may be data obtained by digitizing the residual vibration signal NES as information indicating the discharge state of the nozzle N. Alternatively, the viscosity information NND may be data indicating the characteristics of the residual vibration. The characteristic of the residual vibration is, for example, the amplitude, cycle, and attenuation rate of the residual vibration. When the viscosity information NND indicates information other than the estimated viscosity, the determination reference information HDI is also different from the first embodiment. For example, when the viscosity information NND indicates the amplitude of the residual vibration, the determination reference information HDI is a threshold value for the amplitude of the residual vibration.

2-6. Sixth Modification Example

In each of the above-described aspects except the fifth modification example, the viscosity information NND indicates the viscosity estimated by the residual vibration signal NES, but may be the viscosity estimated by other information. For example, the viscosity information NND may be a viscosity estimated by the flight speed of the ink, or may be a viscosity estimated by a deviation amount of the landing position of the test pattern.

2-7. Seventh Modification Example

In each of the above-described aspects, it is described that the maintenance processing includes the flushing processing, but the maintenance processing is not limited to the flushing processing. For example, the maintenance processing may be one or more processing out of the flushing processing, the wiping processing, and the pumping processing. The wiping processing is processing of wiping off foreign matter such as paper dust attached to the vicinity of the nozzle N of the discharge section D with a wiper. The pumping processing is processing of suctioning the ink, air bubbles, or the like inside the discharge section D by a tube pump.

2-8. Eighth Modification Example

In each of the above aspects, instead of the piezoelectric element **111*f*, a heat generation element that converts electric energy into heat energy, generates air bubbles inside the pressure chamber CV by heating, and fluctuates the pressure inside the pressure chamber CV may be employed. In an eighth modification example, the "heat generation element" is an example of a "driving element". The heat generation element may be, for example, an element in which the heat generating body generates heat by supplying the driving signal Com. When the liquid discharge system 10 has the heat generation element, the liquid discharge system 10** executes any of the four complementary processing such as the other color complementary processing, the other pass complementary processing, the adjacent complementary processing, and the normal printing processing with flushing processing, as the plurality of complementary processing for complementing the discharge abnormality.

2-9. Ninth Modification Example

In each of the above-described aspects, the acquisition section 211 and the determination section 215 are realized by the control circuit 210, but the present disclosure is not limited thereto. For example, the acquisition section 211 and the determination section 215 may be realized by the control circuit 170 of the ink jet printer 100.

2-10. Tenth Modification Example

The liquid discharge system 10 in each of the above aspects includes the server 300, the processing device 200, and the ink jet printer 100, but the present disclosure is not limited to this. For example, the liquid discharge system 10 may not include the processing device 200, and the server 300 and the ink jet printer 100 may be communicatively coupled via the network NW. The ink jet printer 100 according to the seventh modification example further includes an input device and a display device. In the seventh modification example, the acquisition section 211, the reception section 213, the determination section 215, and the proposal section 217 realized by the control circuit 210 are realized by the control circuit 170 of the ink jet printer 100. However, the acquisition section 211 and the determination section 215 may be realized by the control circuit 310 of the server 300. Further, the execution section 103 realized by the cooperation between the processing device 200 and the ink jet printer 100 is realized by the ink jet printer 100.

Alternatively, the liquid discharge system 10 may not have the server 300. The selection section 311 realized by the control circuit 310 may be realized by the control circuit 210.

2-11. Eleventh Modification Example

The liquid discharge system 10 may not include the server 300 and the processing device 200. The ink jet printer 100 according to the eighth modification example further includes an input device and a display device. In the eighth modification example, the acquisition section 211, the reception section 213, the determination section 215, and the proposal section 217, which are realized by the control circuit 210, and the selection section 311 realized by the control circuit 310, are realized by the control circuit 170 of the ink jet printer 100.

2-12. Twelfth Modification Example

The liquid discharge apparatus exemplified in the first embodiment and the first to fifth modification examples described above can be employed in various apparatuses such as a facsimile apparatus and a copying machine in addition to an apparatus dedicated to printing. However, the purpose of use of the liquid discharge apparatus of the present disclosure is not limited to printing. For example, a liquid discharge apparatus that discharges a solution of a coloring material is used as a manufacturing device forming a color filter of a liquid crystal display device. In addition, a liquid discharge apparatus that discharges a solution of a conductive material is used as a manufacturing device for forming wiring and electrodes of a wiring substrate.

What is claimed is:

1. A liquid discharge system that controls an operation of a first liquid discharge head provided with a plurality of nozzles for discharging a liquid, the liquid discharge system comprising:

one or more processors; and a storage circuit including one or more programs that, when executed by the one or more processors, caused the liquid discharge system to function as:

a determination section that determines presence or absence of a discharge abnormality of a first nozzle among the plurality of nozzles;

a reception section that receives designation information indicating two or more complementary processing designated by a user among three or more of complementary processing for complementing the discharge abnormality of the first nozzle when the first nozzle has a discharge abnormality, that is, among the three or more of complementary processing different from each other, according to an operation of the user; and an execution section that executes the two or more complementary processing indicated by the designation information received by the reception section when the determination section determines that the first nozzle has the discharge abnormality.

2. The liquid discharge system according to claim 1, wherein the operation of the user is performed by selecting the two or more complementary processing for which the user does not permit the execution among the three or more of complementary processing.

3. The liquid discharge system according to claim 1, wherein the storage circuit stores automatic execution information indicating the two or more complementary processing to be automatically executed among the three or more complementary processing, and when an operation of the user indicating to execute the two or more complementary processing to be automatically executed is received, the reception section receives the automatic execution information stored in the storage circuit as the designation information.

4. The liquid discharge system according to claim 1, wherein, in which the determination section determines presence or absence of a discharge abnormality of each of the plurality of nozzles, the one or more programs, when executed by the one or more processors, further cause the liquid discharge system to function as:

a selection section that selects a part of the three or more complementary processing recommended to be executed by the execution section among the three or more complementary processing based on a determination result of the determination section; and a proposal section that proposes the part of the three or more complementary processing to the user.

5. The liquid discharge system according to claim 1, wherein the one or more programs, when executed by the one or more processors, further cause the liquid discharge system to function as:

a selection section that selects a part of the three or more complementary processing recommended to be executed by the execution section among the three or more complementary processing based on information on environment in which the user uses the first liquid discharge head; and a proposal section that proposes the part of the three or more complementary processing to the user.

6. The liquid discharge system according to claim 1, wherein the one or more programs, when executed by the one or more processors, further cause the liquid discharge system to function as a display section that displays an image for selecting the three or more complementary processing, the storage circuit stores input information indicating past input contents of the user, the display section displays an updated image in which the image is updated based on the input information, and the reception section receives the designation information by the operation of the user according to the updated image.

7. The liquid discharge system according to claim 1, wherein the reception section is configured to further receive information indicating that a test recording image is formed on a medium for the user to confirm an image formed on the medium by the two or more complementary processing indicated by the designation information.

8. The liquid discharge system according to claim 1, wherein the first liquid discharge head includes a driving element that discharges a liquid from the first nozzle by driving based on a driving signal, and the three or more complementary processing include first complementary processing of performing complementation by varying a waveform of the driving signal applied to the driving element when the first nozzle has the discharge abnormality.

9. The liquid discharge system according to claim 1, wherein a liquid discharged by the first nozzle is a first type of liquid, the first liquid discharge head is further provided with a second nozzle for discharging a second type of liquid different from the first type of liquid, and the three or more complementary processing include second complementary processing of performing complementation by discharging the second type of liquid from the second nozzle when the first nozzle has the discharge abnormality.

10. The liquid discharge system according to claim 1, wherein the first liquid discharge head forms an image on a medium by scanning a plurality of times, and the three or more complementary processing include third complementary processing of performing complementation in which a third nozzle among the plurality of nozzles, which is different from the first nozzle, discharges a liquid in scanning different from scanning in which the first nozzle is supposed to discharge a liquid, when the first nozzle has the discharge abnormality.

11. The liquid discharge system according to claim 1, wherein the liquid discharge system further controls an operation of a second liquid discharge head provided with a fourth nozzle for discharging a liquid, and the three or more complementary processing include fourth complementary processing of performing complementation by discharging a liquid from the fourth nozzle when the first nozzle has the discharge abnormality.

12. The liquid discharge system according to claim 1, wherein the first liquid discharge head forms an image on a medium by scanning once or a plurality of times, and the three or more complementary processing include fifth complementary processing of performing complementation by discharging a liquid from a fifth nozzle among the plurality of nozzles, which is adjacent to the first nozzle, in scanning that is the same as scanning in which the first nozzle is supposed to discharge a liquid, when the first nozzle has the discharge abnormality.

13. The liquid discharge system according to claim 1, wherein the three or more complementary processing include sixth complementary processing having recovery processing for resolving a discharge abnormality of the first nozzle and processing of discharging a liquid from the first nozzle after the recovery processing when the first nozzle has the discharge abnormality.

14. A liquid discharge system that controls an operation of a first liquid discharge head provided with a plurality of nozzles for discharging a liquid, the liquid discharge system comprising:

one or more processors; and a storage circuit including one or more programs that, when executed by the one or more processors, caused the liquid discharge system to function as:

a determination section that determines presence or absence of a discharge abnormality of a first nozzle among the plurality of nozzles based on viscosity information of the liquid;

a reception section that receives designation information indicating two or more complementary processing designated by a user among three or more complementary processing for complementing the discharge abnormality of the first nozzle when the first nozzle has a discharge abnormality, that is, among the three or more complementary processing different from each other, according to an operation of the user; and an execution section that executes the two or more complementary processing indicated by the designation information received by the reception section when the determination section determines that the first nozzle has the discharge abnormality.

* * * * *